(12) United States Patent
Piper

(10) Patent No.: US 8,876,457 B1
(45) Date of Patent: Nov. 4, 2014

(54) APPARATUS AND METHOD FOR STACKING RAILROAD TIES

(71) Applicant: Brewco, Inc., Central City, KY (US)

(72) Inventor: David Piper, Greenville, KY (US)

(73) Assignee: Brewco, Inc., Central City, KY (US)

( * ) Notice: Subject to any disclaimer, the term of this patent is extended or adjusted under 35 U.S.C. 154(b) by 54 days.

(21) Appl. No.: 13/626,060

(22) Filed: Sep. 25, 2012

Related U.S. Application Data

(60) Provisional application No. 61/542,347, filed on Oct. 3, 2011, provisional application No. 61/655,573, filed on Jun. 5, 2012.

(51) Int. Cl.
*B65G 57/22* (2006.01)
*B65G 57/24* (2006.01)

(52) U.S. Cl.
CPC ..................... *B65G 57/24* (2013.01)
USPC ................. 414/791.6; 414/792.7; 414/793.8; 414/768

(58) Field of Classification Search
CPC .... B65G 57/18; B65G 57/005; B65G 47/086; B65G 47/084; B65H 33/08
USPC .......... 414/789.5, 789.3, 792.6, 791.6, 790.3, 414/793.4, 791.4, 788.1, 789.8, 791.2, 414/791.8, 792, 792.7, 793.8, 79.4, 794.6, 414/768, 769
See application file for complete search history.

(56) References Cited

U.S. PATENT DOCUMENTS

| | | | |
|---|---|---|---|
| 2,322,636 A | 6/1943 | Kidder | |
| 2,396,090 A | 3/1946 | Curtis | |
| 2,457,135 A | 12/1948 | Deiters | |
| 2,467,113 A | 4/1949 | Deiters | |
| 3,904,044 A * | 9/1975 | Lunden | 414/789.5 |
| 4,067,455 A * | 1/1978 | Rysti | 414/788.4 |
| 4,324,520 A * | 4/1982 | Kjellberg | 414/789.5 |
| 4,360,303 A * | 11/1982 | Rysti | 414/789.5 |
| 5,964,570 A * | 10/1999 | Dimion et al. | 414/791.6 |
| 5,993,145 A * | 11/1999 | Lunden | 414/789.5 |
| 6,722,844 B2 | 4/2004 | Lunden | |

* cited by examiner

*Primary Examiner* — Saul Rodriguez
*Assistant Examiner* — Lynn Schwenning
(74) *Attorney, Agent, or Firm* — Camoriano and Associates

(57) ABSTRACT

A railroad tie stacker arrangement includes means for conveying ties to a tie accumulation deck to form a layer of parallel ties, means for conveying the layer of parallel ties onto a stack accumulation lift, and means for lowering the stack accumulation lift as each successive layer of ties is deposited onto the lift.

6 Claims, 49 Drawing Sheets

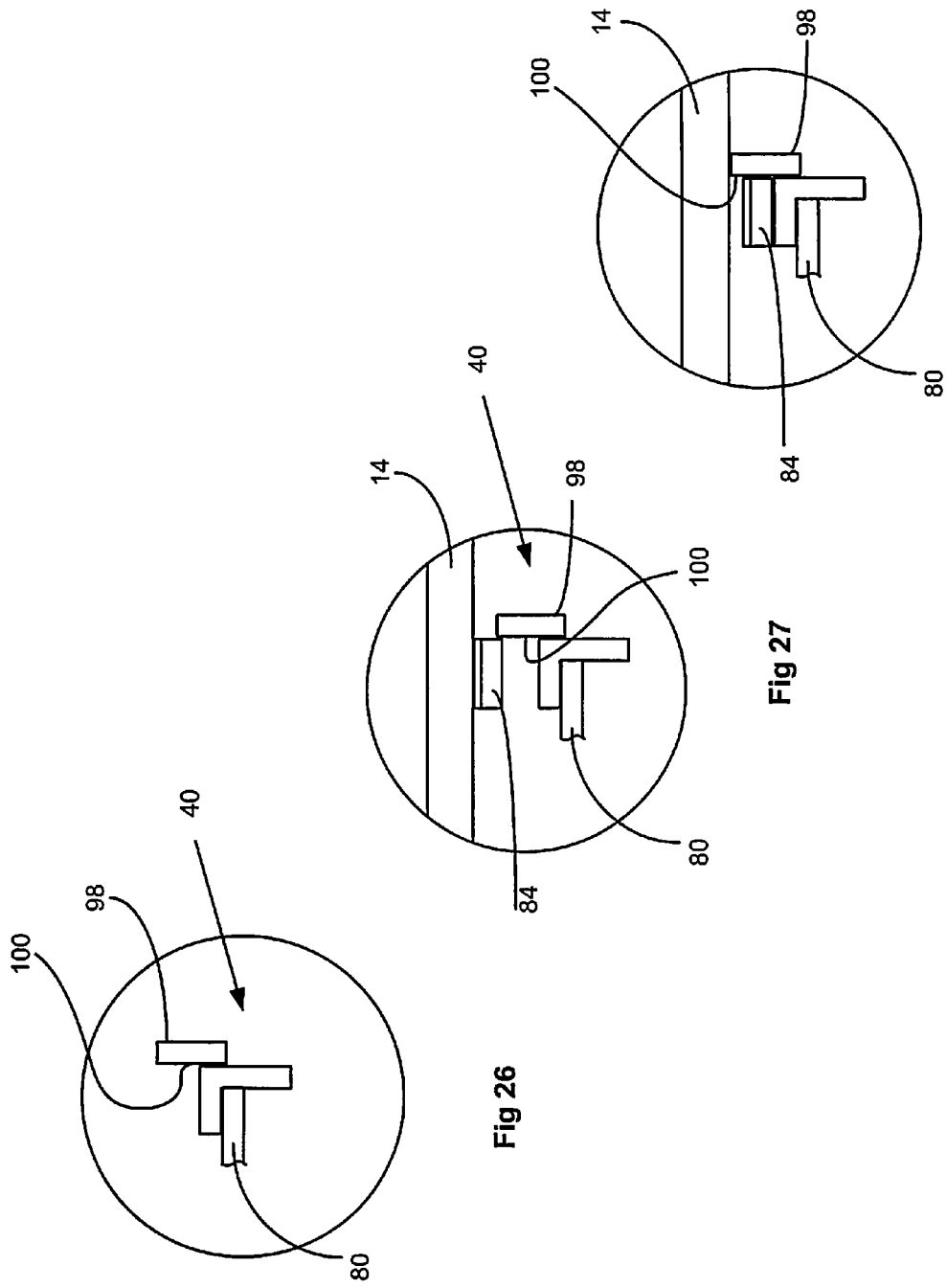

US 8,876,457 B1

APPARATUS AND METHOD FOR STACKING RAILROAD TIES

This application claims priority from U.S. Provisional Application Ser. No. 61/542,347 filed Oct. 3, 2011 and from U.S. Provisional Application Ser. No. 61/655,573 filed Jun. 5, 2012.

BACKGROUND

The present invention relates to a railroad tie stacker. More particularly, it relates to a device and method for efficiently stacking railroad ties either in what is known as a German stack configuration or in a tram stack (pyramid stack) configuration.

Railroad crossties are usually delivered to wood preserving plants where they are treated and then delivered to areas of the yard where they are temporarily stored for air seasoning. The German stack configuration usually is used to give the crossties an opportunity to air dry with plenty of air circulation while minimizing flat spots where water may pool on the crossties. However, the mechanisms used for stacking the ties usually have bottlenecks that slow down the process so that the full rate of the sawmill cannot be used.

Another known stack configuration is called a "tram" or "pyramid" configuration, which is used for loading the ties onto trams, which are then driven into large pressure vessels. Once loaded, these vessels are closed, and the ties, complete with the trams on which they are loaded, are immersed in a preservative solution, such as creosote, and are held there under pressurized conditions.

SUMMARY

The present invention provides an arrangement for stacking the ties which is much faster than prior art arrangements, so that the full rate of the sawmill can be used. In one embodiment, for building a German stack, the cut-to-length ties are fed via a conveyor to a first station wherein nine ties are placed in a parallel, side-by-side, spaced apart orientation. The next tie is intercepted, raised a few inches, conveyed sideways, rotated 90 degrees to become a perpendicular tie, and then is conveyed to where it is pushed off onto one end of the nine parallel ties. This tie assembly is then conveyed forward, carried on top of a set of arms of a stack layer lift to the next station, where a stack accumulation lift picks the assembly up off of the arms (which then retract) and then lowers the assembly out of the way, in preparation for receiving the next tie assembly. This process is repeated (with each successive perpendicular tie being placed on the opposite end of the nine parallel ties at each layer) until a full German stack is built, having two perpendicular ties on top of the fifth layer.

While the old technology German stacking machine uses two arms to pick up each layer of ties, then turns around and stacks that layer on top of a single right angle tie, this new arrangement puts the right angle tie on top of the nine parallel ties and then just moves the layer of parallel ties with a right angle tie on top of one end onto a stack accumulation lift, which is lowered as each successive layer is put on. It is much faster than the prior art, as it can stack 5,000 ties in an 8-hr shift instead of 3600, and it is much simpler and less expensive to manufacture.

Another embodiment allows the same machine discussed above (or a similar machine) to be used to prepare a tram stack configuration, also in a very efficient manner that saves time.

BRIEF DESCRIPTION OF THE DRAWINGS

FIG. 26 is a broken-away, enlarged view of the portion A of FIG. 22, showing only the receiving arm of the stack accumulation lift;

FIG. 27 is a view, similar to FIG. 26, but including also an arm of the stack layer lift in the raised position;

FIG. 28 is a view, similar to FIG. 27, but showing the arm of the stack layer lift in the lowered position, to show how it nests inside the arm of the stack accumulation lift;

DESCRIPTION

Figure 1:
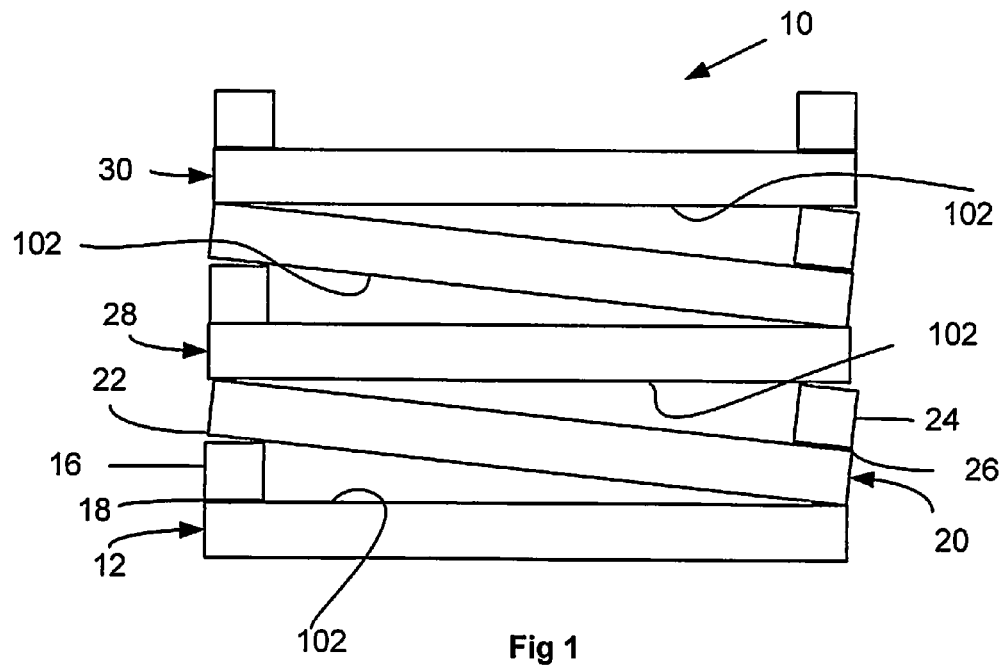
FIG. 1 is a side view of a plurality of railroad crossties stacked in a German stack configuration by means of the apparatus and method described in this application.
Figure 2:
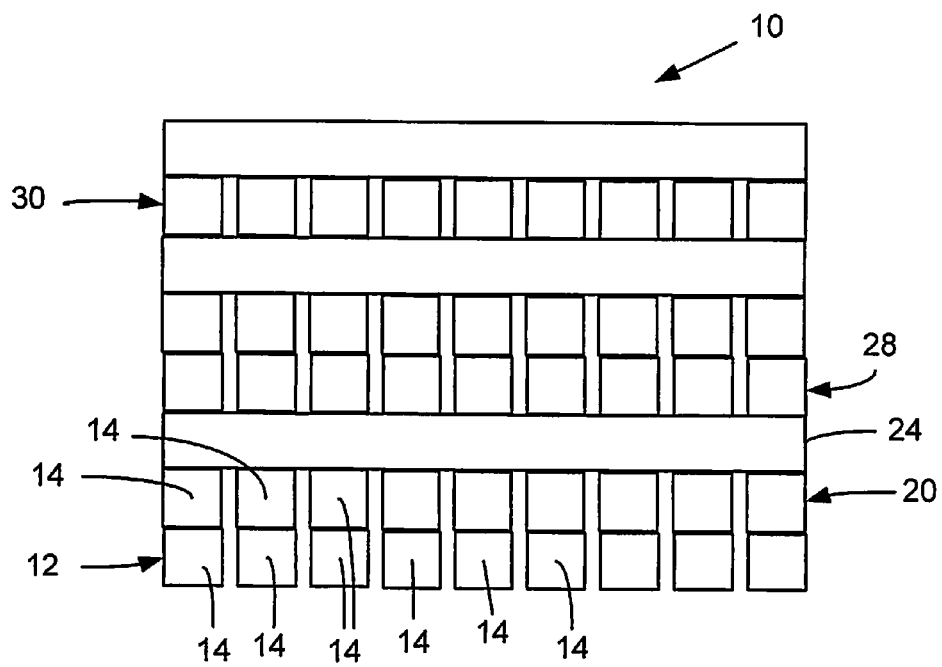
FIG. 2 is an end view of the railroad crossties stack of FIG. 1.

FIGS. 1 and 2 show a stack of railroad cross ties stacked in what is commonly referred to as a German stack configuration, or simply as a German stack 10. The bottom layer 12 includes nine ties 14, which are horizontally oriented in the left-to-right direction and are in a parallel and spaced-apart relationship to each other. A tenth "perpendicular" tie 16 is placed on top of one end 18 of the bottom layer 12 of ties 14, also in a horizontal orientation but at right angles (perpendicular) to the direction of the ties 14 on the bottom layer 12, or in a front-to-back orientation. A second layer 20 of parallel, left-to-right directed ties 14 is placed directly on top of the bottom layer 12. However, since one end 22 of this second layer 20 of ties 14 is resting on the perpendicular tie 16, this second layer 20 is inclined at a slight angle relative to the bottom layer 12, with the left end of the parallel ties 14 at a higher elevation than the right end.

Another perpendicular tie 24 is placed on top of the opposite (right) end 26 of the ties 14 on the second layer 20, as shown in FIG. 1, and a third layer 28 of parallel ties 14 is placed directly above the second layer 20 of ties 14. The third layer 28 is again oriented horizontally, parallel to the first layer 12.

The placement of "perpendicular" ties at alternating ends of the layers of ties is continued as desired, with the odd-numbered layers being oriented horizontally and the even-numbered layers being oriented at a slight incline. In this instance, it proceeds until there are 5 layers of parallel ties 14, with each new layer being stacked above the previous layer. On top of the top layer 30 of parallel ties 14, one or more perpendicular ties may be placed if desired. (It is not required.) FIG. 1 shows two perpendicular ties, one on top of each end of the top layer 30 of parallel ties 14. If only one perpendicular tie is used and more layers of parallel ties 14 are placed on top, the result is a taller German stack than the "conventional" 5-layer stack. If two perpendicular ties are used, additional German stacks may be stacked on top of each other by means of equipment such as a forklift truck (not shown).

Figure 3:
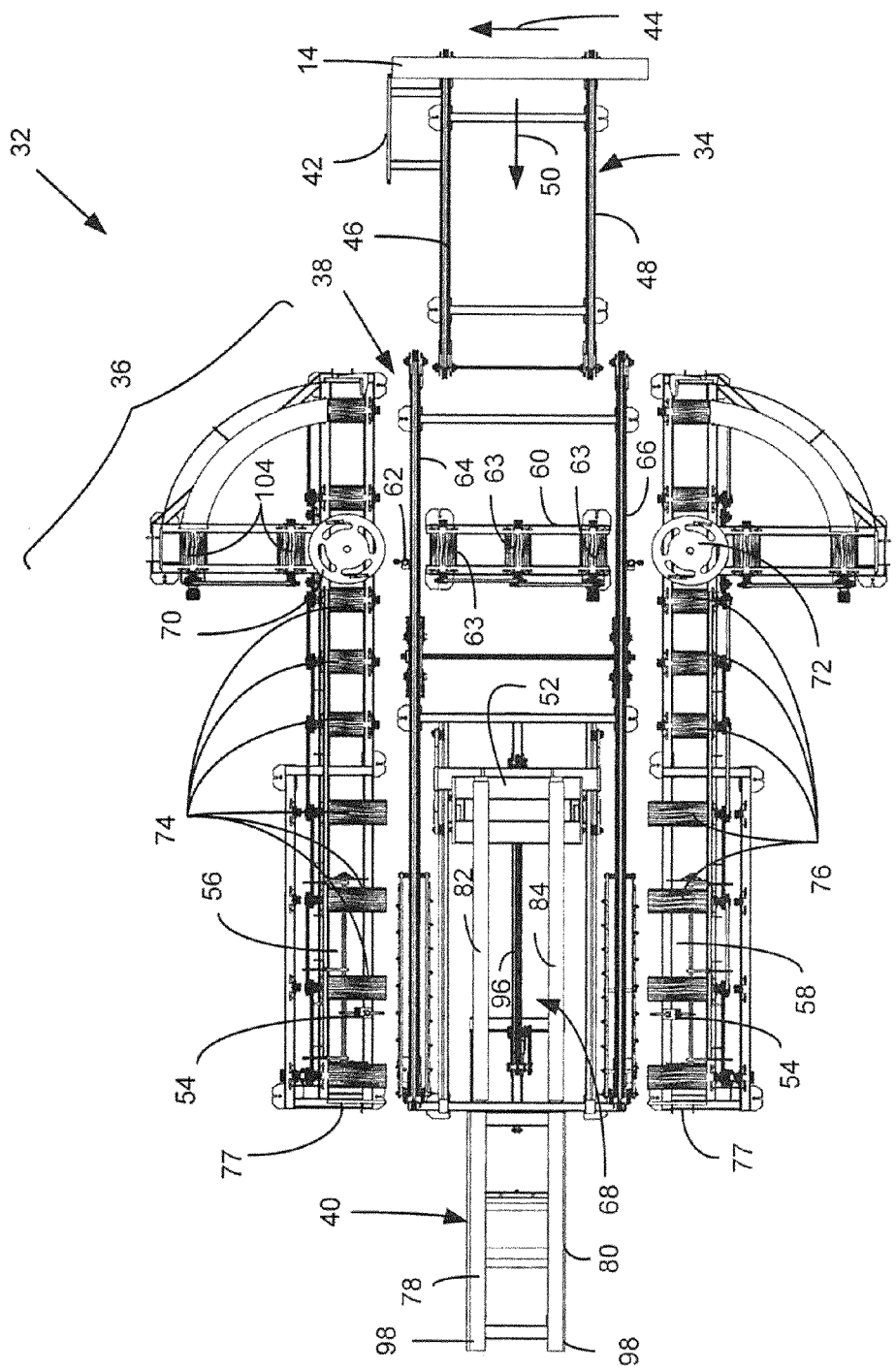
FIG. 3 is a plan view of one embodiment of a railroad tie stacker, with a first tie arriving at the tie alignment and feed conveyor.

FIGS. 3-29 show a first embodiment of a railroad tie stacker 32. Referring to FIG. 3, beginning on the right side of the figure (the upstream end) and progressing toward the left side of the figure (the downstream end), the stacker 32 includes a tie alignment and feed conveyor 34, a side feed roll and rotator station 36, a tie accumulation chain deck 38, and a stack accumulation lift 40.

Referring to FIG. 3, the tie alignment and feed conveyor 34 includes a tie alignment stop 42 to stop the movement of the tie 14 in the direction of the arrow 44 which is the direction in which the ties are moved toward the tie alignment and feed conveyor 34 from the sawmill (not shown). The tie alignment and feed conveyor 34 includes two parallel, driven conveyor chains 46, 48, which carry the ties 14 from the alignment stop 42 downstream in the direction of the arrow 50. When a tie 14 is stopped by the tie alignment stop 42 on the tie alignment and feed conveyor 34, the tie 14 is properly aligned in the left-to-right direction to be conveyed downstream by the chains 46, 48, in the direction of the arrow 50, toward the tie accumulation chain deck 38.

The tie accumulation chain deck 38 has two parallel conveyor chains 64, 66, which convey ties 14 downstream. It also includes a side feed roll and rotator station 36 (located on the upstream portion) and a stack layer lift 52 (located on the downstream portion, or layer accumulation station 68).

The rotator station 36 includes a side feed roll 60, located between the two conveyor chains 64, 66, and there is a sensor 62 adjacent to the side feed roll 60, which indicates to the controller when a tie is located on top of the side feed roll 60.

Sensors (not shown) near the downstream end of the tie accumulation chain deck 38 are used to determine whether "perpendicular" ties 14P (See FIGS. 11 and 14) are present in the tie push-off stations 56, 58 of the tie accumulation chain deck 38. The sensors may be optical sensors, weight cell sensors, or other sensors that detect the presence or absence of the perpendicular ties 14P. In this particular embodiment, they are optical sensors, with a light shining down from above and reflected back from reflectors located below the chain deck 38. When a tie 14P is in the push-off station, light no longer is reflected back, so the optical sensor signals the controller to indicate the presence of a tie 14P in that position.

As explained in more detail later, if one or both of the perpendicular ties 14P are missing from the tie push-off stations 56, 58 (as ascertained by the sensors) then, when a tie 14 advancing on the tie accumulation chain deck 38 passes over the side feed roll 60, and the sensor 62 signals the controller to let it know that there is a tie 14 located above the side feed roll 60, the controller will raise the side feed roll 60 (See also FIGS. 6 and 7) so as to raise the tie 14 high enough to disengage it from the conveyor chains 64, 66 of the tie accumulation chain deck 38.

Once the tie 14 is raised slightly, it is fed laterally by the rollers 63 of the side feed roll 60 to one of the tie-rotator stations 70 or 72 which rotates the tie 90 degrees so it is directed in the upstream-to-downstream direction and then places it on a respective set of conveyor rollers 74, 76, which convey it downstream toward the corresponding tie push-off station 56, 58. Once the perpendicular tie 14P arrives at its left or right tie push-off station 56 or 58, the respective proximity sensor signals the arrival of the perpendicular tie 14P to the central controller, which de-energizes the corresponding conveyor rollers 74, 76.

Figure 14:
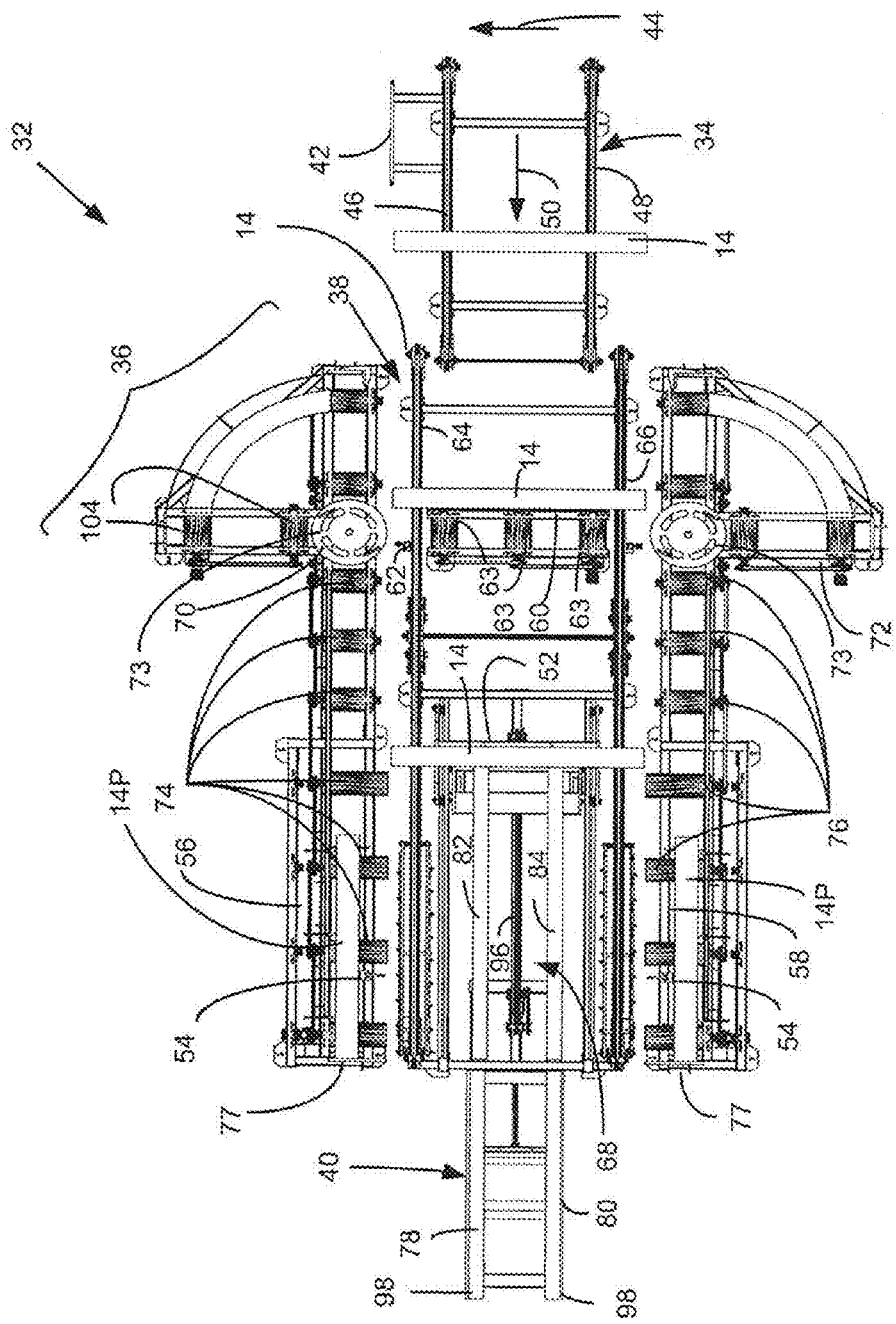
FIG. 14 is a plan view, similar to FIG. 13, but with the second perpendicular tie fully moved forward toward the layer accumulation station of the stack layer lift, in preparation for the tie push-off arms to place this perpendicular tie atop the stack; the third tie moving forward toward the layer accumulation station of the stack layer lift, the fourth tie arriving at the side feed roll and rotator station, and fifth tie moving along toward the tie accumulation chain deck.

If both the left and right tie push-off stations 56, 58 have perpendicular ties 14P, as shown in FIG. 14, then additional ties 14 traveling along the tie accumulation chain deck 38 proceed downstream, being carried along by the conveyor chains 64, 66, to the layer accumulation station 68 where they are aligned in a parallel, spaced-apart relationship to each other until there are nine parallel, left-to-right directed, spaced-apart ties 14 in the layer accumulation station 68. Once the ninth parallel tie 14 is in place, a first perpendicular tie 14P is pushed off of the left or right tie push-off station 56 or 58 (See FIG. 17) and on top of the respective left or right end of the nine parallel, spaced-apart ties 14 to complete an "assembly layer" of ties 14 made up of the 9 parallel left-to-right directed ties 14 with a tenth perpendicular upstream-to-downstream directed tie 14P on top of one end of the parallel ties. At this point, the "assembly layer" of nine left-to-right directed parallel ties 14 with one perpendicular upstream-to-downstream directed tie 14P at either the left end or the right end, is picked up by the stack layer lift 52, which raises the assembly layer slightly and moves it further downstream, placing the assembly layer on the left and right arms 78, 80 of the stack accumulation lift 40. The arms 78, 80 are parallel to each other and extend in the same direction as the conveyor chains 64, 66 (the upstream-to-downstream direction).

Once the assembly layer of ties is resting on the arms 78, 80 of the stack accumulation lift 40, the arms 82, 84 of the stack layer lift 52 retract back to the layer accumulation station 68 in preparation to receive the next assembly layer of 9 parallel ties 14 and a perpendicular tie 14P on top of one end of the parallel ties 14. The perpendicular tie 14P alternates sides with each new assembly layer, first coming from the left push-off station 56 and resting at the left end of the parallel ties 14, and then coming from the right push-off station 58 and resting at the right end of the parallel ties 14. (It should be noted that the directions left and right are arbitrarily assigned in this description and could be reversed as long as the terminology is consistent.) Once all five assembly layers of ties 14 have been stacked onto the stack accumulation lift 40, they complete one German stack 10. Note that the last layer of ties 14 typically has two perpendicular ties 14P, one at each end, as shown in FIG. 1, but it may have only one or none, if desired.

In this embodiment, the controller is programmed to keep track of the number of assembly layers that have been loaded onto the stack accumulation lift 40 and to control the push off stations 56, 58 so that both push off stations 56, 58 push perpendicular ties 14P onto the topmost assembly layer of the stack, which, in this embodiment, is the fifth layer.

Figure 4:
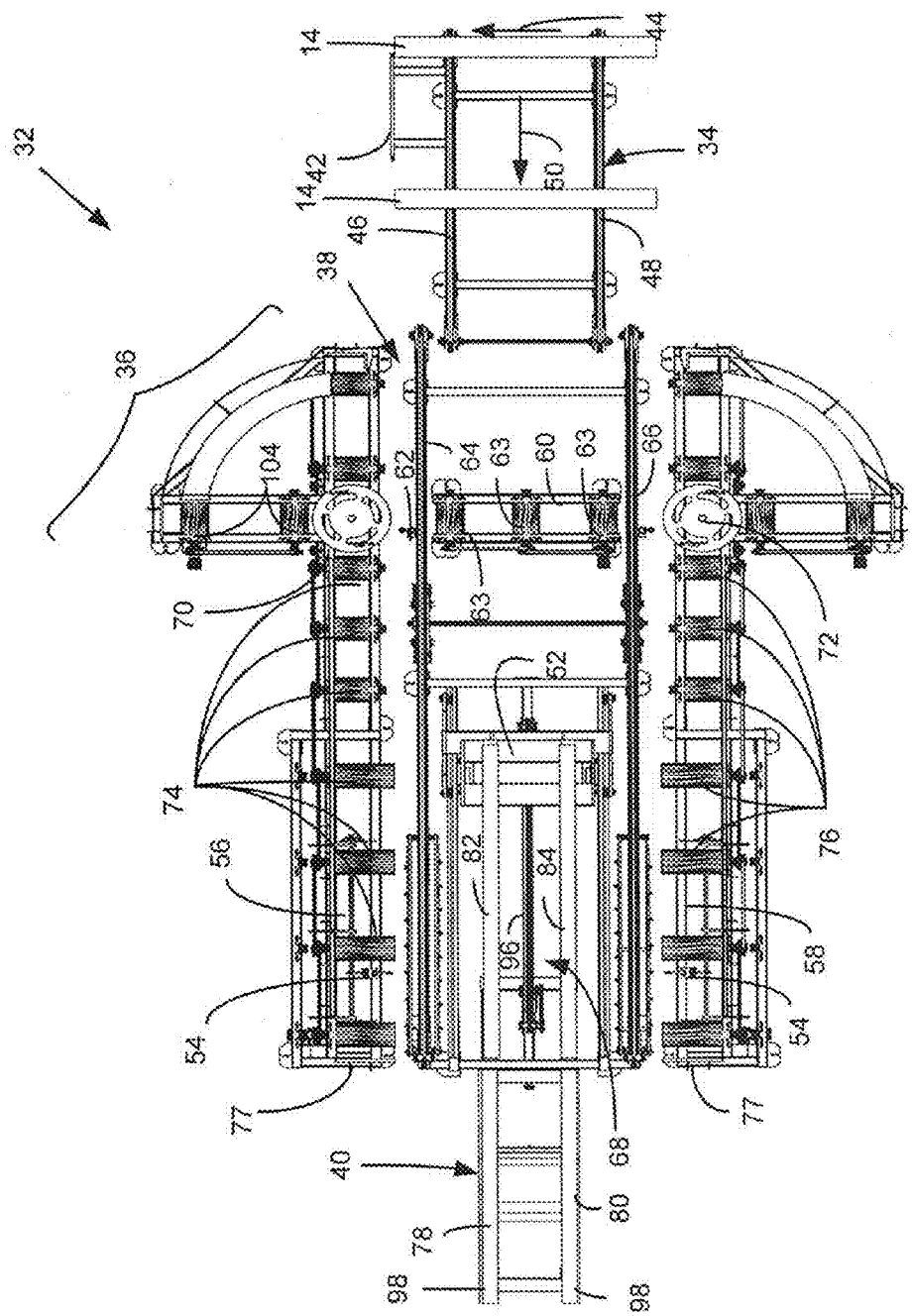
FIG. 4 is a plan view of the railroad tie stacker of FIG. 3 with the first tie moving along toward the tie accumulation chain deck and a second tie arriving at the tie alignment and feed conveyor.

For a more detailed description of the stacking process, refer now to FIG. 4. The ties 14 arrive at the inlet (upstream) end of the railroad stacker 32 (the right side of the page) from the production line, being carried by chain conveyors (not shown) in the direction of the arrow 44 to the tie alignment and feed conveyor 34. When each tie 14 reaches the tie alignment stop 42 on the tie alignment and feed conveyor 34, it is automatically aligned in the left-to-right direction, spanning across and resting on the chains 46, 48, which carry it downstream, in the direction of the arrow 50, until it is transferred onto the conveyor chains 64, 66 of the tie accumulation chain deck 38.

Figure 5:
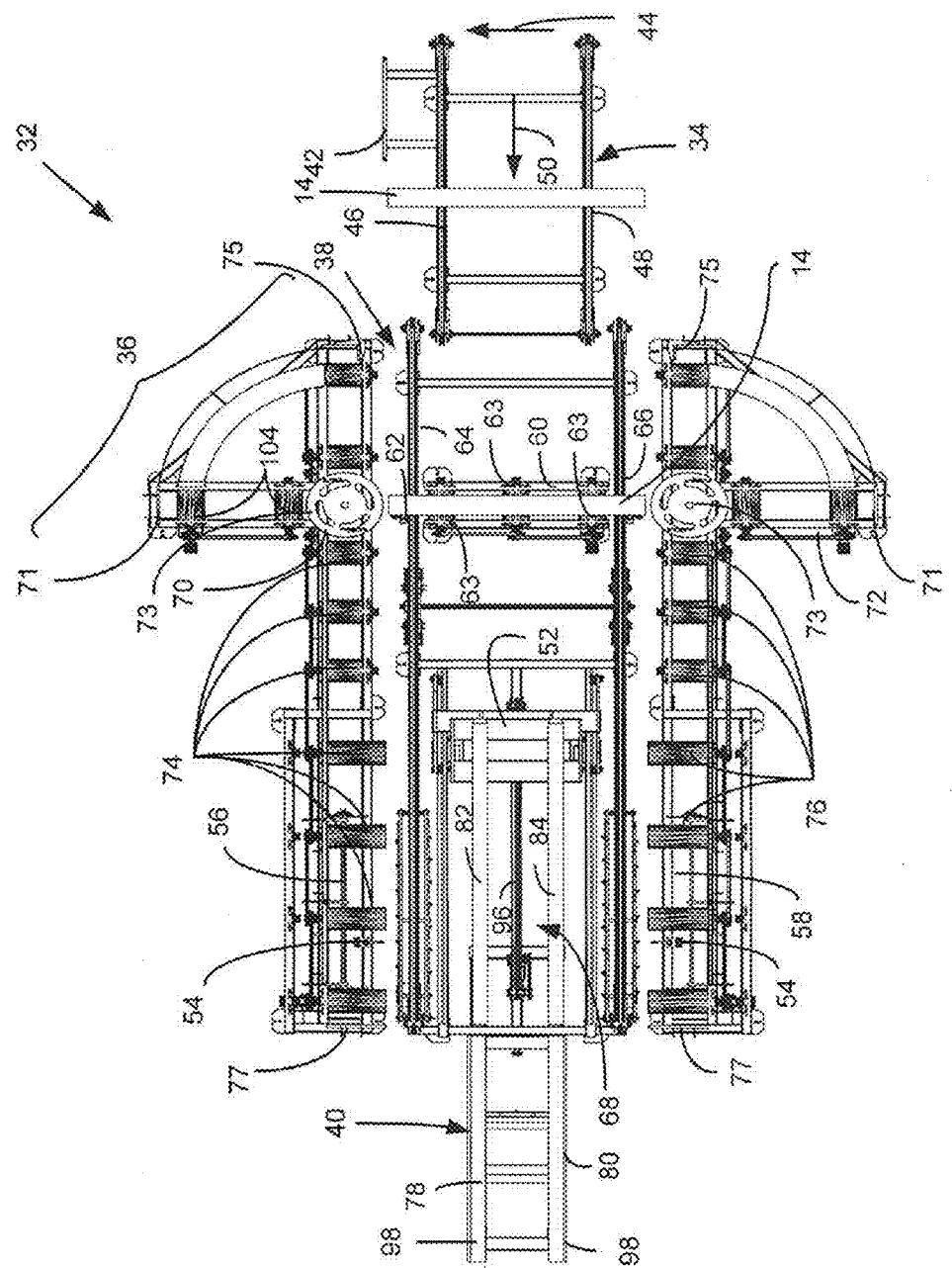
FIG. 5 is a plan view, similar to FIG. 4, but with the first tie having arrived at the side feed roll and rotator station as the second tie moves toward the tie accumulation chain deck.

FIG. 5 shows the first tie 14 as it reaches the side feed roll assembly 60 on the tie accumulation deck 38. The sensors 62 on the side feed roll assembly 60 sense the presence of the first tie 14 and send a signal to the controller indicating that a tie 14 is located on the conveyor chains 64, 66 above the side feed roll assembly 60.

Since there are no perpendicular ties 14P at the tie push-off stations 56, 58, the sensors at the push-off stations 56, 58 are sending signals to the controller indicating the absence of perpendicular ties 14P.

The controller, having received the information that perpendicular ties 14P are needed at the push-off stations 56, 58, and receiving the information that a tie 14 has reached the side feed roll assembly 60, causes the side feed roll assembly 60 to be raised (See FIGS. 6 and 7), picking up the first tie 14 on the rollers 63 of the side feed roll assembly 60.

Figure 6:
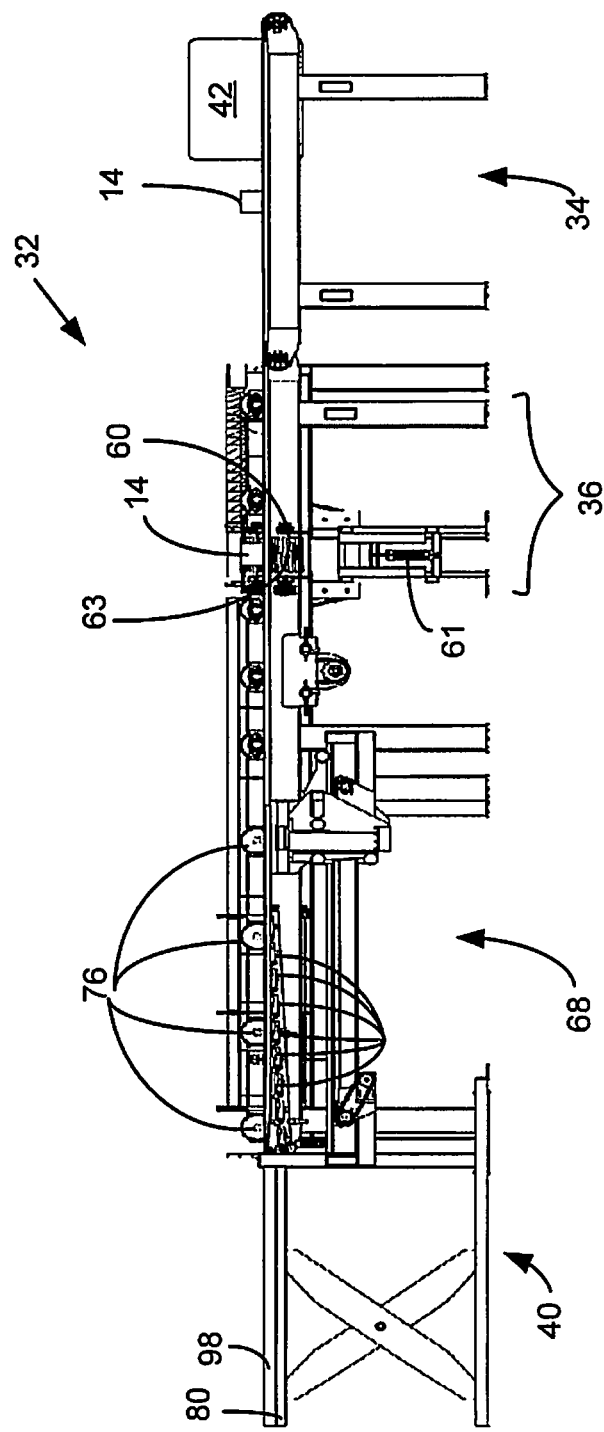
FIG. 6 is a side view of the railroad tie stacker of FIG. 5.
Figure 7:
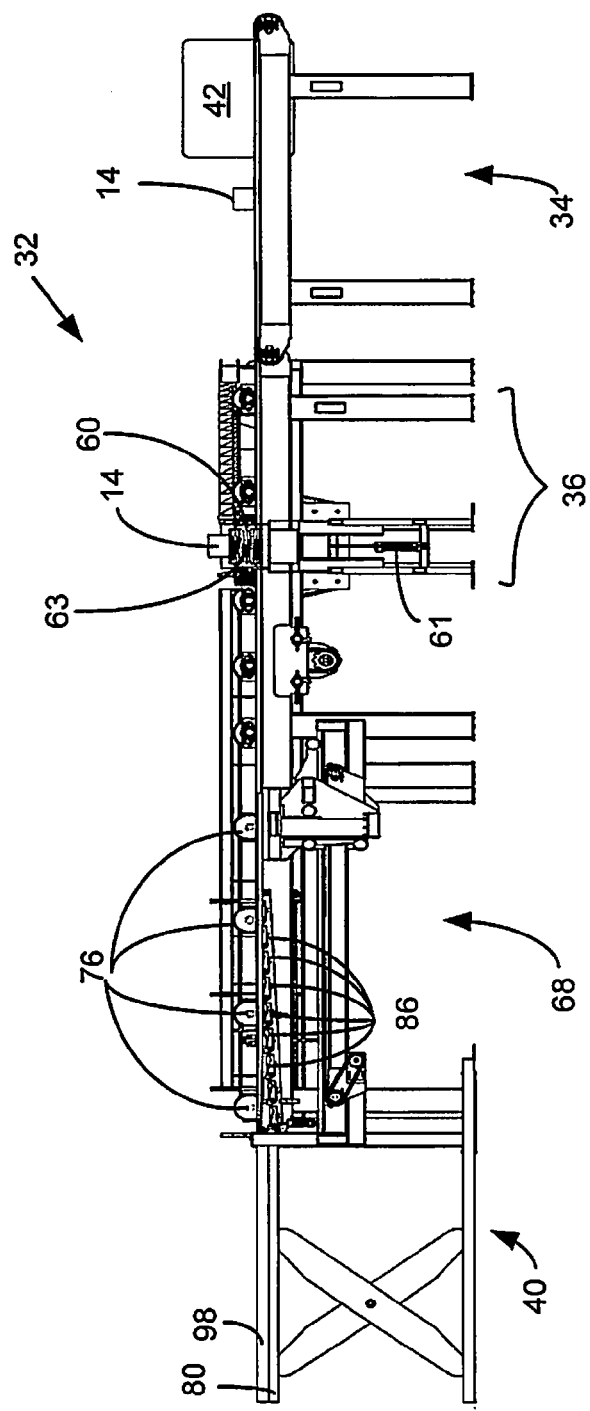
FIG. 7 is a side view, similar to FIG. 6, but showing the first tie having been raised a few inches in preparation for displacing it to one side and rotating it.

FIG. 6 shows the side feed roll assembly 60 in its initial, lowered position, and FIG. 7 shows the side feed roll assembly 60 in its raised position, a few inches above its initial, lowered position. As shown in FIGS. 6 and 7, the side feed roll assembly 60 is raised and lowered using hydraulic cylinders 61, which are controlled by the central controller.

Figure 8:
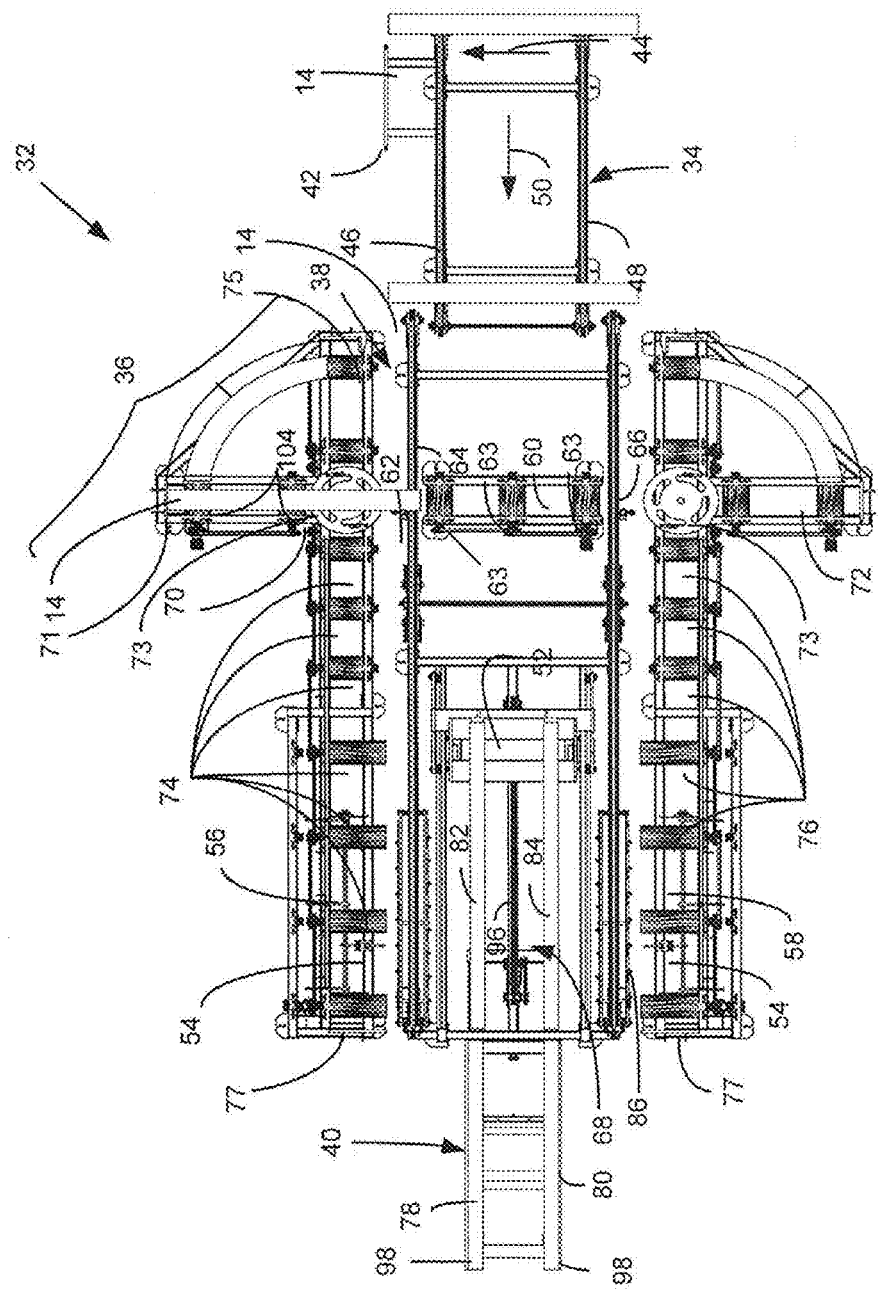
FIG. 8 is a plan view, similar to FIG. 5, but with the first tie fully displaced to one side in preparation for a 90 degree rotation, while the second and third ties move along toward the tie accumulation chain deck.

The side feed roll assembly 60 lifts the tie 14 off of the conveyor chains 64, 66 and then the controller sends power to a drive motor that drives the rollers 63 of the side feed roll assembly 60 in a first direction, so they carry the first tie 14 toward the tie rotator station 70, as shown in FIG. 8. The first tie 14 travels onto the tie rotator station 70 and continues to be driven by rollers 104 until it abuts the end wall 71 of the rotator station 70. Once it contacts the end wall 71, a sensor near the end wall 71 senses that it has reached the end wall 71 and signals the central controller, which then stops driving the rollers 104 and begins driving the rotator wheel 73 at the tie rotator station 70.

Figure 9:
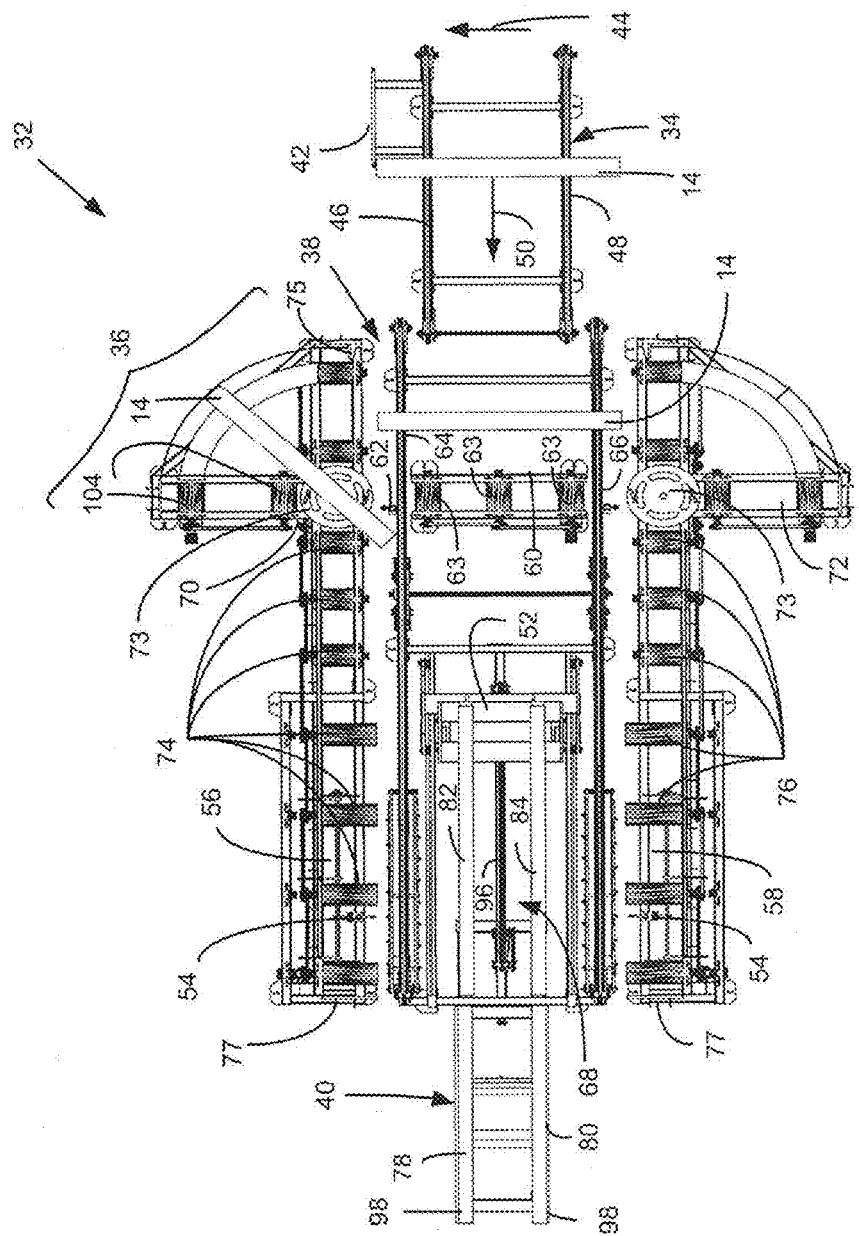
FIG. 9 is a plan view, similar to FIG. 8, but with the first tie in the middle of a 90 degree rotation, while the second and third ties continue moving along toward the tie accumulation chain deck.
Figure 10:
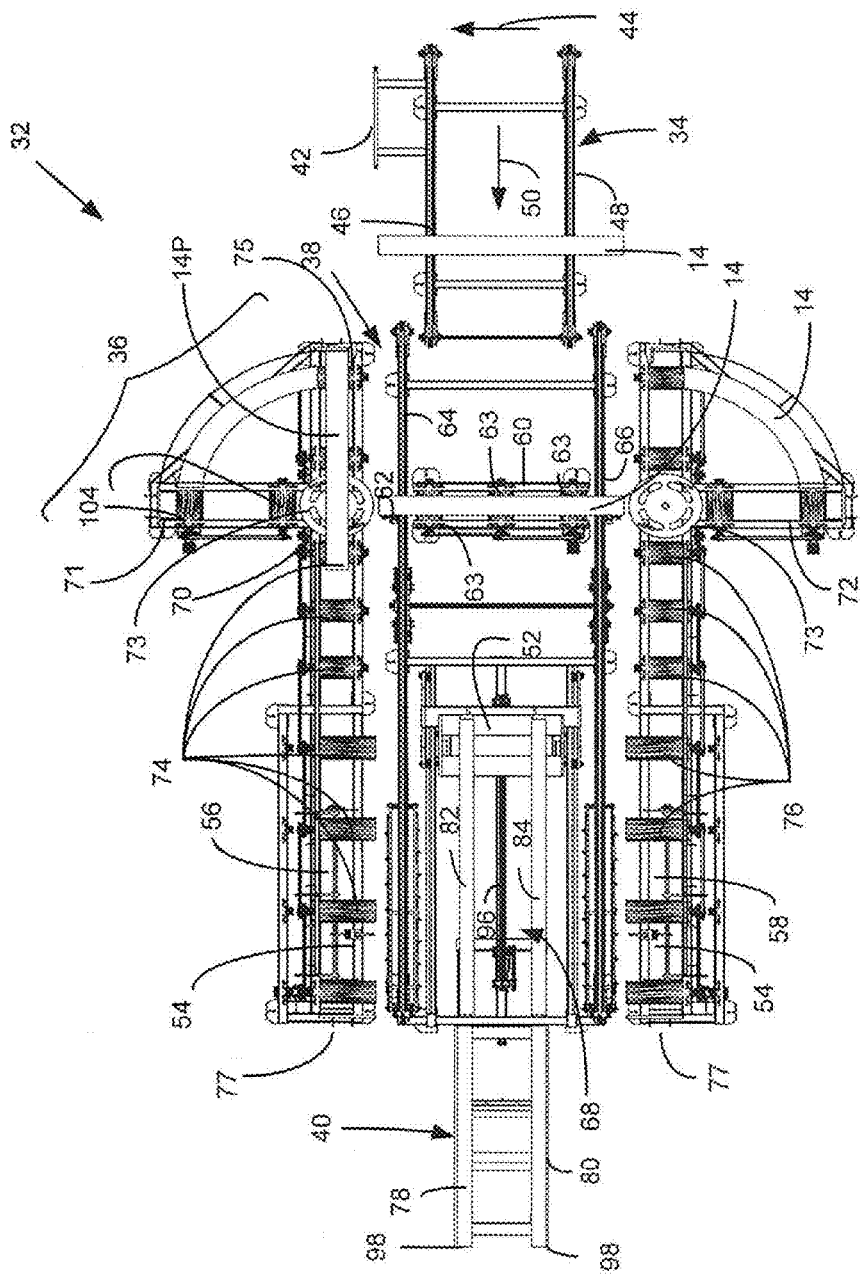
FIG. 10 is a plan view, similar to FIG. 9, but with the first tie fully rotated 90 degrees, while the second tie has arrived at the side feed roll and rotator station, and the third tie moves toward the tie accumulation chain deck.
Figure 11:
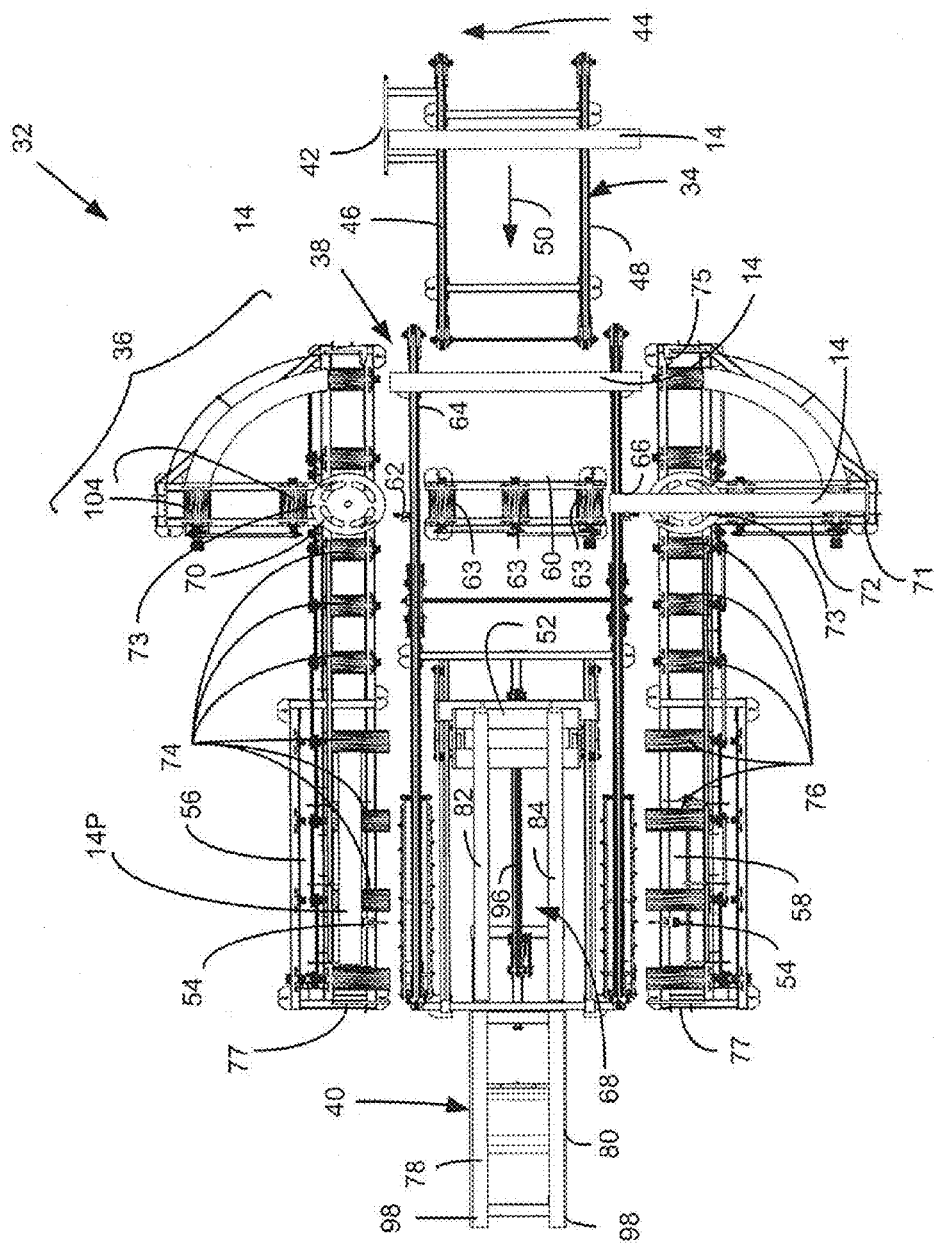
FIG. 11 is a plan view, similar to FIG. 10, but with the first tie fully moved forward toward the layer accumulation station of the stack layer lift, in preparation for the tie push-off arms to place this perpendicular tie atop the stack; while the second tie has been displaced to one side (opposite the side of the first tie) in preparation for its 90 degree rotation, and the third tie moves along toward the tie accumulation chain deck.
Figure 12:
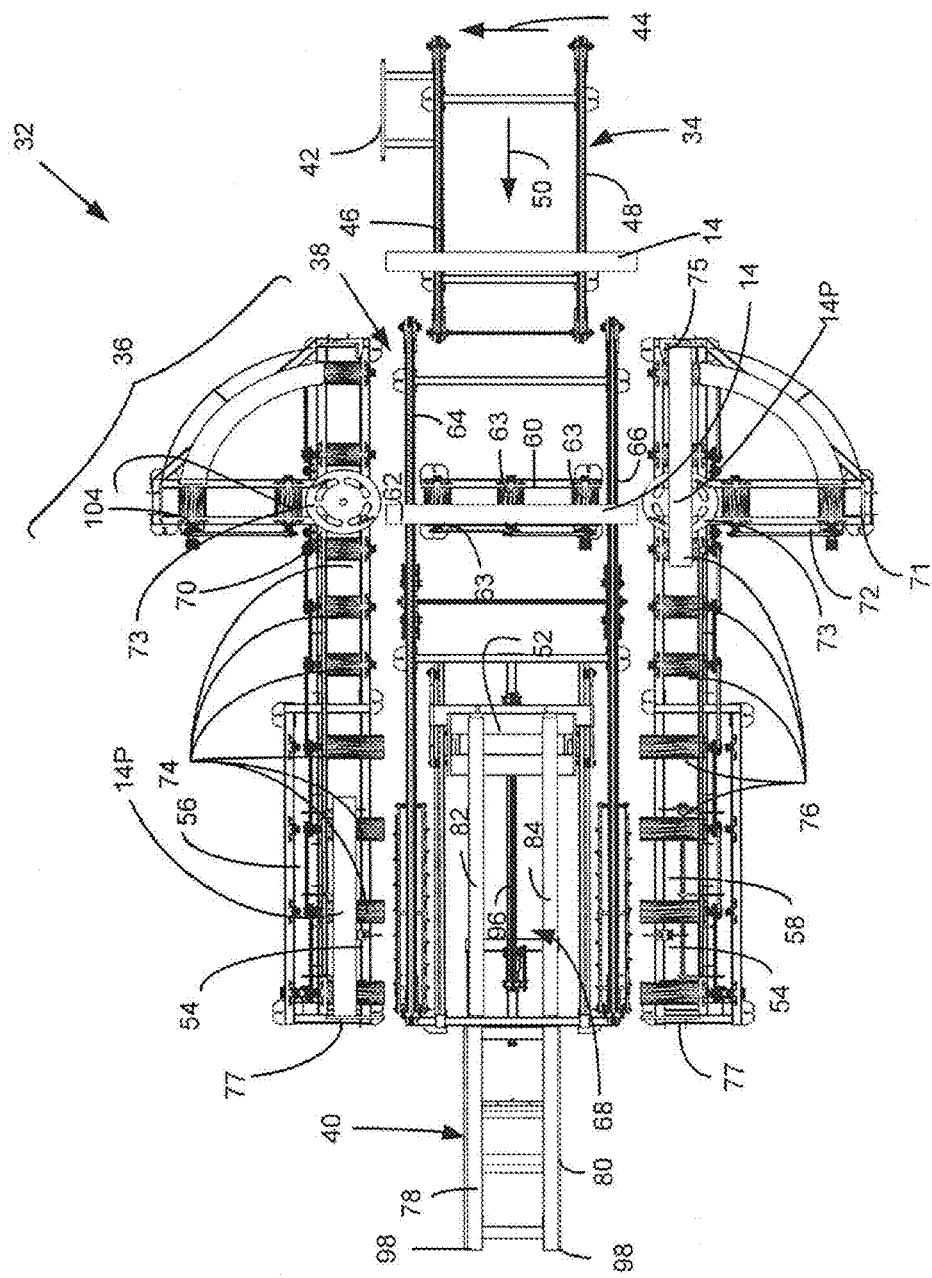
FIG. 12 is a plan view, similar to FIG. 11, but with the second tie fully rotated 90 degrees, while the third tie has gone past the side feed roll and rotator station, and a fourth tie moves along toward the tie accumulation chain deck.

The rotator wheel 73 rotates the first tie 14 ninety (90) degrees clockwise, as shown in FIGS. 9 and 10, until it abuts the end wall 75. A sensor (not shown) at the end wall 75 sends a signal to the controller indicating that the tie 14 has reached that end wall 75. At that point, the controller stops the rotation of the rotator wheel 73 and starts the rotation of the conveyor rollers 74, which carry the now perpendicularly-oriented (upstream-to-downstream oriented) tie 14P toward the downstream end of the left push-off station 56 (see FIG. 11). When the perpendicular tie 14P reaches the downstream end wall 77 of the left push-off station 56, as shown in FIG. 12, a sensor at the end wall 77 sends a signal to the central controller indicating the presence of the tie 14P in that position, and the controller stops the rotation of the rollers 74.

Referring again to FIG. 10, the controller is now causing the second tie 14 to be intercepted by the side feed roll assembly 60, because the central controller knows that a perpendicular tie 14P also is needed at the right side tie push-off station 58. However, in this case, the central controller causes the rollers 63 of the side feed roll assembly 60 to be driven in the opposite direction, sending the second tie 14 to the other tie-rotator station 72 on the right side of the conveyor, as shown in FIG. 11. When the second tie 14 reaches the end wall 71 of the second tie-rotator station 72 (on the right side of the conveyor), the central controller stops the rollers 104 and drives the rotator wheel 73 of the second tie-rotator station 72, which rotates the tie 14 ninety (90) degrees in the counterclockwise direction to the position shown in FIG. 12, where it abuts the end wall 75 of the second tie rotator station 72. At this point, the central controller receives a signal indicating that the tie 14P is now in position, and the controller provides power to drive the rollers 76, which carry the second tie 14P downstream until it reaches the end wall 77 of the second tie push-off station 58.

Figure 13:
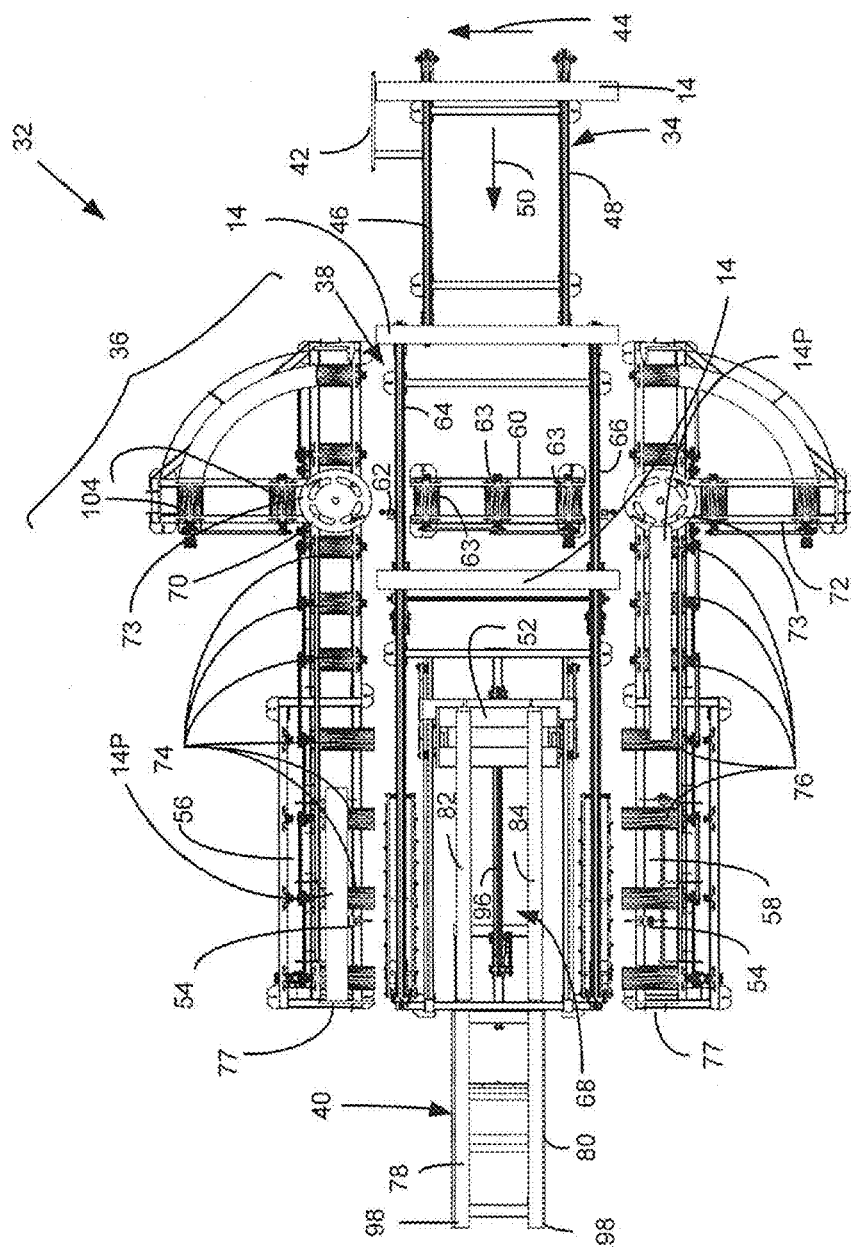
FIG. 13 is a plan view, similar to FIG. 12, but with the second perpendicular tie moving forward toward the layer accumulation station of the stack layer lift, the third tie moving forward toward the layer accumulation station of the stack layer lift, and fourth and fifth ties moving along toward the tie accumulation chain deck.

FIG. 13 shows the second tie 14P travelling in the downstream direction along the rollers 76, and FIG. 14 shows the second tie 14P having reached the end wall 77. When the controller receives a signal indicating that the second perpendicular tie 14P has reached the end wall 77 of the second tie push-off station 58, it causes the rollers 76 to stop rotating.

Figure 15:
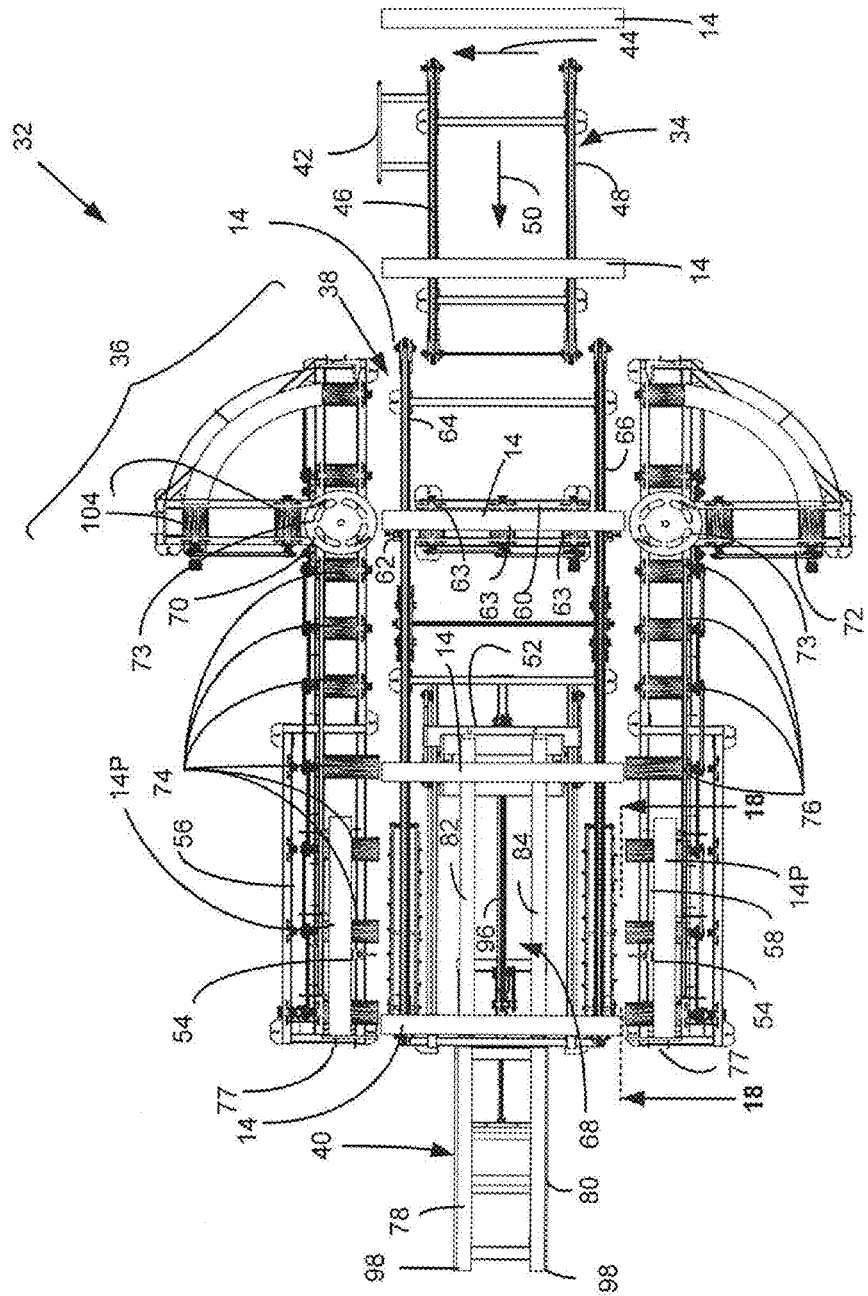
FIG. 15 is a plan view, similar to FIG. 14, but with the third tie having reached the end of the layer accumulation station of the stack layer lift, and with additional ties being conveyed toward the layer accumulation station of the stack layer lift.
Figure 16:
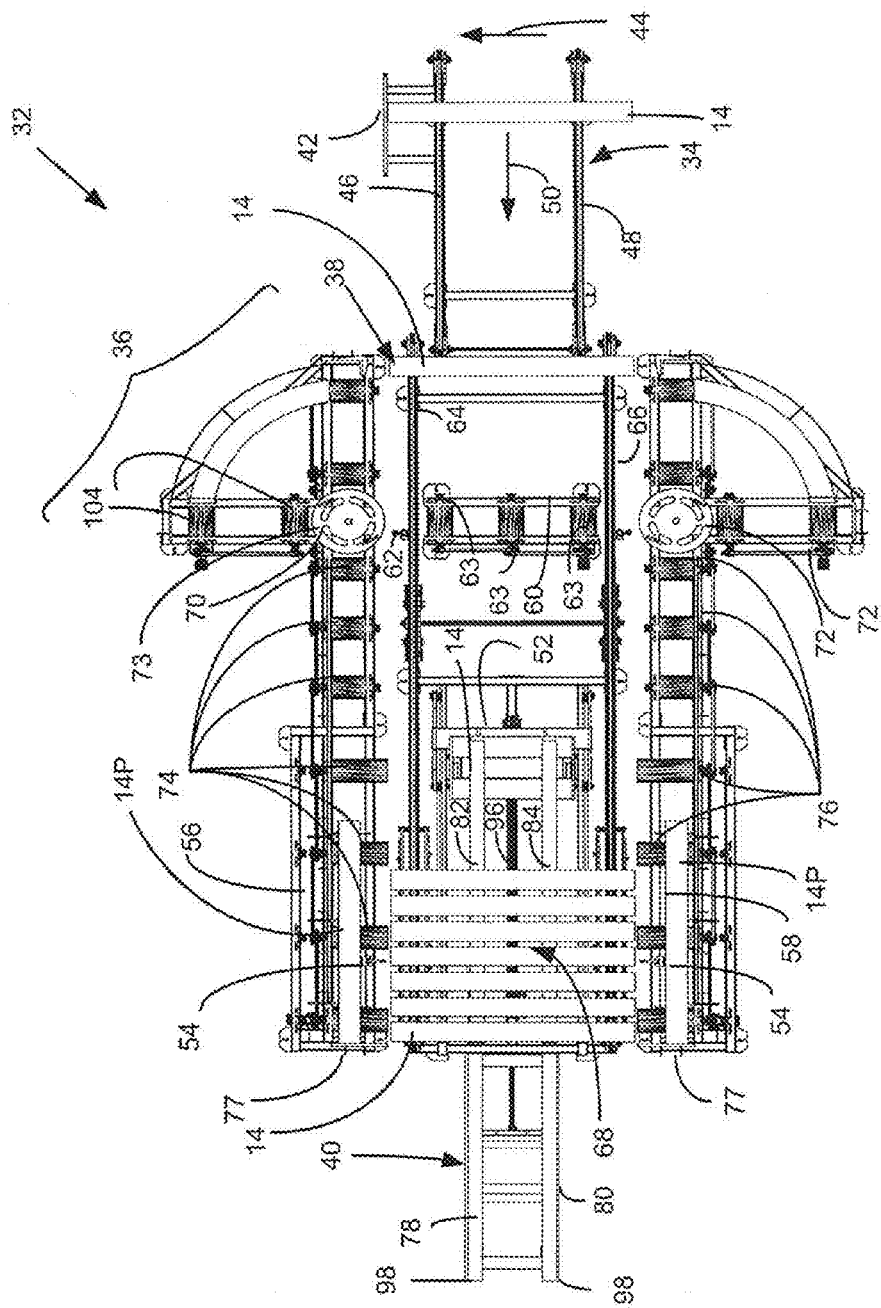
FIG. 16 is a plan view, similar to FIG. 15, but with seven ties aligned in a parallel and spaced-apart position relative to each other in the layer accumulation station of the stack layer lift, while two additional ties are moving along toward the tie accumulation chain deck.
Figure 17:
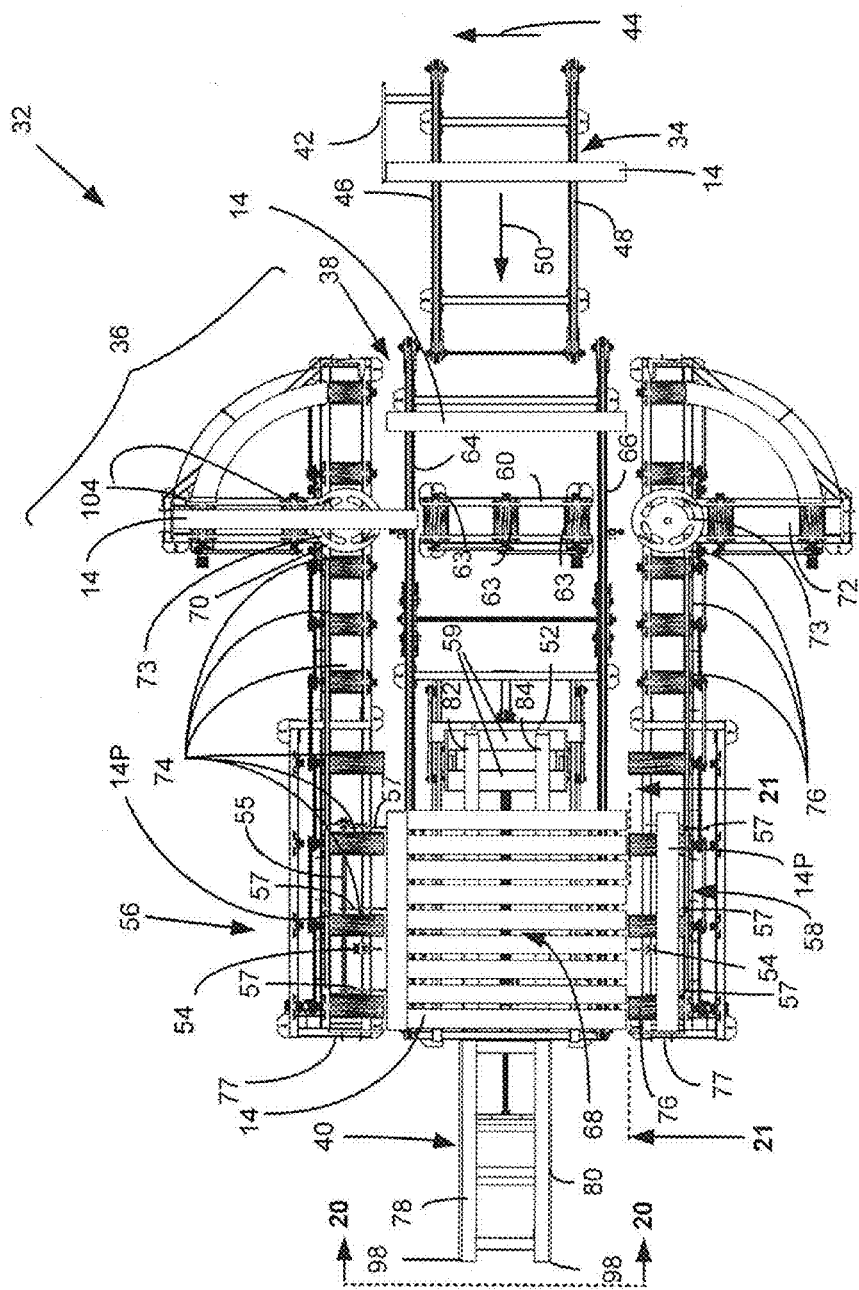
FIG. 17 is a plan view, similar to FIG. 16, but with the first perpendicular tie having been moved by the tie push-off arms to a placement that is perpendicular to the nine parallel and spaced apart ties already on the layer accumulation station of the stack layer lift, and an eleventh tie is being laterally displaced at the side feed roll and rotator station to replace the first perpendicular tie.

Referring still to FIG. 14, the third tie 14 has not been intercepted at the side feed roll assembly 60, because the controller knows that both the left and right tie push-off station 56, 58 have a perpendicular tie 14P. The controller allows the third tie 14 (which is oriented in the left-to-right direction) to be conveyed by the chains 64, 66 past the side feed roll assembly 60, continuing downstream toward the layer accumulation station 68, as shown in FIG. 15. Subsequent left-to-right directed ties 14 are also conveyed to the layer accumulation station 68 as shown in FIG. 16, continuing in this manner until a total of nine left-to-right directed ties 14 are in a parallel and spaced apart relationship to each other. FIG. 17 shows the nine parallel ties 14 with one perpendicular tie 14P placed on top of one end of the parallel ties 14. The spacing apart is accomplished via pivoting spacers 86 as shown in FIGS. 18 and 19 and described below.

The central controller counts the ties 14 as they pass over the sensors 62 at the side feed roll assembly 60, so it knows when nine left-to-right directed ties 14 have passed over the side feed roll assembly 60 toward the layer accumulation station 68. There also is a sensor at the layer accumulation station 68 that indicates to the controller when the ninth parallel tie 14 has been accumulated there.

Figure 18:
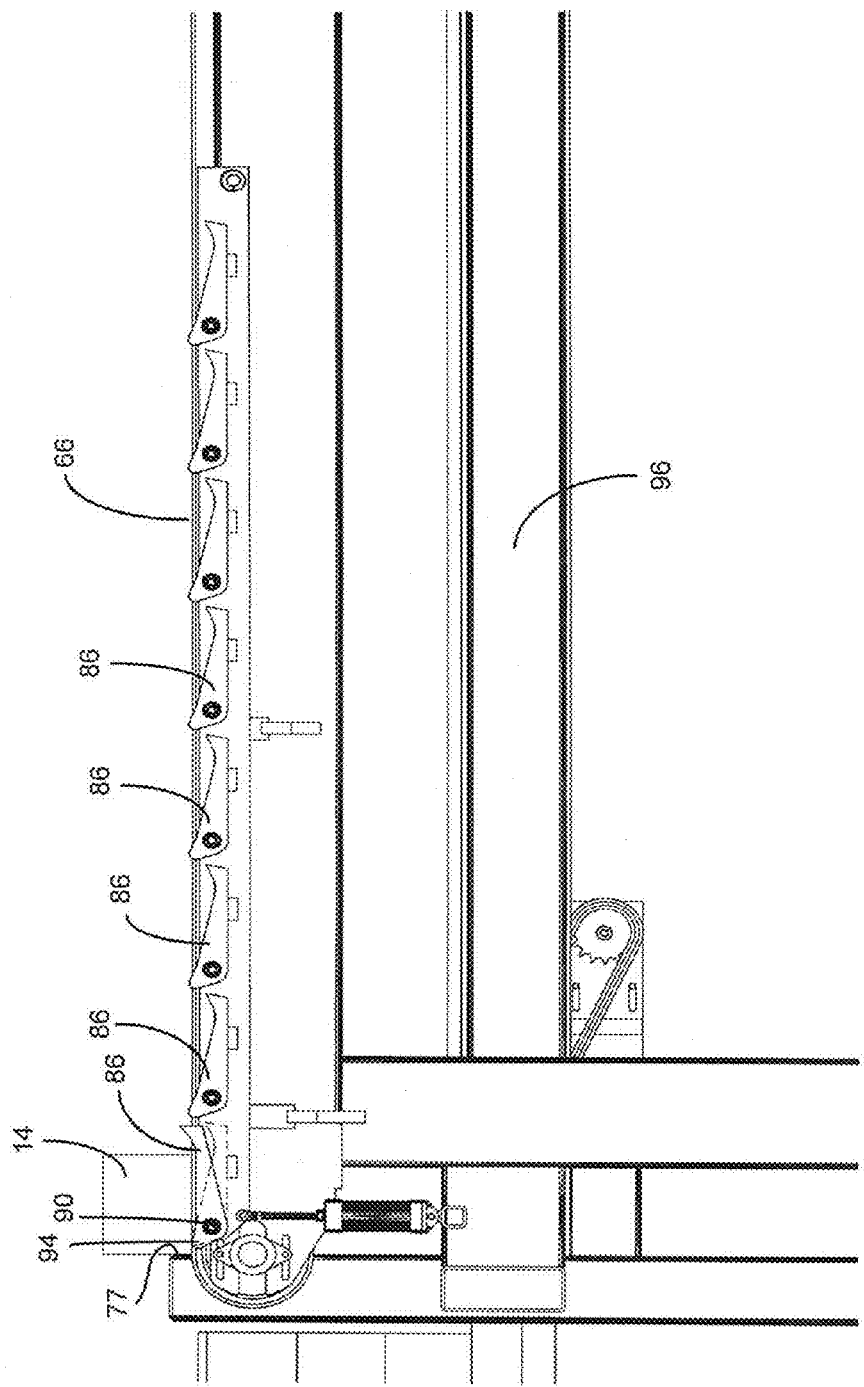
FIG. 18 is a broken-away view along line 18-18 of FIG. 15.

FIG. 18 is a broken-away view along line 18-18 of FIG. 15. Each left-to-right directed parallel tie 14 is conveyed along chains 64, 66 to the layer accumulation station 68 (See FIG. 3). The first of the nine parallel, left-to-right directed ties 14 is conveyed forwardly until it impacts against the end wall or stop 77. In this location the tie 14 rests atop the spacer 86. The spacer 86 functions as an eccentrically mounted shoe 86. The pivot point 90 for the shoe 86 is located near the downstream end 94 of the shoe 86. When the tie 14 reaches the end wall 77, it causes the shoe 86 to pivot about the pivot point 90, such that the upstream end 92 of the shoe 86 is kicked upwardly and functions as a stop for the next tie 14. The "at rest" position of the first shoe 86 is shown in phantom in FIG. 18, and its pivoted position is shown in solid lines.

Figure 19:
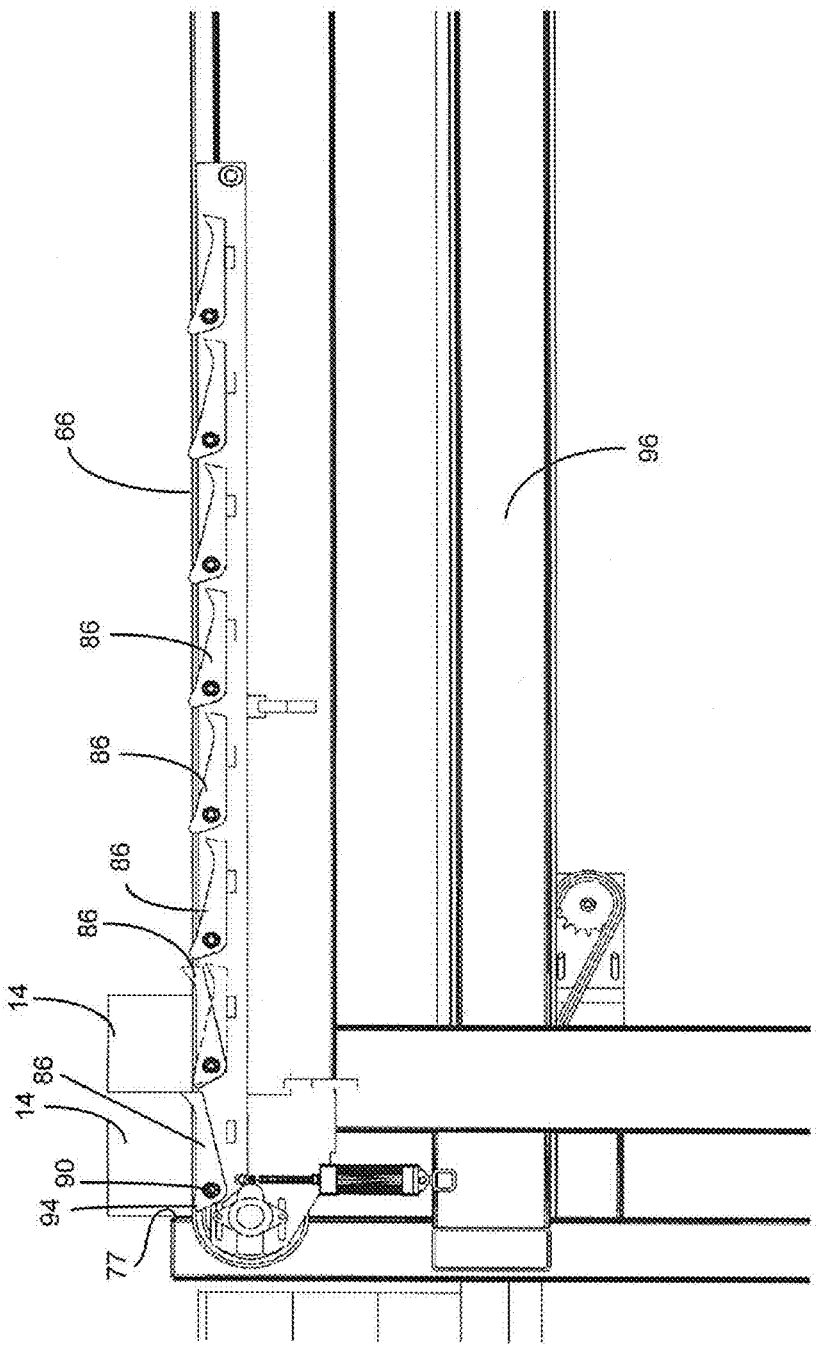
FIG. 19 is broken-away view, similar to FIG. 18, but showing a second tie in a parallel and spaced-apart relationship to the first tie.

FIG. 19 shows the most downstream shoe 86 serving as a stop for the second left-to-right directed parallel tie 14 as it arrives. The most downstream shoe 86 stops the second left-to-right directed parallel tie 14 in a position that is spaced-apart from the previous tie 14, and the second parallel tie 14 in turn pivots the second shoe 86 so the second shoe 86 stops the third parallel tie 14. There are eight shoes 86 placed end-to-end adjacent to the downstream end of each of the chains 64, 66, and each of the parallel ties 14 causes its respective shoe 86 to pivot in order to provide a stop for the subsequent parallel tie 14 in order to provide the proper spacing for the nine parallel ties 14 as they arrive. Once the controller knows that all nine of the parallel ties 14 in the stack layer have been accumulated, it causes the left push-off station 56 to place a perpendicular tie 14P on top of the left end of the nine parallel ties 14 as shown in FIG. 17 to form a "tie assembly", which will then be moved from the layer accumulation station 68 to the stack accumulation lift 40 using the stack layer lift 52.

Looking in more detail at the left tie push-off station 56 of FIG. 17, it can be seen that there is a piston 54, which is connected to a pair of parallel cross-bars 55 that extend parallel to the conveyor chains 64, 66. Three vertical pusher rods 57 are connected to the inner cross-bar 55 by means of horizontal bars which extend through the outer cross-bar 55. As the piston 54 moves in and out, it moves the inner cross-bar 55 and the three vertical pusher rods 57 in and out. The rollers 74 of the push-off station 56 are at an elevation that is higher than the elevation of the top of the nine parallel ties 14 that have been accumulated in the accumulation area 68. (This is the same elevation to which the rollers 63 of the side feed roll assembly 60 lifted the tie 14 to move it onto the side feed roll and rotator station 36.)

When it is time to move the first perpendicular tie 14P on top of the left end of the nine parallel ties 14 that have been accumulated, the controller causes the piston 54 of the push-off station 56 to move the inner cross-bar 55 inwardly, so that the vertical pusher rods 57 contact the outer edge of the first perpendicular tie 14P and push it inwardly (to the right) until it slides off of the inner ends of the rollers 74 and onto the left ends of the nine parallel ties 14, as shown in FIG. 17. A similar procedure will be used by the right push-off station 58, when it pushes its respective perpendicular tie 14P on top of right end of the respective layer of nine parallel ties. However, as shown in FIG. 17, at this point the second perpendicular tie 14P remains on its rollers 76 on the second push-off station 58, waiting for its turn.

Figure 20:
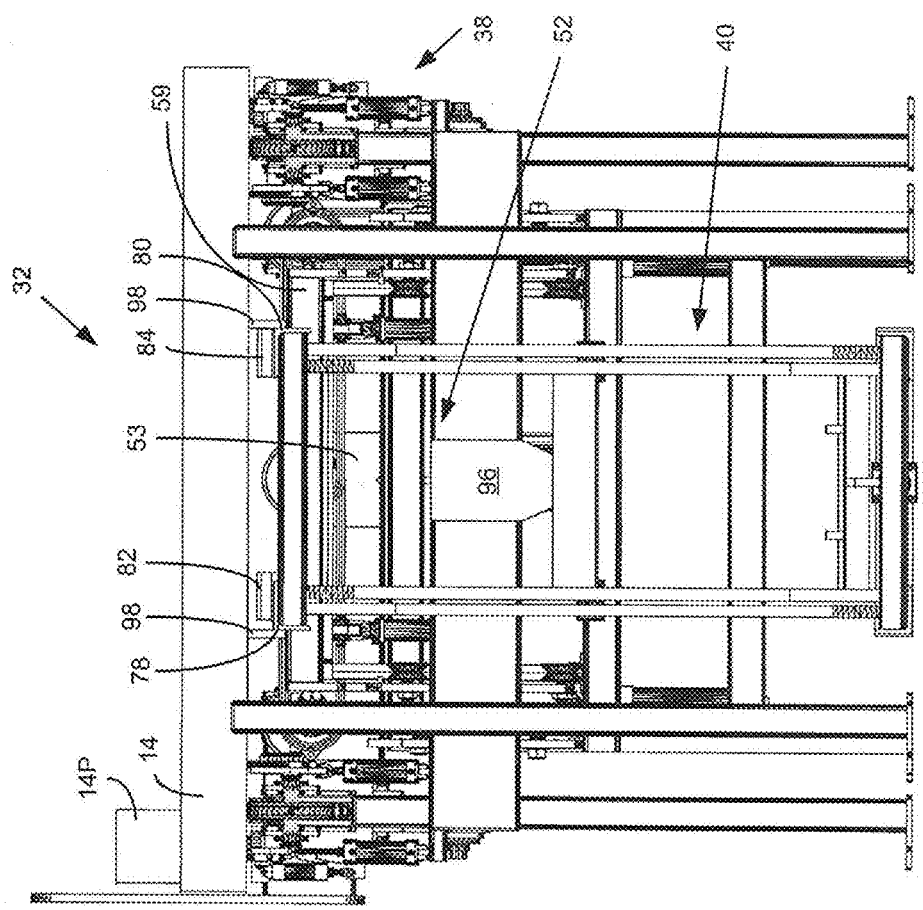
FIG. 20 is a left end view along line 20-20 of FIG. 17.
Figure 21:
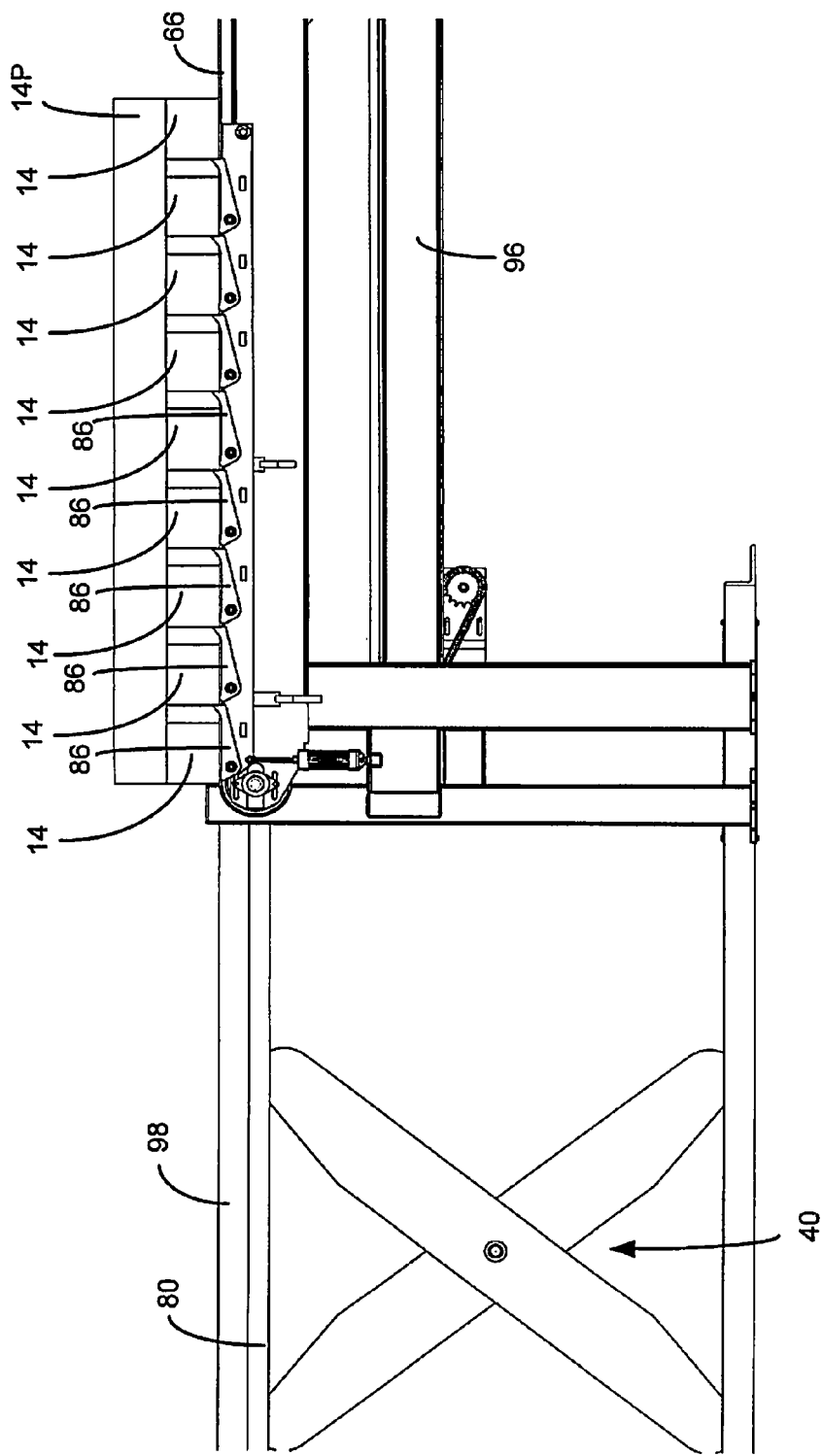
FIG. 21 is a broken-away view along line 21-21 of FIG. 17.

FIG. 20 is view along line 20-20 of FIG. 17, looking upstream from the downstream end of the stack accumulation lift 40, and FIG. 21 is a broken-away view along line 21-21 of FIG. 17. In these views, the arms 82, 84 of the stack layer lift 52 are in their lowered position, not quite making contact with the bottom surfaces of the ties 14 of the "tie assembly" (which includes the nine left-to-right oriented parallel ties 14 with the one perpendicular upstream-to-downstream oriented tie 14P on top).

The stack layer lift 52 includes a tower 53 (See FIG. 20) mounted on a beam 96 for travel in downstream and upstream directions. A top platform 59 may be raised a few inches for travel in the downstream direction and then lowered when retracting in the upstream direction, as described in more detail later. The arms 82, 84 of the stack layer lift 52 are cantilevered in the downstream direction off of the top platform 59.

Figure 22:
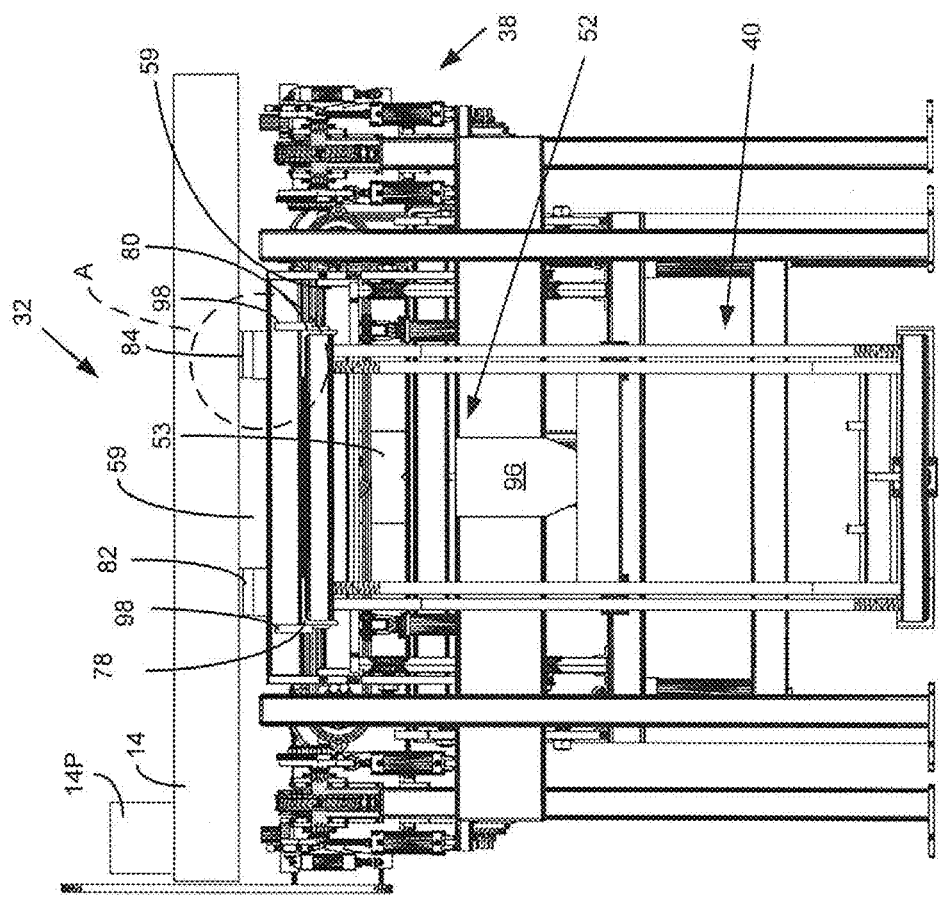
FIG. 22 is a view, similar to FIG. 20, but with the first layer of ties slightly raised in preparation for its forward transportation to the stack accumulation lift.
Figure 23:
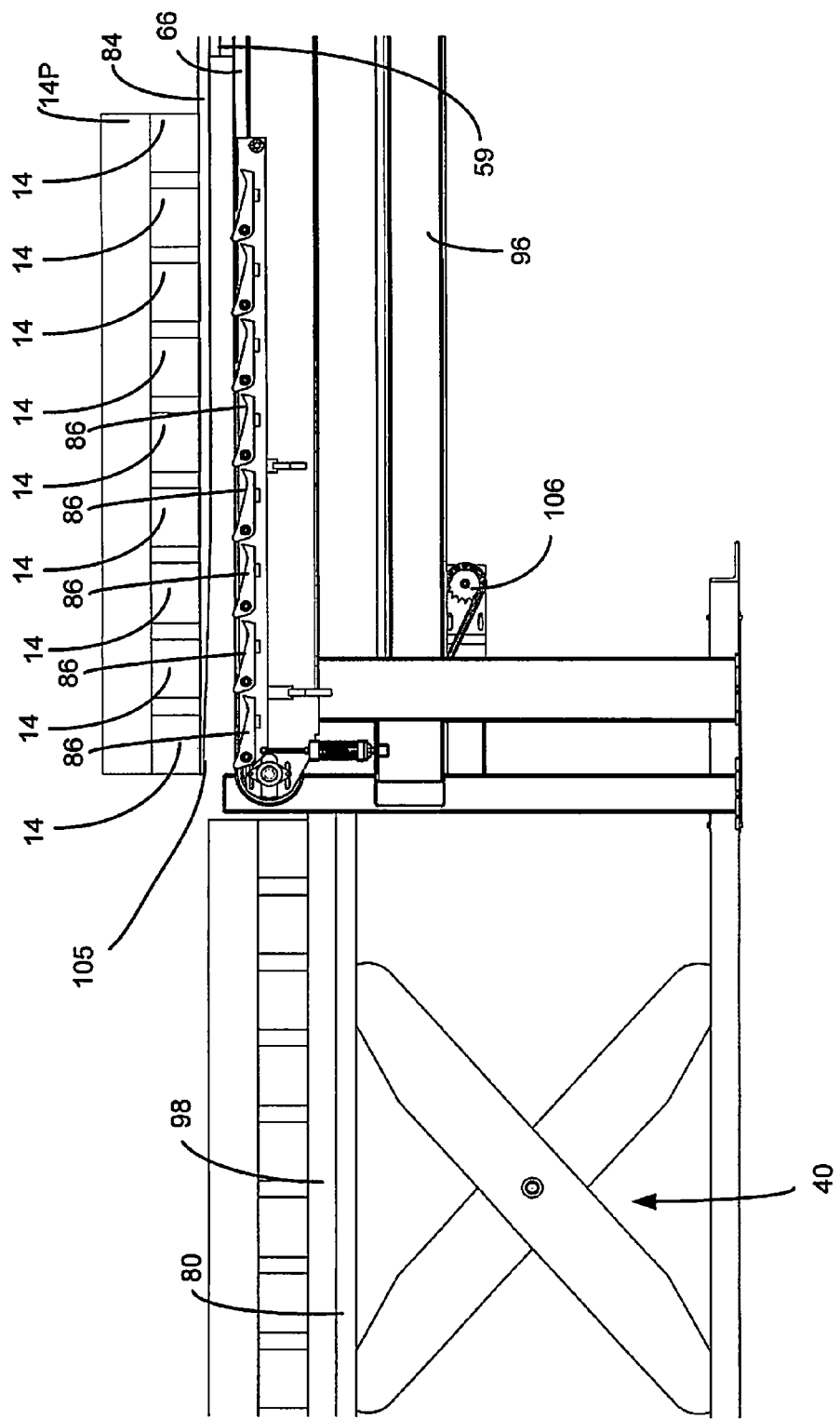
FIG. 23 is a view, similar to FIG. 21, but corresponding to the raised position of the ties of FIG. 22.

Once the perpendicular tie 14P is pushed onto the left end of the nine parallel ties 14 (as shown in FIG. 17), the controller causes the arms 82, 84 of the stack layer lift 52 to rise so as to make contact with and elevate the tie assembly, as shown in FIGS. 22 and 23. It can be seen in FIG. 23 that the bottom surface of each of the arms 82, 84 is tapered upwardly toward the downstream end 105 so that the bottom surface of the arms 82, 84 at the downstream end 105 is at a higher elevation than the remainder of the bottom surface of the arms 82, 84. The top surfaces of the arms 82, 84 are flat and level from the upstream to the downstream end 105 (See FIG. 23), so that the entire top surfaces of the arms 82, 84 are at the same elevation.

Figure 24:
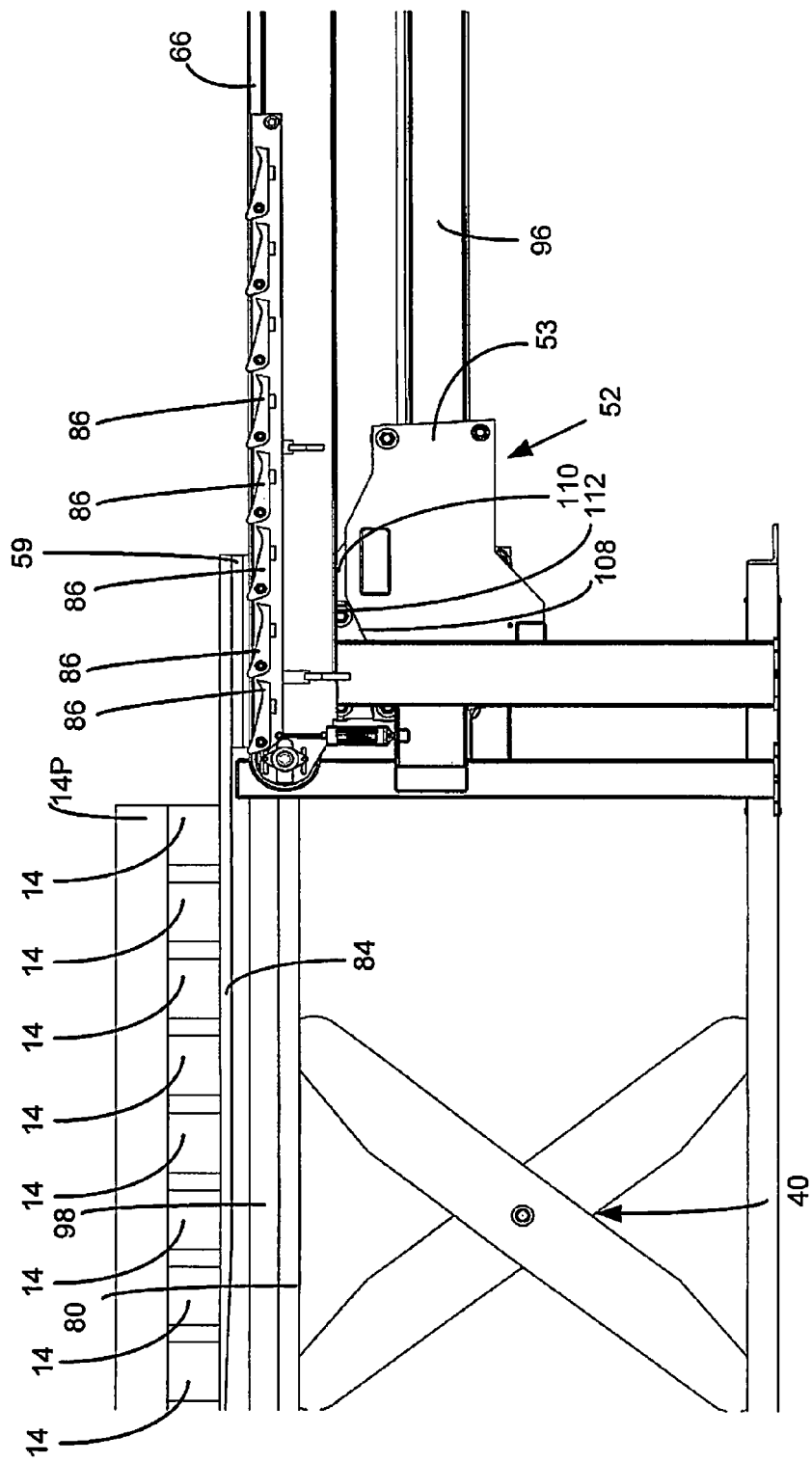
FIG. 24 is a view, similar to FIG. 23, but showing the ties moved forward by the stack layer lift, from the layer accumulation station to the stack accumulation lift.
Figure 25:
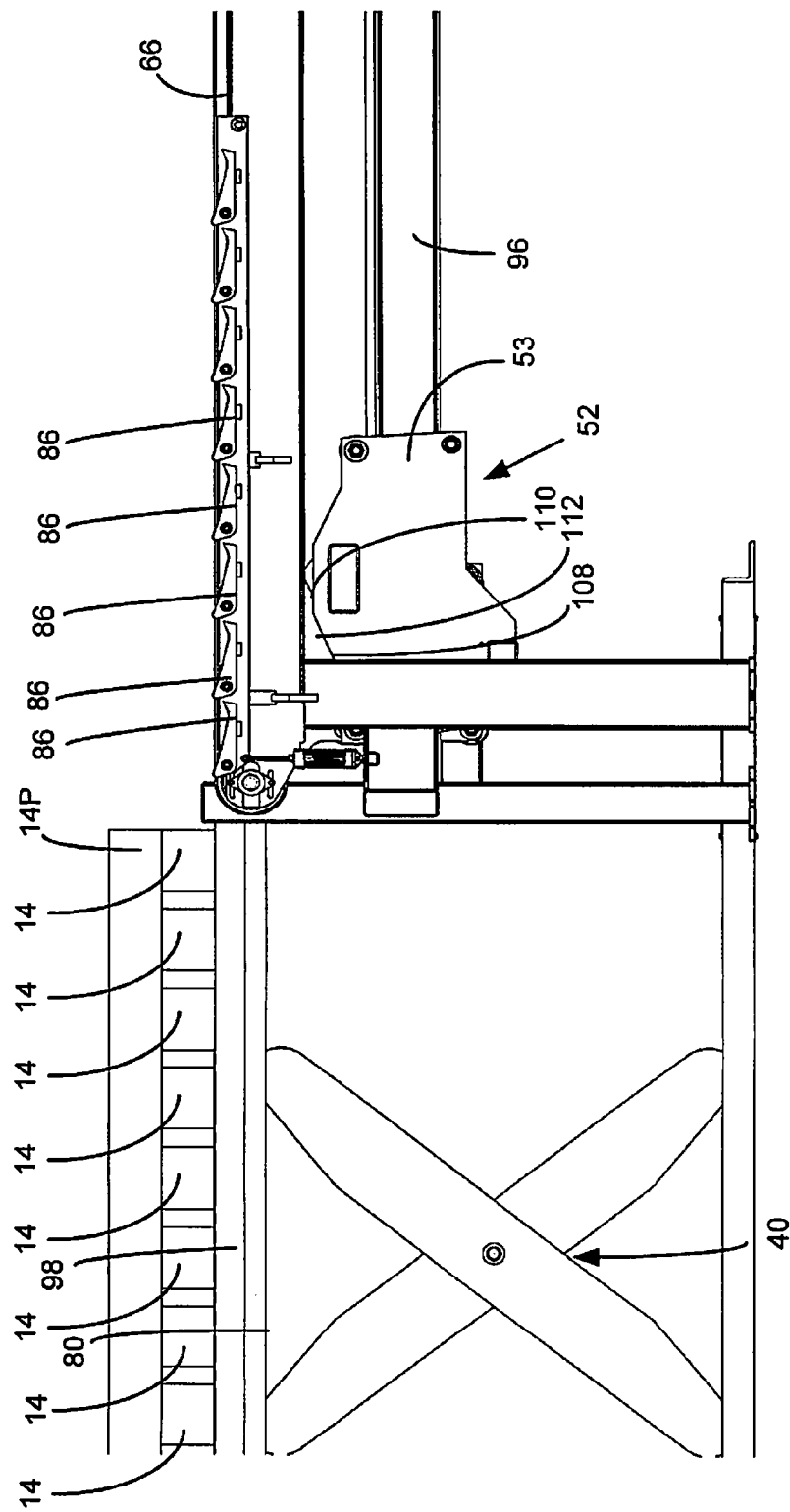
FIG. 25 is a view, similar to FIG. 24, but showing the layer of ties lowered onto the stack accumulation lift and before the stack layer lift has retracted back to the layer accumulation station.

Once the arms 82, 84 have been raised, lifting the stack layer up off of the chains 64, 66, the controller causes the arms 82, 84 of the stack layer lift 52 to travel forward, in the downstream direction, on the horizontal structural member 96 (See FIGS. 3, 23, and 24) until the tie assembly layer is positioned above the stack accumulation lift 40. As described earlier, the cantilevered arms 82, 82 are secured to the top platform 59 of the tower 53 of the stack layer lift 52. Once these arms 82, 84 are raised slightly to pick up the tie assembly layer, the tower 53 moves downstream, driven by the drive 106 (See FIG. 23), traveling along the horizontal structural member 96, as illustrated in FIGS. 23 and 24. Naturally, the tie assembly layer travels downstream with the arms 82, 84 until the tower 53 comes to the end of its run, as shown in FIGS. 24 and 25, which corresponds to the position where the tie assembly layer is aligned with and is directly above the stack accumulation lift 40.

The arms 82, 84 of the stack layer lift 52 may be raised and lowered by one of many different means, such as electrically, pneumatically, hydraulically, or mechanically. In the present embodiment 32, the arms are raised via a simple mechanical arrangement. The top portion of the housing of the tower 53 (See FIGS. 24 and 25) defines a tapered profile 108 which then transitions to a flat profile 110. When the tower 53 first begins moving downstream, a roller 112 moves up the tapered profile 108, raising the top platform 59 and the arms 82, 84 with it. Once the roller reaches the flat profile, it stops moving relative to the tower 53 and the whole assembly moves downstream carrying the tie assembly layer to the stack accumulation lift 40. Once the stack layer lift 52 begins to retract, the roller 112 first rolls down the tapered profile 108, lowering the top platform 59 and the arms 82, 84 it supports, before the roller 112 stops moving relative to the tower 53 and the whole assembly moves back upstream, leaving behind the tie assembly layer on the stack accumulation lift 40 as explained in more detail below.

Once the entire tie assembly layer is positioned above the stack accumulation lift 40, the controller causes the arms 82, 84 of the stack layer lift 52 to be lowered by initiating the retraction of the tower 53, as explained above, until the parallel ties 14 of the tie assembly layer are resting on the raised outer edges 98 of the arms 78, 80 of the stack accumulation lift 40. FIG. 26 shows a detail of the first arm 80 of the stack accumulation lift 40, including the raised edge 98 for supporting the ties 14 of the German stack 10. In FIG. 27, the arm 84 of the stack layer lift 52 and the ties 14 have been added to the view of FIG. 26 to show how the arm 84 of the stack layer lift 52 transports the tie assembly to the arm 80 of the stack accumulation lift 40. Finally, FIG. 28 shows the position of the tie 14 and the arm 84 of the stack layer lift 52 after the stack layer lift 52 has deposited the layer of ties onto the stack accumulation lift 40. The parallel ties 14 are resting on the raised edges 98 of the stack accumulation lift 40, and the arms 82, 84 of the stack layer lift 52 lie in the space between the bottom surface of the ties 14 and the planar top surfaces of the arms 78, 80 of the stack accumulation lift 40. (While only one side of the assembly is shown in these enlarged views, it is understood that the other side is simply a mirror image of what is shown.)

Now that the layer of ties 14 is resting on the stack accumulation lift 40, the controller causes the arms 82, 84 to retract back to the layer accumulation station 68. Since there is a space 100 between the top surface of the arms 82, 84 and the bottom surface of the ties 14, the stack layer of ties remains resting on the upraised edges 98 of the arms 78, 80 of the stack accumulation lift 40 as the arms 82, 84 of the stack layer lift 52 travel back upstream to their initial position.

The above process is repeated, until five layers of ties are stacked onto the stack accumulation lift 40. Note that, with each successive layer of ties, the perpendicular tie 14P that is placed on top of the nine parallel and spaced apart ties 14 alternates from one end of the parallel ties 14 to the other. As described above, the first layer of ties 14 has its perpendicular tie 14P placed at the left end by the first push-off station 56. The second layer of ties 14 will have its perpendicular tie 14P placed at the right end by the second push-off station 58, and so forth. The final (fifth) layer may have two perpendicular ties 14P, one located at each of the left and right ends, as shown in FIG. 1 (or it may have just one perpendicular tie 14P or none, as preferred by the user).

When the second and subsequent layers of ties 14 are placed onto the stack accumulation lift 40, the space 102 that is created between adjacent layers of parallel ties 14, as shown in FIG. 1, provides sufficient space for the arms 78, 80 of the stack layer lift 52 to be lowered down, out of contact with the bottom surface of the ties 14 that have just been deposited on top of the stack accumulation lift, so the arms 78, 80 can be retracted back upstream.

Figure 29:
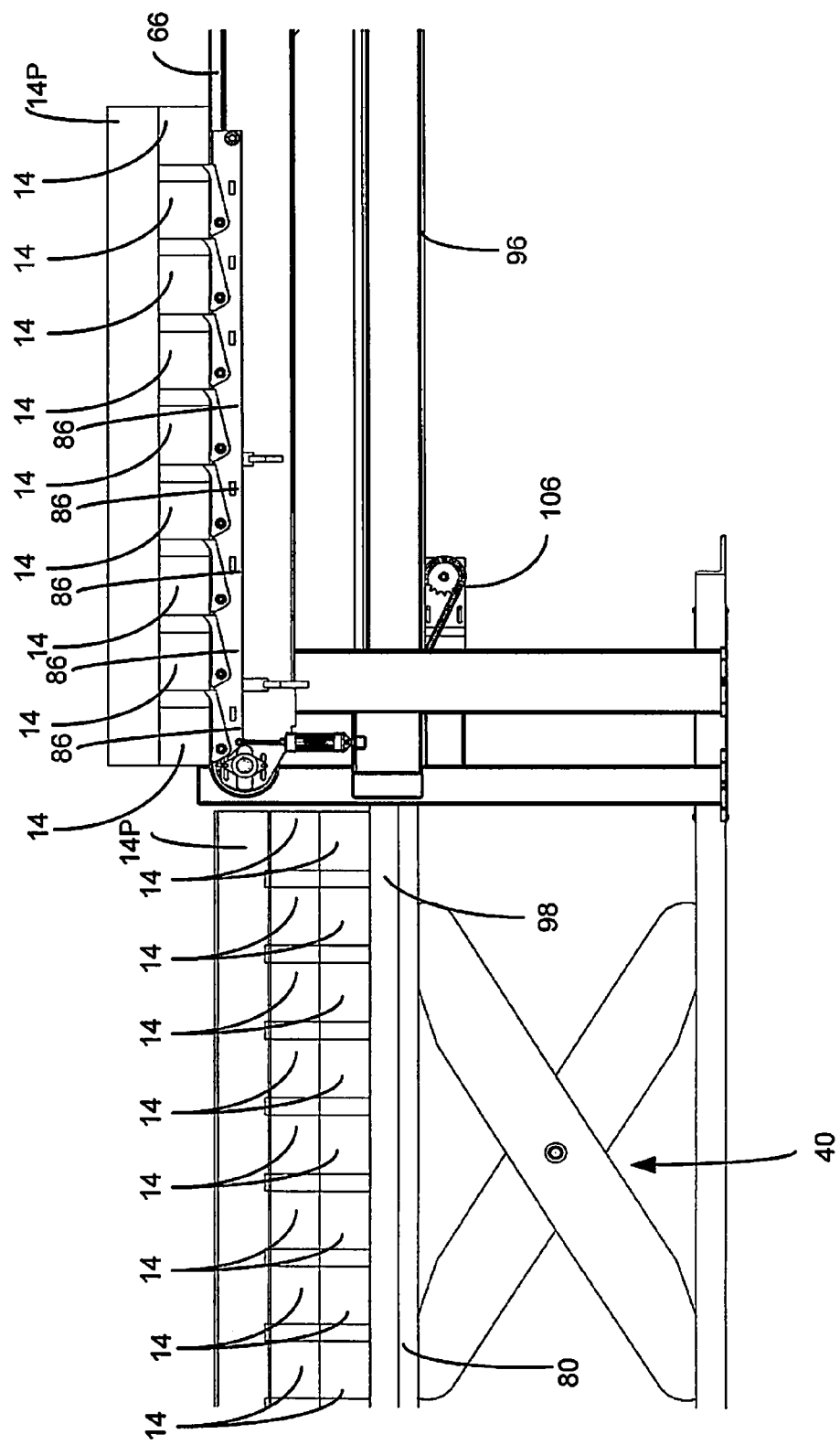
FIG. 29 is a view, similar to FIG. 23, but showing two layers of ties stacked onto the stack accumulation lift and a third layer, on the layer accumulation station, ready to be stacked onto the stack accumulation lift.

Comparing FIG. 29 with FIG. 23, it will be appreciated that the stack accumulation lift 40 is lowered as each successive layer of tie assemblies is deposited on top of it, so that it is always at the correct height to receive the next tie assembly. This may be accomplished by one of several means. For instance, the stack accumulation lift 40 may be lowered the correct number of inches corresponding to the height of the ties 14. A simpler and more accurate solution is to have a sensor, such as an electric eye, to detect when the stack accumulation lift 40 has been lowered the correct distance to provide an unobstructed path for the arms 82, 84 to deposit the next tie assembly layer. The sensor sends a signal to the central controller, which adjusts the height of the stack accumulation lift 40 until it is at the correct height.

After five layers of tie assemblies have been placed on top of the stack accumulation lift 40, the arms 78, 80 of the stack accumulation lift 40 are at their lowest elevation, and a complete German stack 10 of ties is stacked on the stack accumulation lift 40. The entire German stack 10 may then be removed by a forklift truck, for instance, by sliding the forks of the forklift into the same spaces 100 (See FIG. 28) that were used by the arms 82, 84 to deposit the first layer onto the stack accumulation lift 40. Once the German stack 10 is removed from the stack accumulation lift 40, the stack accumulation lift 40 is raised again to the starting position shown in FIG. 21, and a new stack can be started.

It should be noted that, while a German stack has been described here, other types of stacks with different numbers of ties could be assembled using this arrangement. For example, instead of the German stack, with a single perpendicular tie 14P separating the layers of parallel ties 14, a stack could be formed in which each accumulation layer has two perpendicular ties 14P, one perpendicular tie 14P on top of each end of each layer of parallel ties 14. This would produce a stack in which all the ties are oriented horizontally instead of the German stack, in which each even-numbered layer of parallel ties 14 is at an angle to the horizontal with one of the left and right ends higher than the other. Instead of having nine parallel ties, a different number could be used, and so forth.

Tram Stack Configuration

Figure 32:
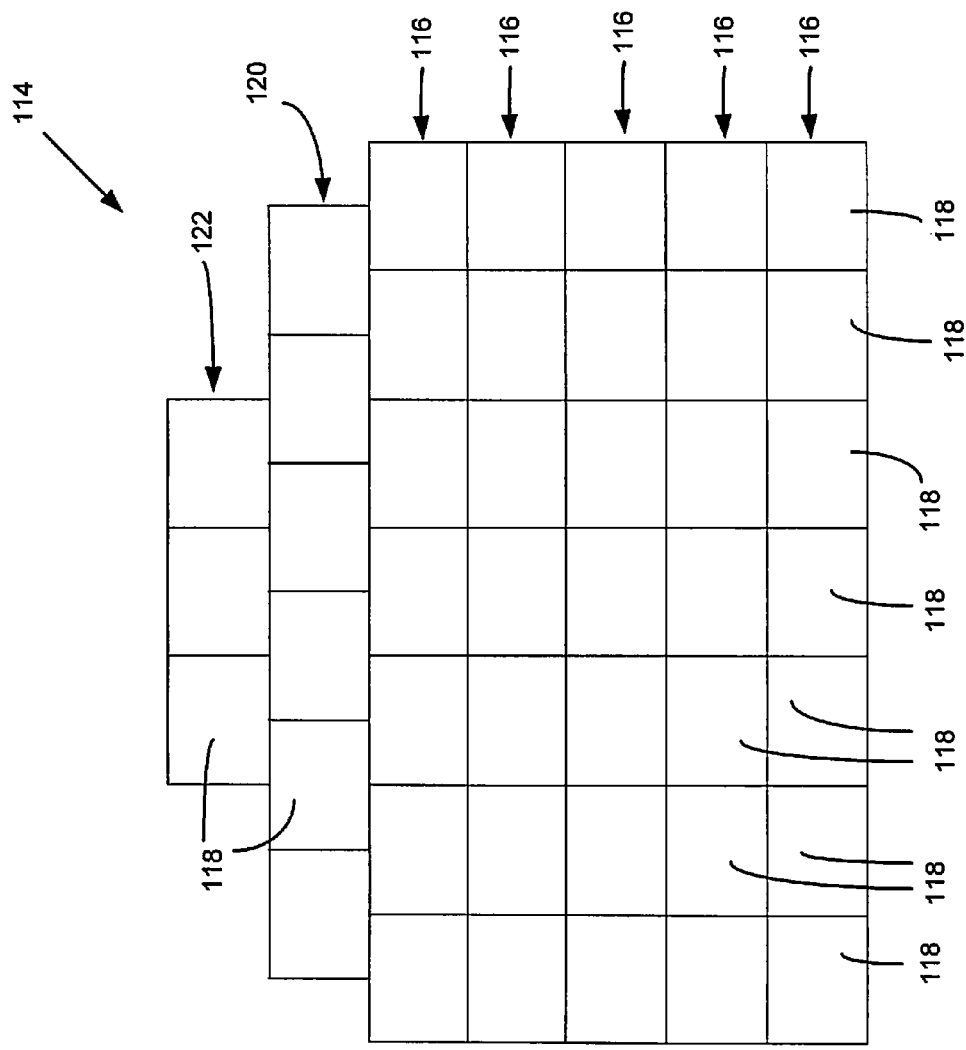
FIG. 32 is an end view, similar to that of FIG. 2, but showing a plurality of railroad crossties stacked in a tram stack configuration.

FIG. 32 is an end view of railroad cross ties stacked in what is commonly referred to as a tram stack configuration, or as a pyramid stack 114. In this configuration, the bottom five "full" layers 116 each include seven ties 118, which are horizontally oriented and are parallel to each other and abutting each other. The sixth "short" layer 120 has six ties 118, and this sixth layer 120 of ties is substantially centered atop the bottom five layers 116. A seventh "shorter" layer 122 has three ties 118, and this seventh layer 122 is substantially centered atop the bottom five layers 116 and atop the sixth layer 120. This tram stack configuration 114 allows for optimal loading of a pressurized vessel, such as a creosote immersion vessel, with railroad ties. Of course, a tram stack configuration may have more or fewer than seven ties in each of the full layers 116, and as many short layers 120 and shorter layers 122 as desired or required by the dimensions and cross-sectional profile of the vessel in which the ties are to be inserted.

FIGS. 30-31 and 33-52 show an embodiment of a railroad tie stacker 124 for stacking ties in a tram stack configuration, which is essentially the same as the arrangement for forming the German stack described earlier, except it does not include the rotator station, since, in the tram stack configuration, all the crossties are parallel to each other and oriented in the left-to-right direction. Of course, the device 32 for stacking railroad ties in a German stack configuration, including the rotator stations, may be used for stacking railroad ties in other configurations, such as in a tram stack configuration, by programming the controller to make certain changes such as deactivating the rotator stations portion of the device.

Figure 30:
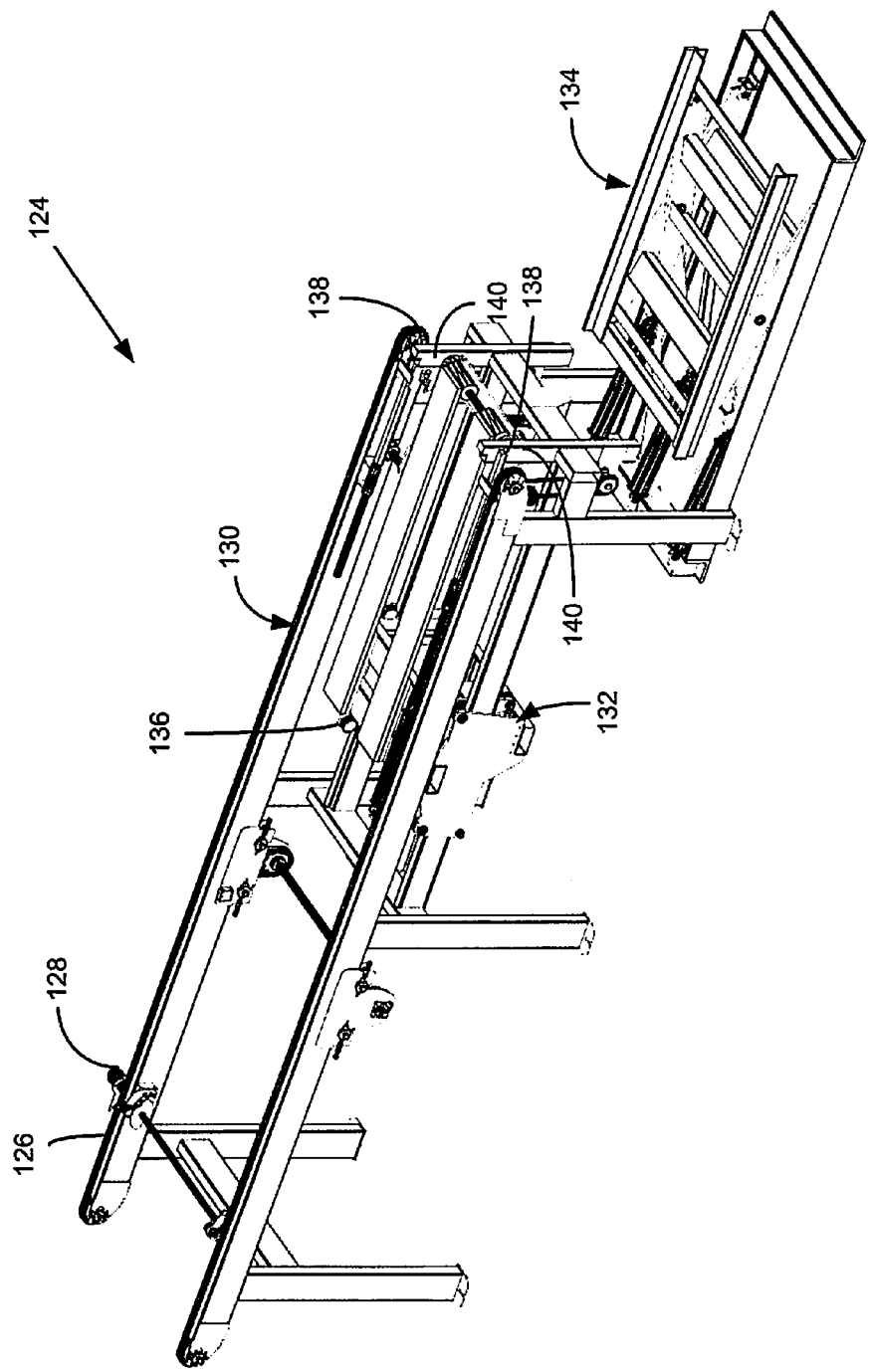
FIG. 30 is a perspective view of an embodiment of a railroad tie stacker arrangement for stacking ties in a tram stack configuration, showing the adjustable backstop in a fully retracted position.
Figure 31:
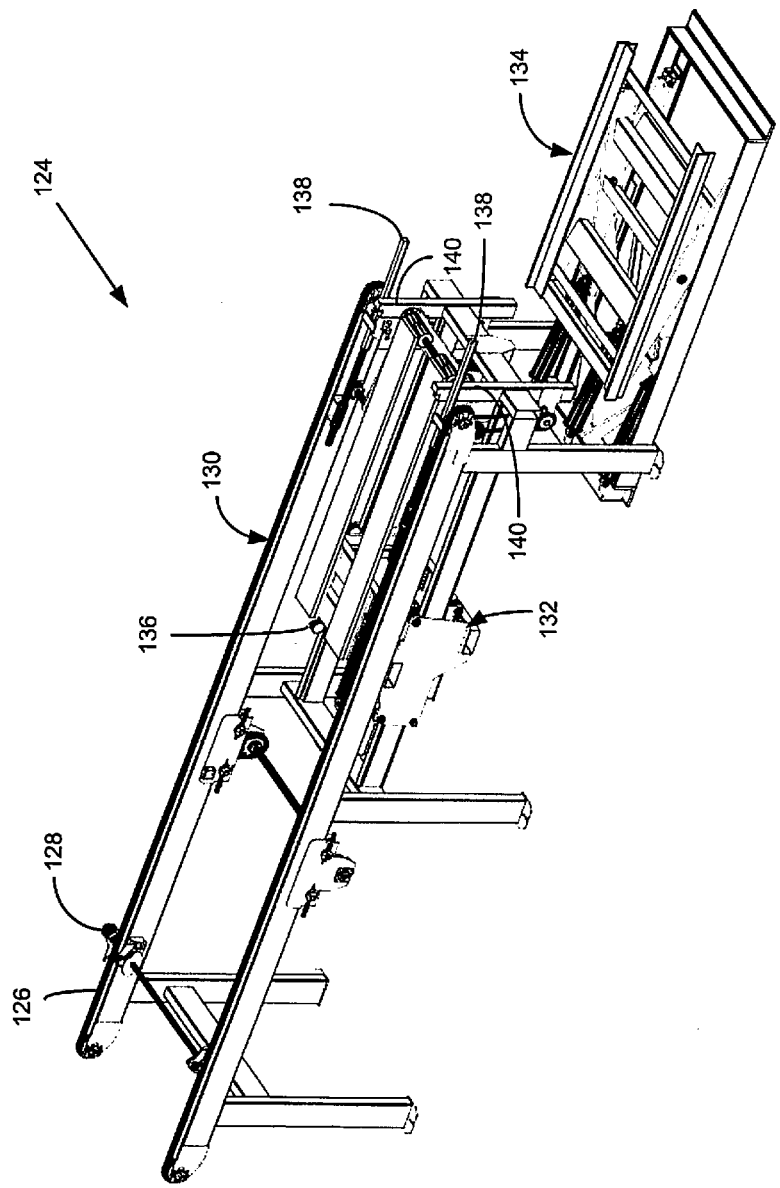
FIG. 31 is a perspective view, similar to FIG. 30, but showing the adjustable backstop in an extended position.

Referring to FIG. 30, beginning on the left side (upstream side) and progressing downstream toward the right, the stacker 124 includes a tie accumulation chain deck 126, a staging station 128, a layer accumulation station 130 of the stack layer lift 132, and a stack accumulation lift 134. Note that these elements correspond to similar elements on the "German stack" railroad tie stacker 32 of FIG. 3 described earlier. The tie alignment and feed conveyor 34 (See FIG. 3), though not shown in the tram stack railroad tie stacker 124 of FIG. 31, is a common element to both stackers 32, 124. As mentioned above, the side feed roll and rotator station 36 is not present in this tie stacker 124 because the ninety degree rotation of ties is not required for a tram stack configuration 114 (See FIG. 32). Of course, and as discussed earlier, the side feed roll and rotator station 36 could be present in the railroad tie stacker 124 and it simply would not be used when stacking the ties in a tram stack configuration.

There are minor changes in the tram stack railroad tie stacker 124 to permit centering of the shorter layers of ties 120, 122 relative to the full layers of ties 116. These minor changes include the absence of the pivoting spacers 86 (See FIGS. 7, 8, and 18) and the presence of a laser range finder 136 (See FIG. 31) to determine the width of the latest layer of ties in order to extend the adjustable backstop 138 to properly center the top layer relative to the existing layers of ties on the stack accumulation lift 134.

Figure 52:
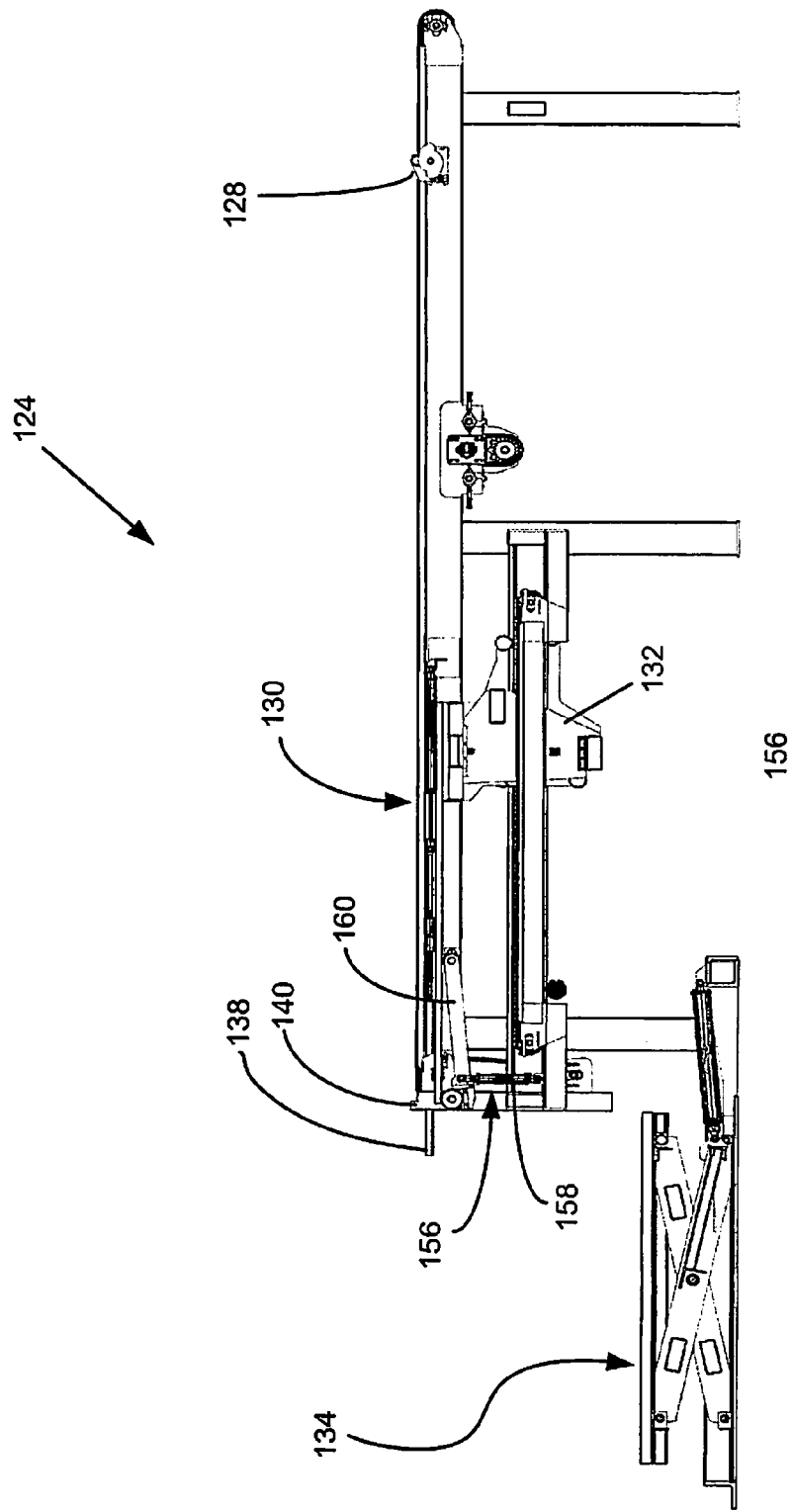
FIG. 52 is a side view of the railroad tie stacker of FIG. 38 with an added mechanism to raise and lower the pivoting spacers of FIG. 18.

The pivoting spacers 86 cannot be seen in FIG. 52. However, in FIG. 52, as in FIG. 18, the pivoting spacers 86 are mounted on a mechanism 156 which can raise all the pivoting spacers 86 when required for a "German stack" configuration 10 or lower them out of the way when required for a tram stack configuration 114. The mechanism 156 includes a piston 158 connected to an arm 160 onto which the pivoting spacers 86 are mounted. Extending the piston 158 raises the pivoting spacers 86 into position for use when configured for the "German stack". Retracting the piston 158 lowers the pivoting spacers 86 out of the way such that the railroad tie stacker 124 may be used for arranging the ties so that they abut each other in a tram stack configuration 114.

It should be obvious to those skilled in the art that the German stack railroad tie stacker 32 of FIG. 3 can be readily modified with a few minor changes such that the same railroad tie stacker can be used to stack ties in a German stack configuration 10 or a tram stack configuration 114.

Figure 51:
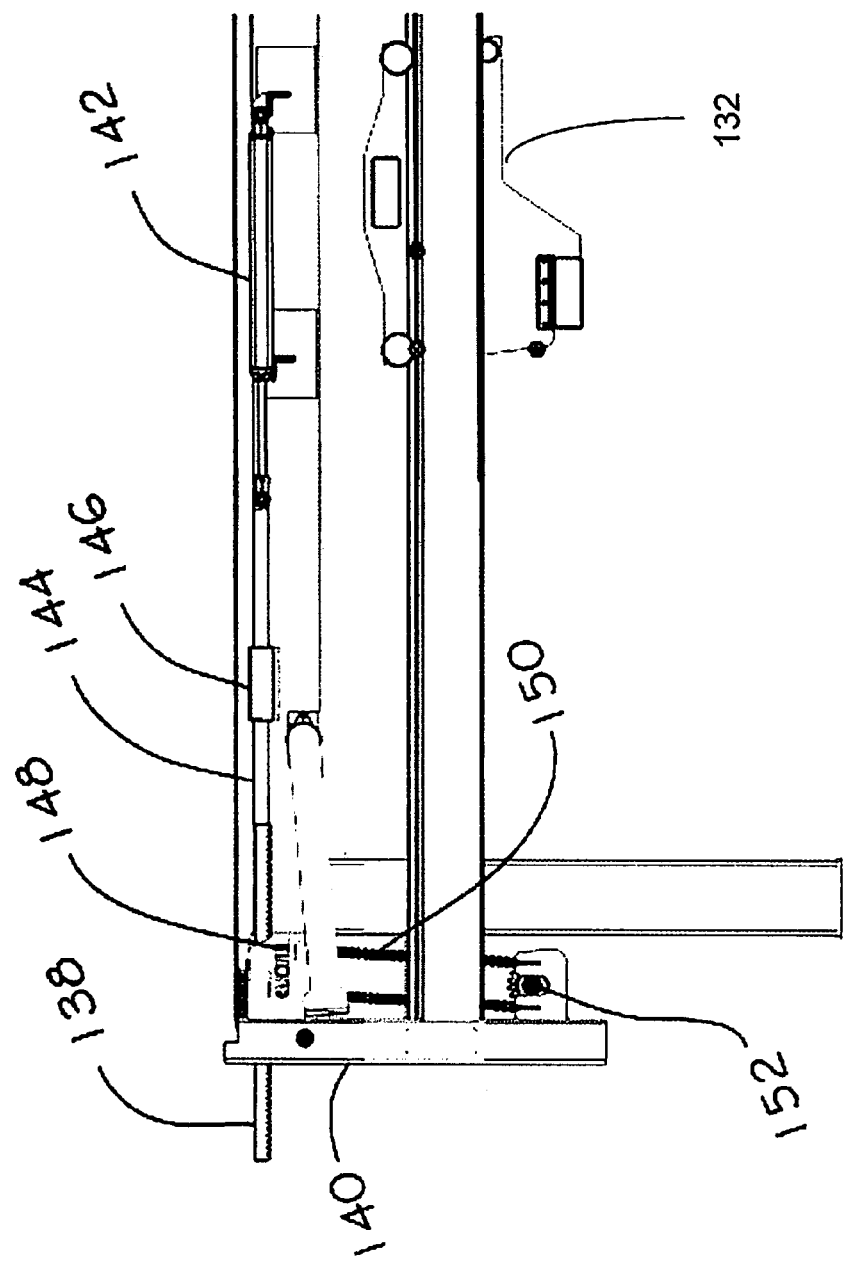
FIG. 51 is a view along line 51-51 of FIG. 33.

Comparing FIGS. 30 and 31, it may be appreciated that the adjustable backstops 138 may be flush with the fixed-location backstops 140 (as shown in FIG. 30) or they may project forwardly of the fixed-location backstops 140 into the area occupied by the stack accumulation lift 134 (as shown in FIG. 31). As seen in FIG. 51, the adjustable backstop 138 is of a rack and pinion design. A cylinder 142 is connected to the rack 144 via a shaft bushing 146. As the rack 144 moves, it causes a pinion 148 to rotate which then transmits the linear motion to the rack 144 on the other side of the layer accumulation station 130 via a chain drive 150 and cross-over shaft 152 mechanism such that both adjustable backstops 138 move in or out together as a set, actuated by a single cylinder 142. The cylinder 142 may be actuated pneumatically, hydraulically, or electrically, for instance. As explained in more detail later, the extent of travel of the cylinder 142 (and therefore of the racks 144 and the adjustable backstops 138) is determined by the width measurement of the layer of ties on the layer accumulation station 130, as taken by the laser range finder 136 (See FIG. 30).

Figure 33:
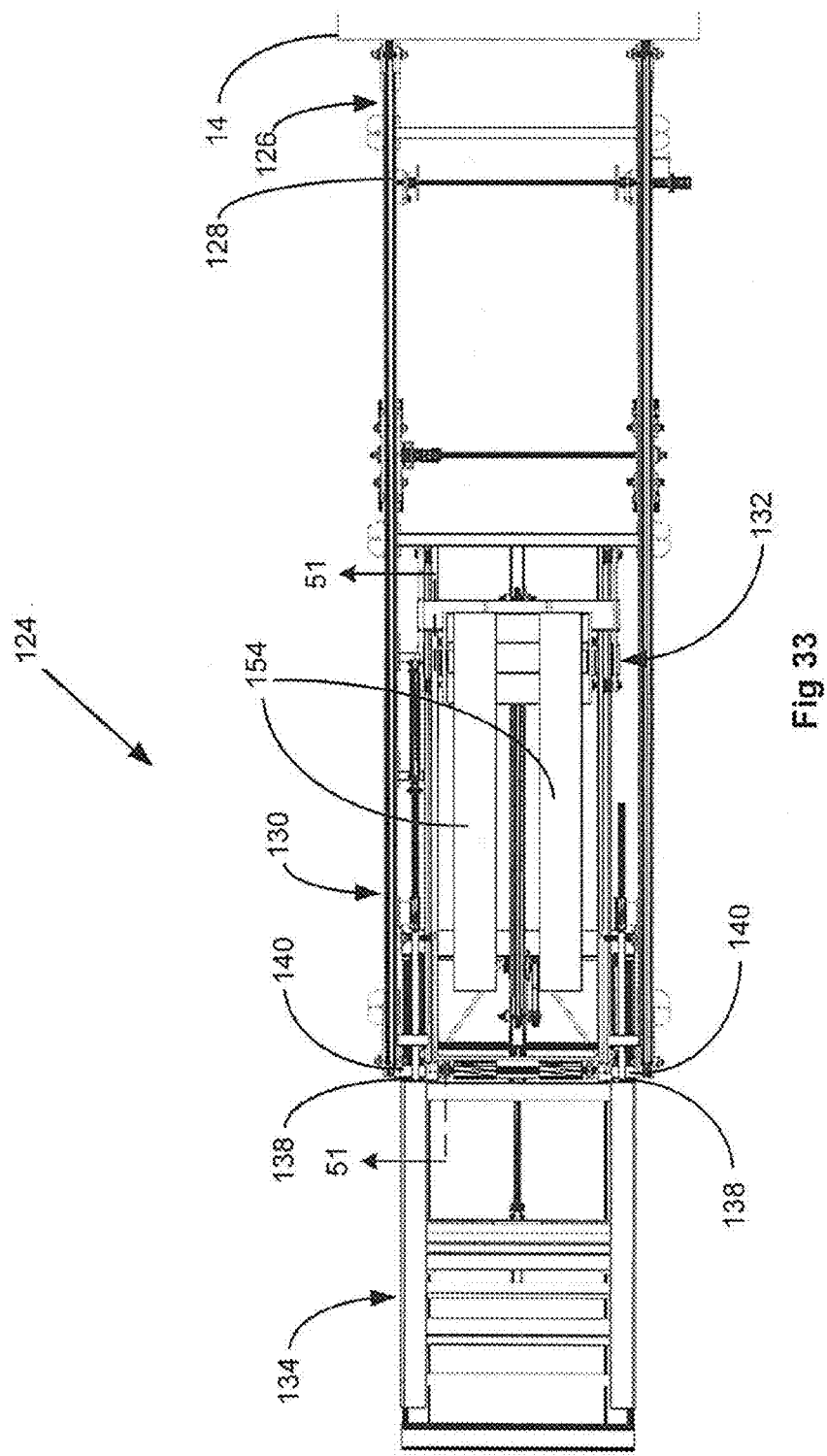
FIG. 33 is a plan view of the railroad tie stacker of FIG. 31, with a first tie arriving at the tie accumulation chain deck.
Figure 34:
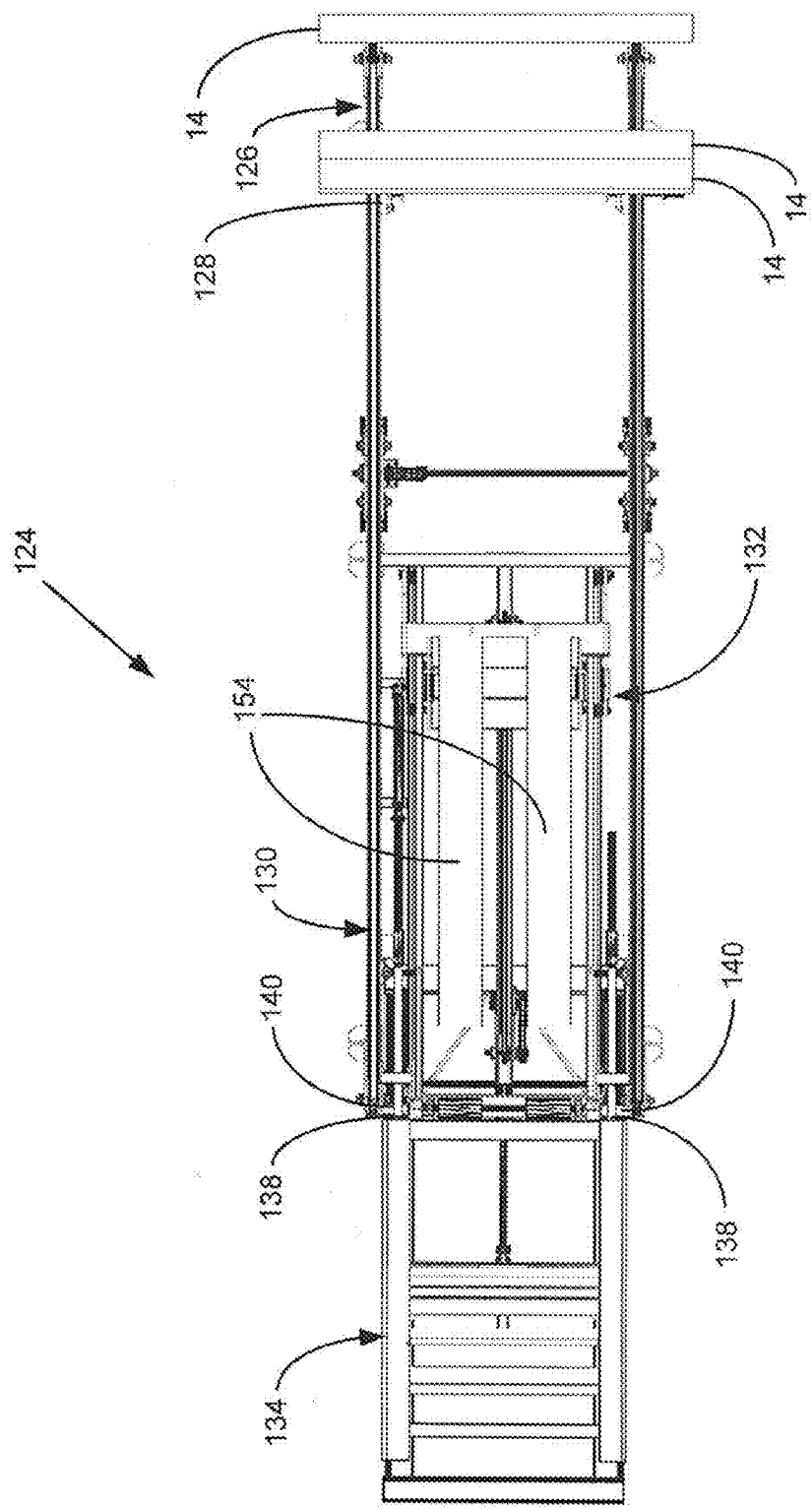
FIG. 34 is a plan view of the railroad tie stacker of FIG. 33 with two ties at the accumulation chain deck and a third tie arriving at the accumulation chain deck.
Figure 35:
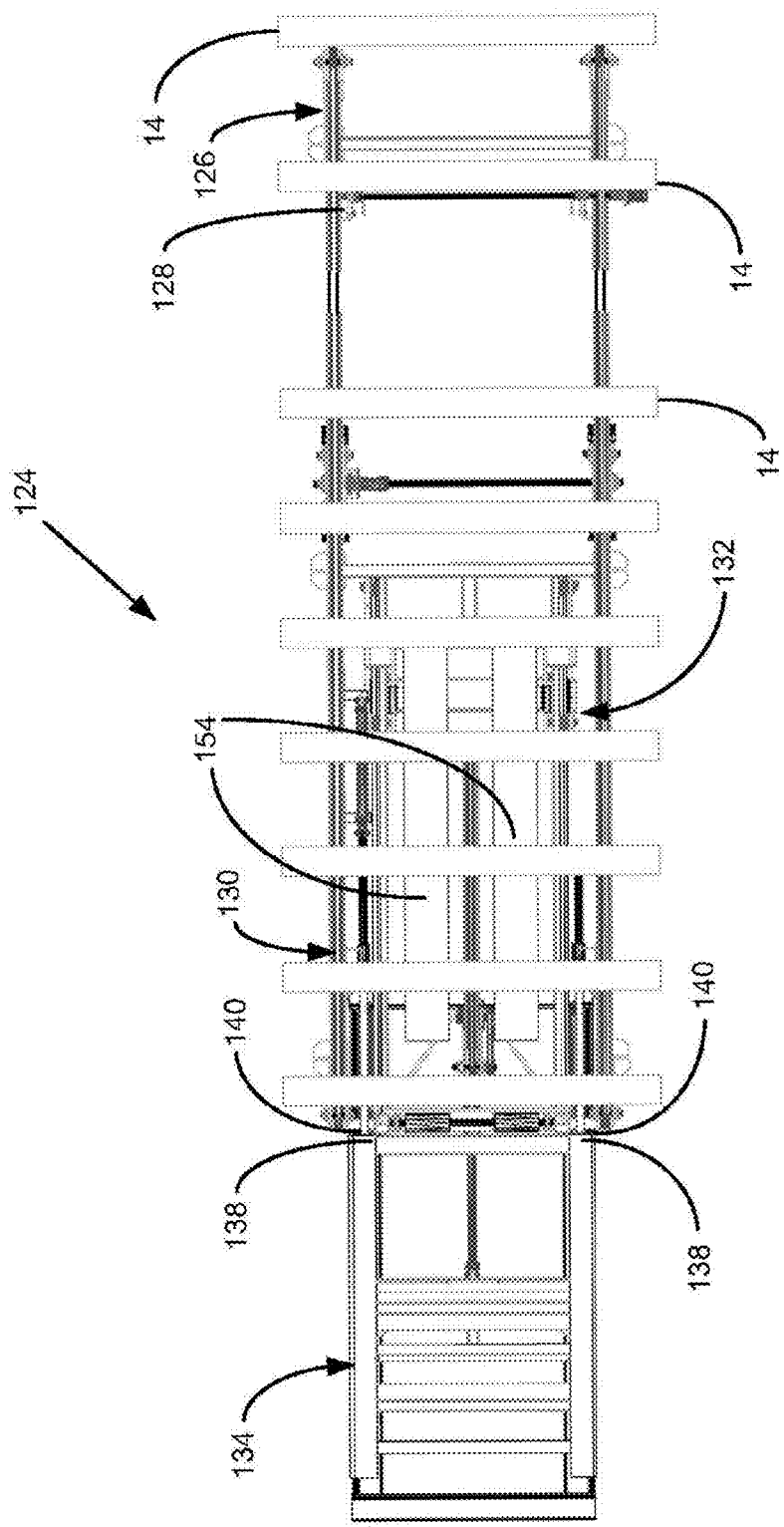
FIG. 35 is a plan view, similar to FIG. 34, with the ties moving along towards the layer accumulation station of the stack layer lift.

In FIG. 33, a first left-to-right directed tie 14 has just arrived at the tie accumulation chain deck 126 of the railroad tie stacker 124. In FIG. 34, the ties 14 are progressing along the tie accumulation chain deck 126 toward the staging station 128 where the ties 14 are briefly delayed before they continue on their way to the layer accumulation station 130, as shown in FIG. 35.

Figure 36:
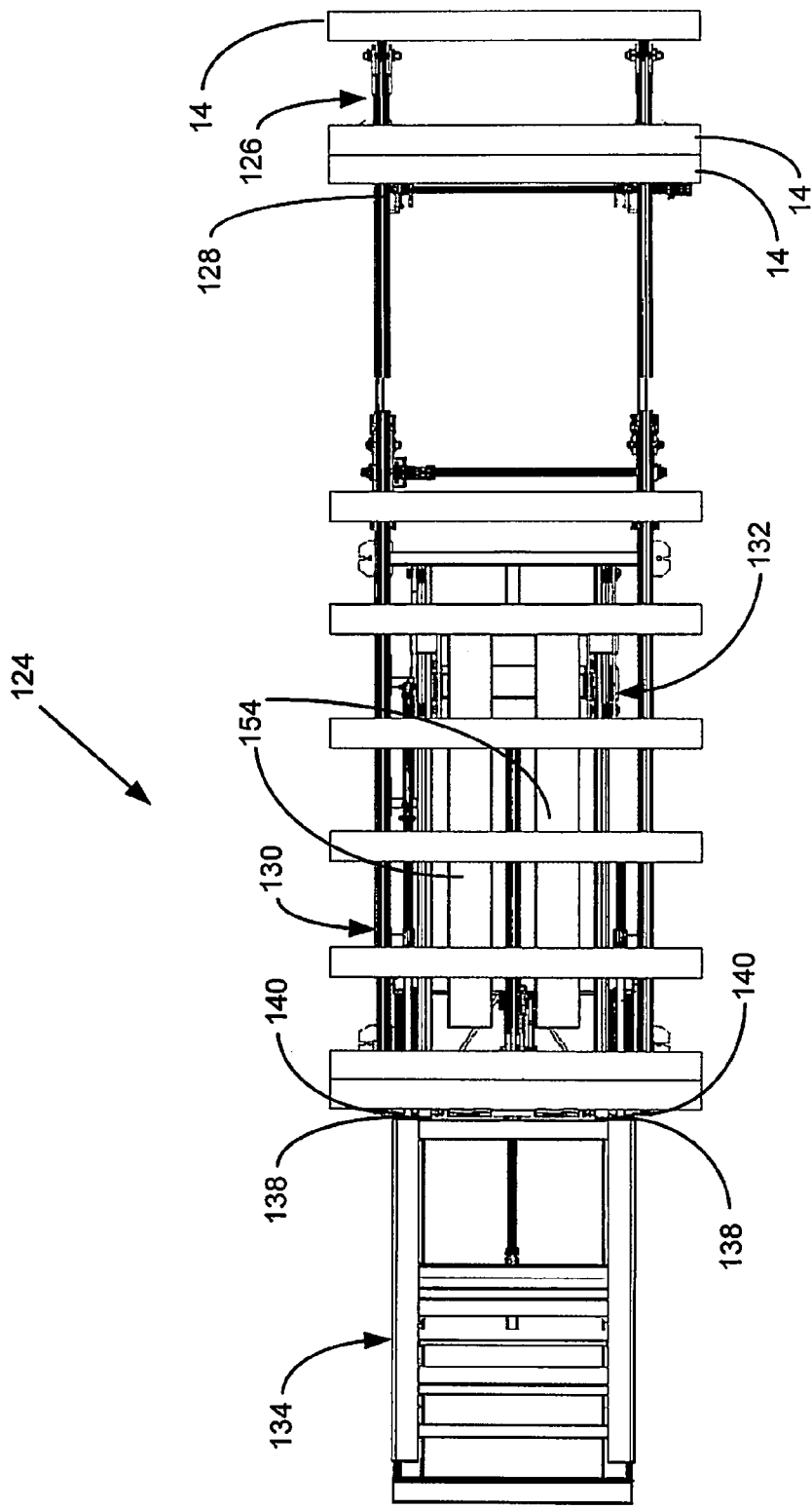
FIG. 36 is a plan view, similar to FIG. 35, but with some of the ties beginning to accumulate at the layer accumulation station of the stack layer lift.
Figure 37:
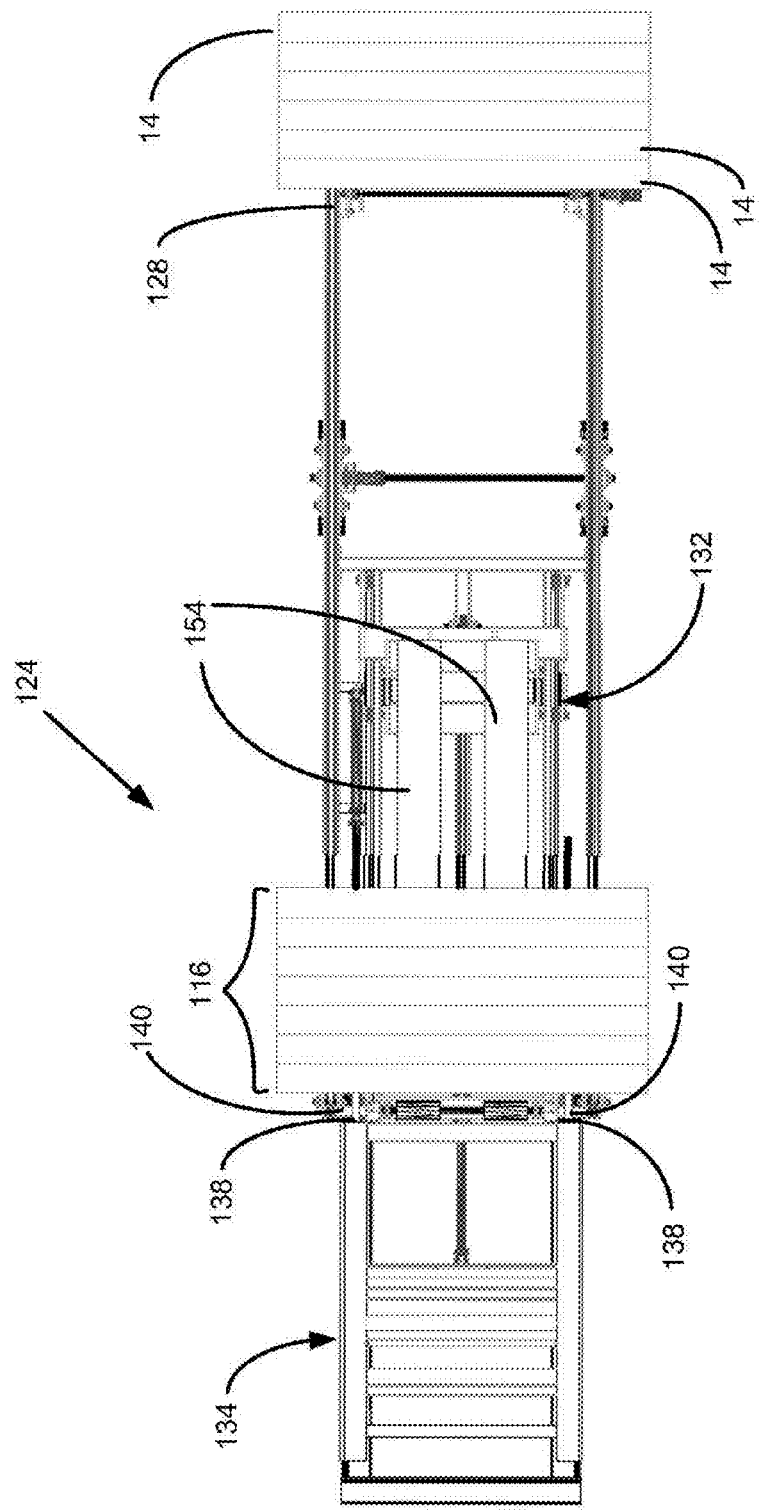
FIG. 37 is a plan view, similar to FIG. 36, but with all seven ties accumulated at the layer accumulation station of the stack layer lift, while other ties are accumulating at the staging station of the tie accumulation chain deck.

In this example, there are seven ties 14 on each "full" layer 116 (See FIG. 32) of ties. As shown in FIGS. 36 and 37, the ties 14 after the first seven ties are held back at the staging station 128, while the first seven ties are accumulated in the layer accumulation station 130.

Figure 38:
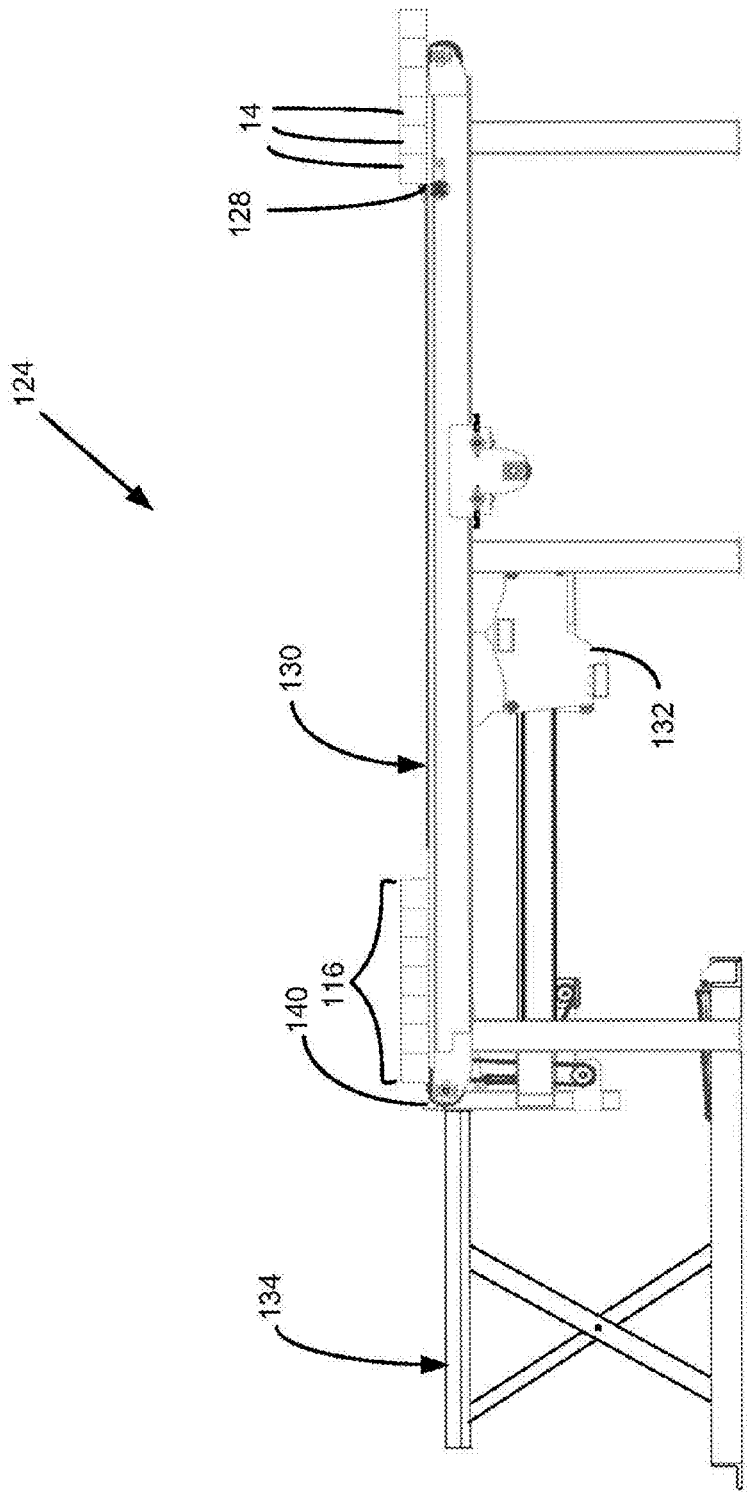
FIG. 38 is a side view of the railroad tie stacker of FIG. 37.

FIG. 38 is a side view of the railroad tie stacker 124 of FIG. 37. It shows the first full layer 116 of ties 14 at the layer accumulation station 130 of the stack layer lift 132.

Figure 39:
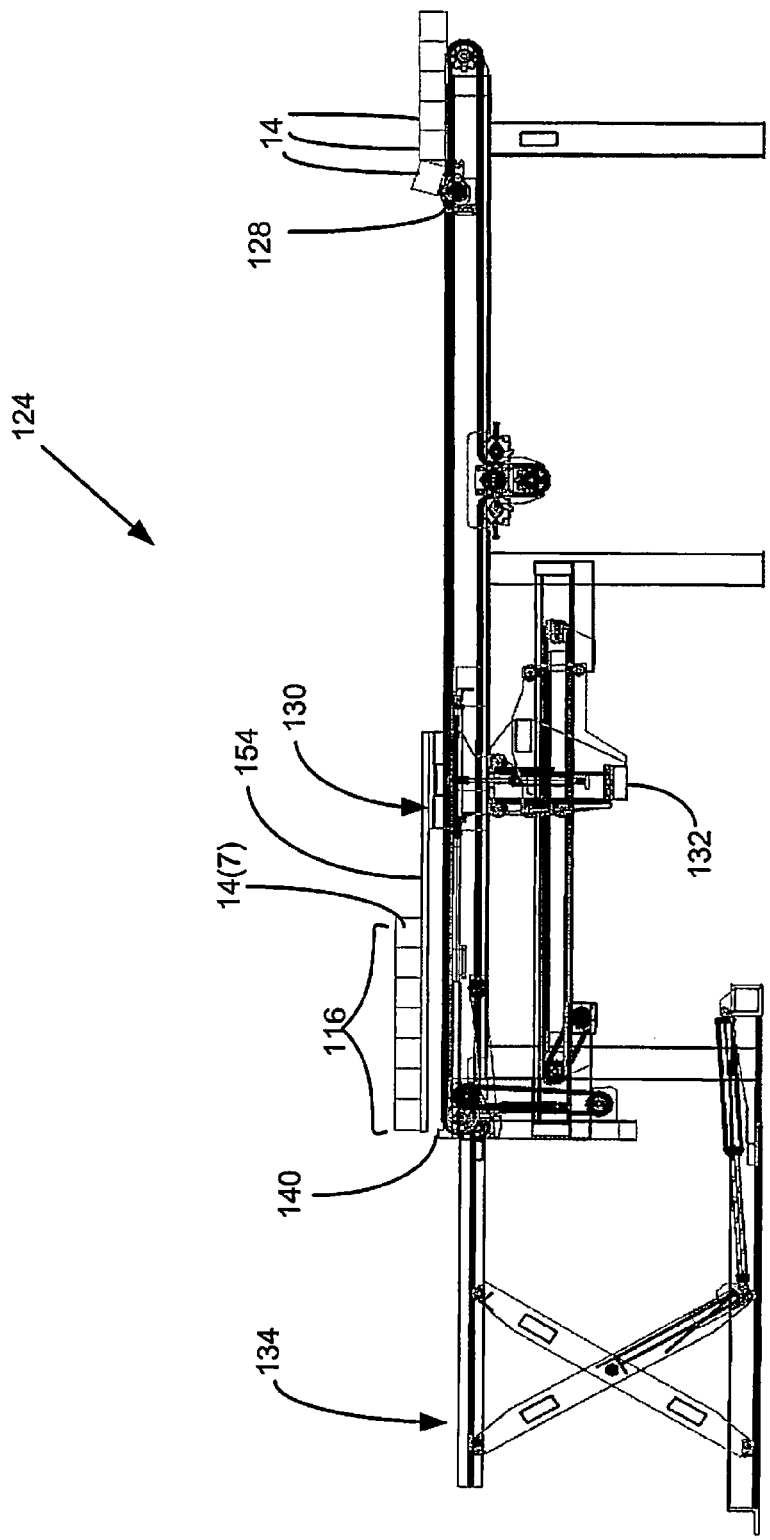
FIG. 39 is a side view of the railroad tie stacker of FIG. 38 with the ties in a raised position on the layer accumulation station, in preparation for transferring a "full" layer of ties to the stack accumulation lift.

In FIG. 39, the first full layer 116 of ties 14 is raised slightly in preparation to transfer this layer 116 to the stack accumulation lift 134. This is accomplished by using the arms 154 of the stack layer lift 132, which function in the same manner as the arms 82, 84 of the first embodiment 32.

Figure 40:
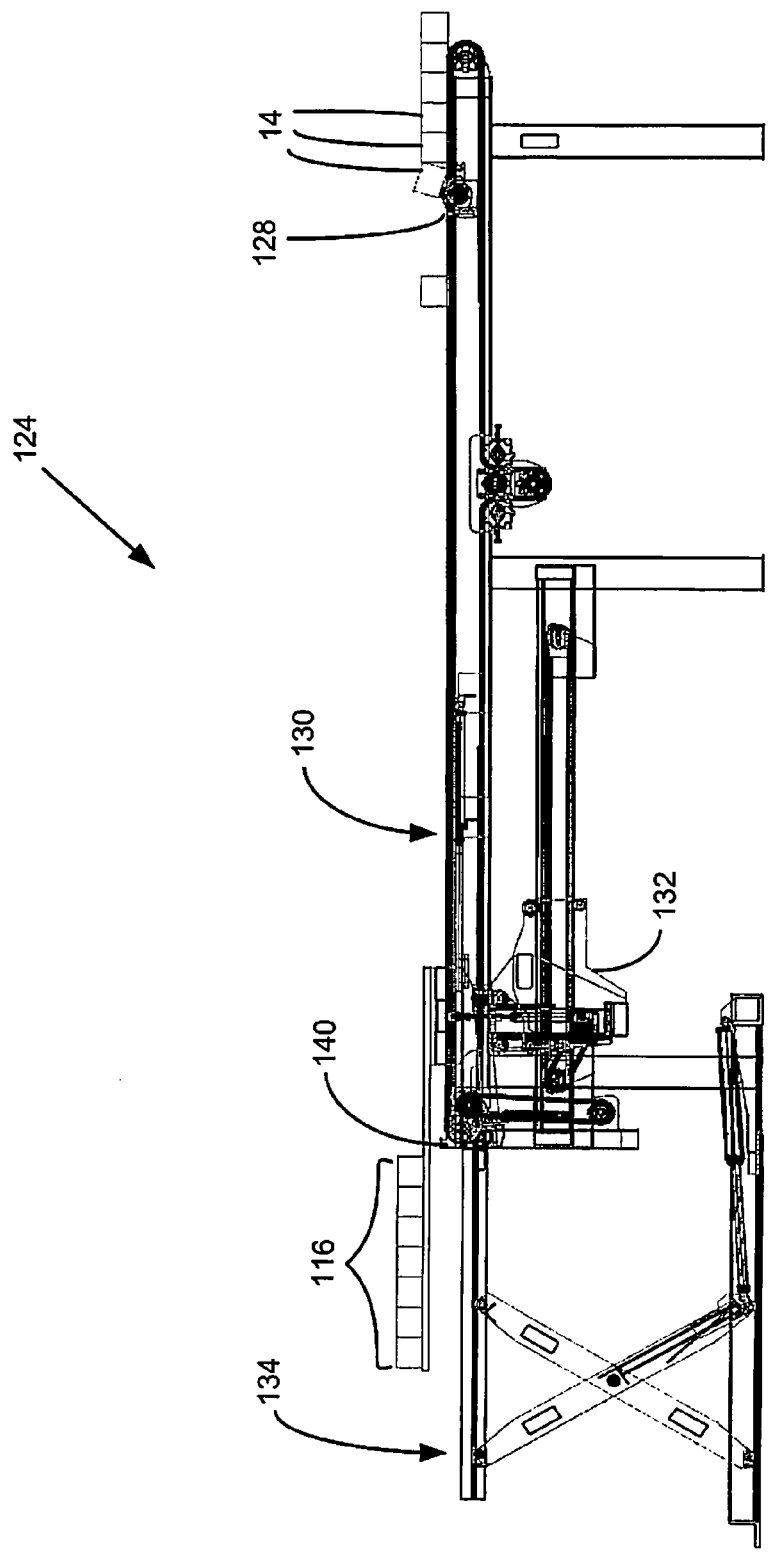
FIG. 40 is the same view as FIG. 39 but showing the layer of ties moved forward by the stack layer lift, from the layer accumulation station to the stack accumulation lift.

In FIG. 40, the layer 116 of ties is moved forward by the stack layer lift 132, from the layer accumulation station 130 to the stack accumulation lift 134.

Figure 41:
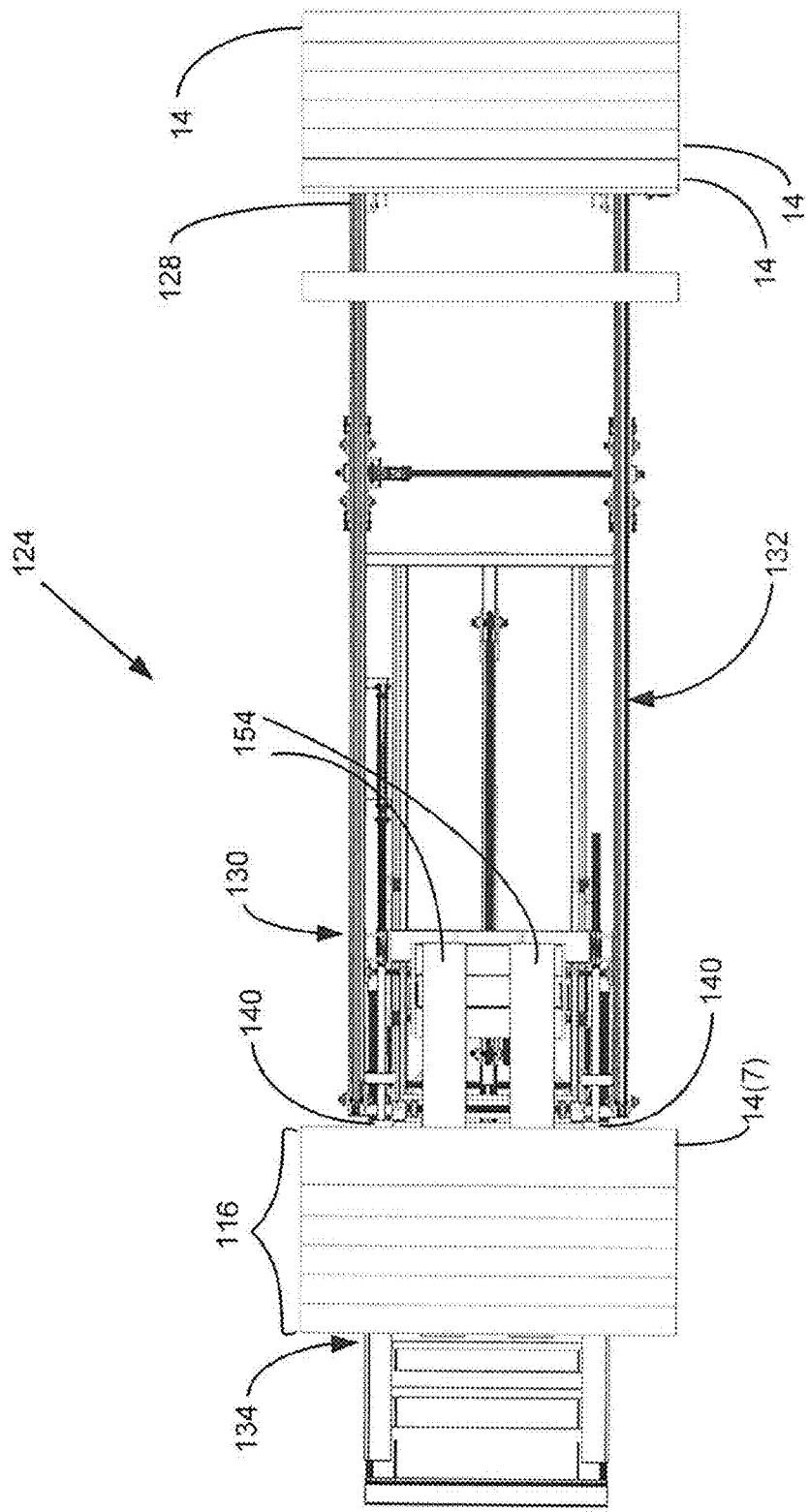
FIG. 41 is a plan view of the railroad stacker of FIG. 40.

FIG. 41 shows the arms 154 of the stack layer lift 132 in a lowered and partially retracted position such that the seventh tie 14(7) of the layer 116 is abutting the fixed-location backstops 140 (See also FIGS. 42 and 30), thus determining the location of the first full layer 116 of ties on the stack accumulation lift 134.

Figure 42:
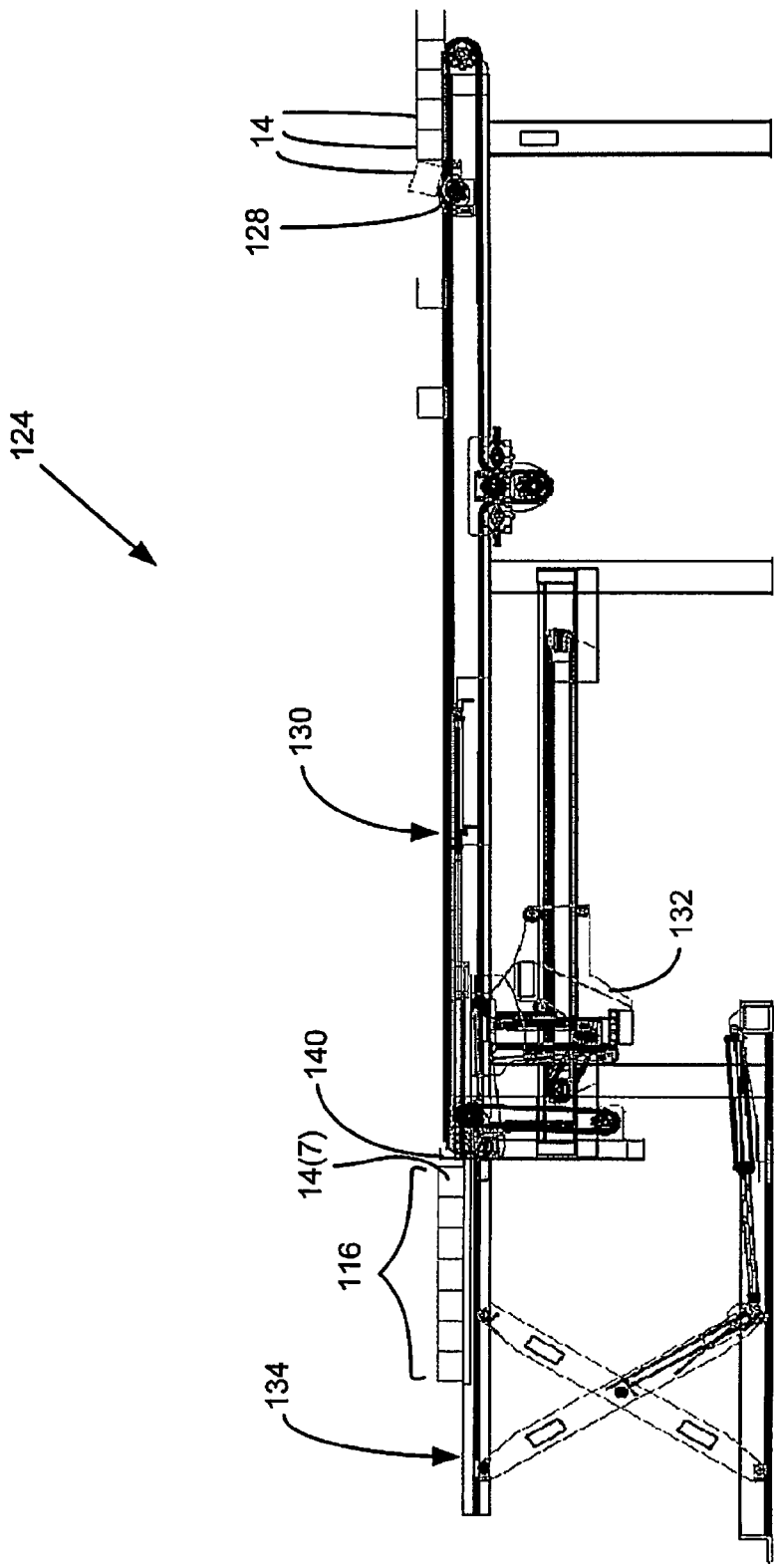
FIG. 42 is the same view as FIG. 40, but with the layer accumulation station in the lowered and retracted position to place the layer of ties atop the stack accumulation lift and against the fixed-location backstops of the railroad tie stacker.

In FIG. 42, the stack layer lift 132 is fully retracted, leaving behind the first full layer 116 of ties on the stack accumulation lift 134. The next seven ties 14 are progressing along to the layer accumulation station 130 in preparation for loading this new full layer of ties onto the stack accumulation lift 134. This full layer of ties and three more full layers, for a total of five full layers 116 of ties are transferred to the stack accumulation lift 134 in the same manner as with the first full layer described above. In each case, the fixed-location backstops 140 stop the latest top layer of ties while the stack layer lift 132 is retracted such that each successive full layer of ties is aligned directly above the other layers of ties on the stack accumulation lift 134, as shown in FIG. 43.

Figure 43:
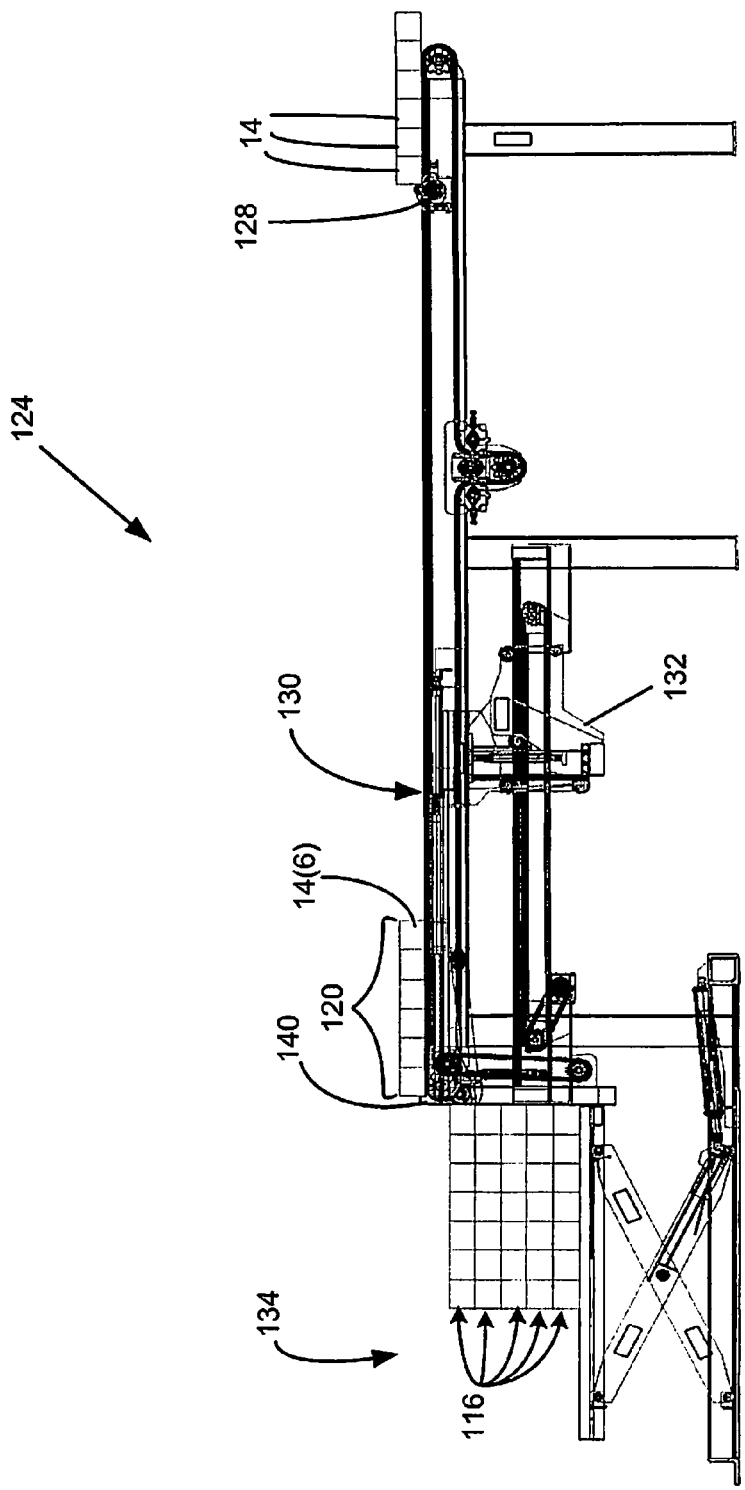
FIG. 43 is the same view as FIG. 42 but with five "full" layers of ties on the stack accumulation lift and with a sixth "short" layer of ties on the layer accumulation station ready to be transferred to the stack accumulation lift.

FIG. 43 also shows the first "short" layer 120 of ties atop the layer accumulation station 130.

Figure 44:
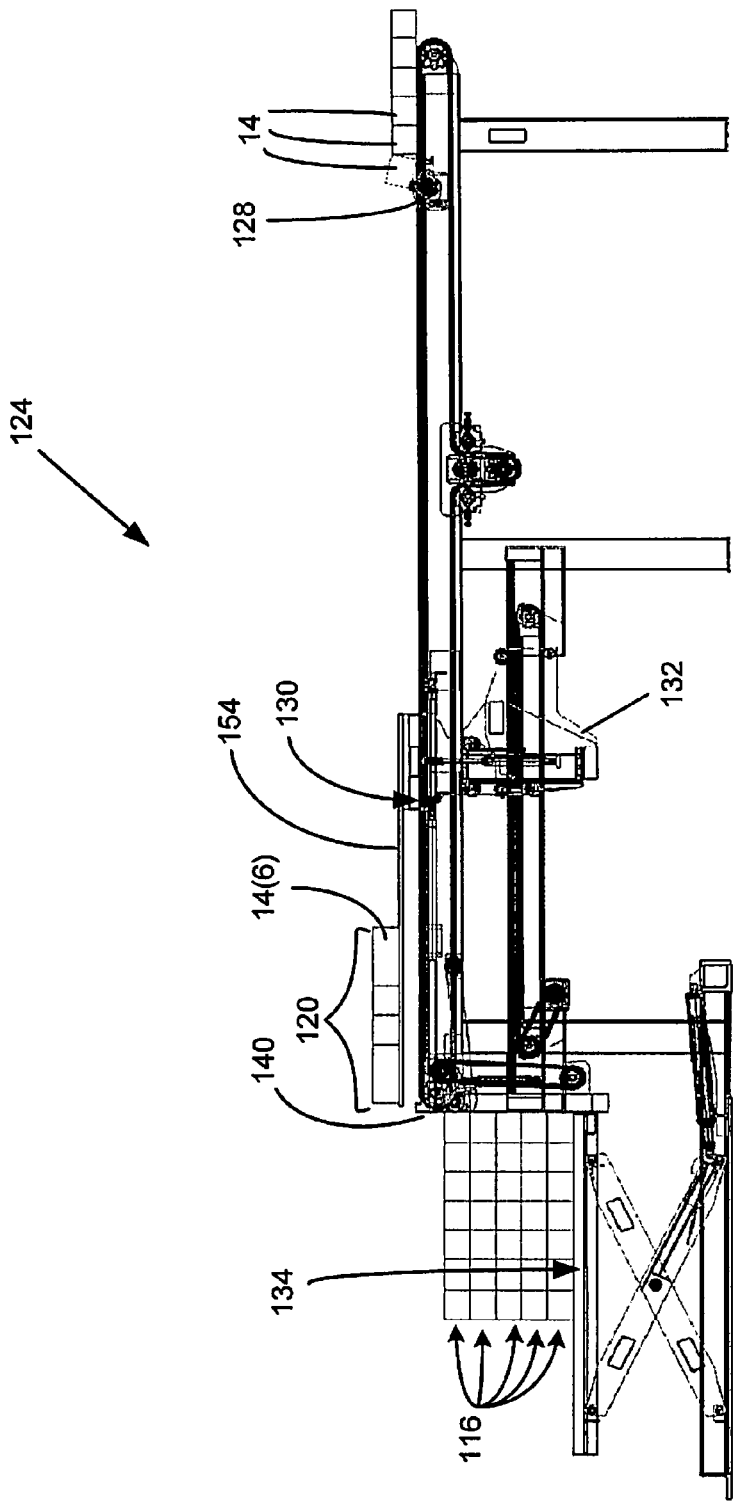
FIG. 44 is the same view as FIG. 43 but with the sixth "short" layer of ties in a raised position on the layer accumulation station, in preparation for transferring the "short" layer ties to the stack accumulation lift.

In FIG. 44, this "short" layer 120 of ties is raised slightly by the arms 154 of the stack layer lift 132, in preparation for transporting this layer 120 to the stack accumulation lift 134.

Figure 45:
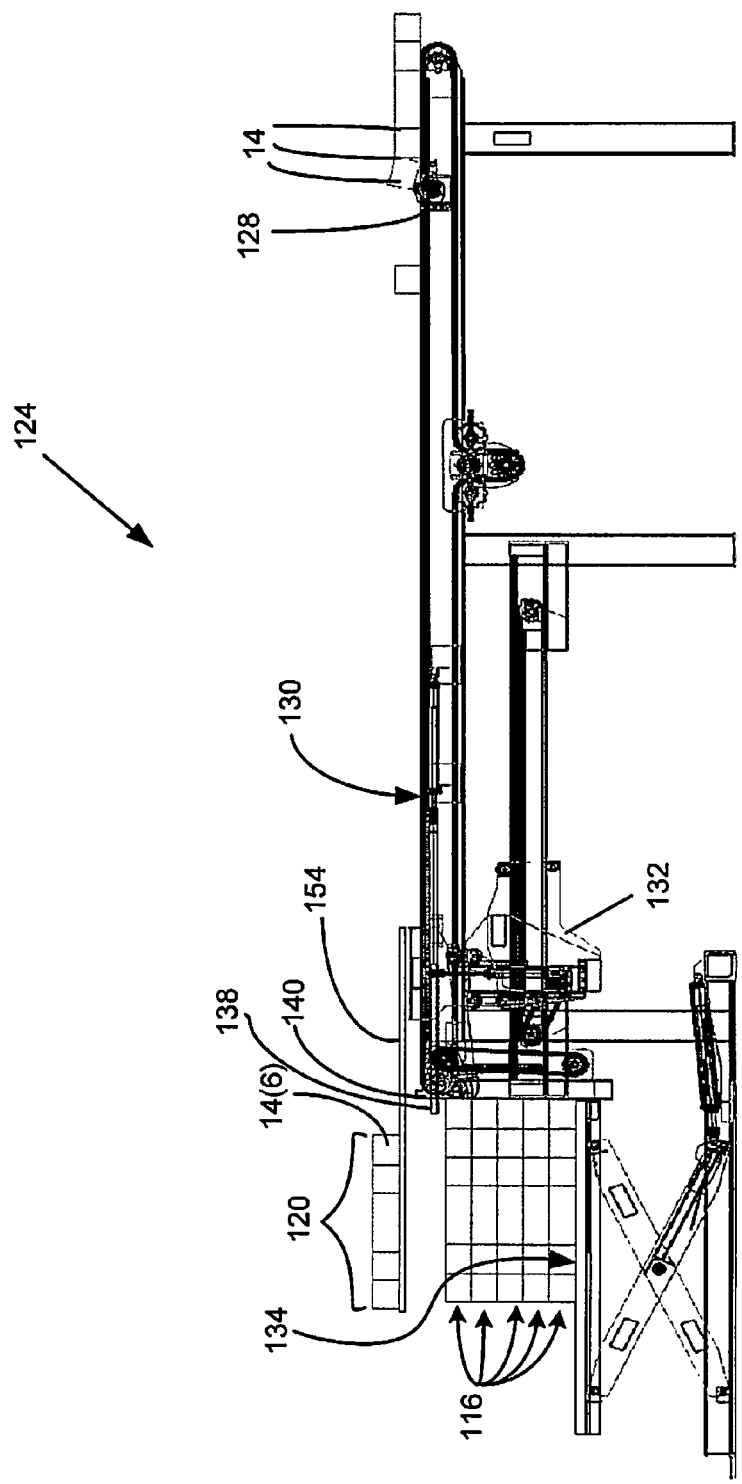
FIG. 45 is the same view as FIG. 44 but showing the "short" layer of ties moved forward by the stack layer lift, from the layer accumulation station to the stack accumulation lift and also showing the adjustable backstop in a first extended position.

In FIG. 45, the "short" layer 120 of ties is moved forward by the stack layer lift 132, from the layer accumulation station 130 to the stack accumulation lift 134. When the stacker is in this position, the adjustable backstop 138 is in a first extended position (See also FIG. 31) with the adjustable backstops 138 projecting beyond the fixed-location backstops 140 a distance that will put the "short" layer in the correct position.

Figure 46:
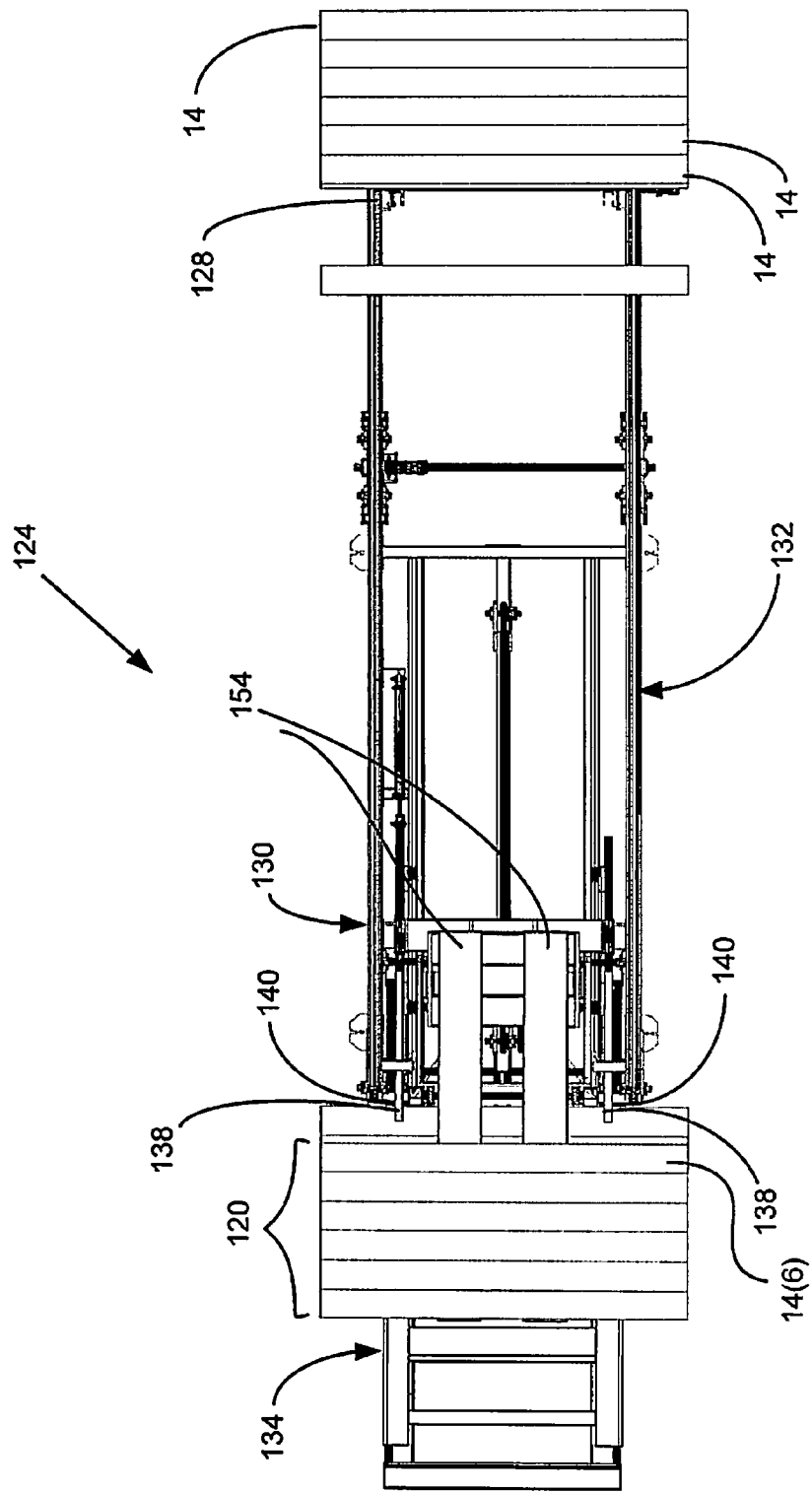
FIG. 46 is a plan view of the railroad stacker of FIG. 45.
Figure 47:
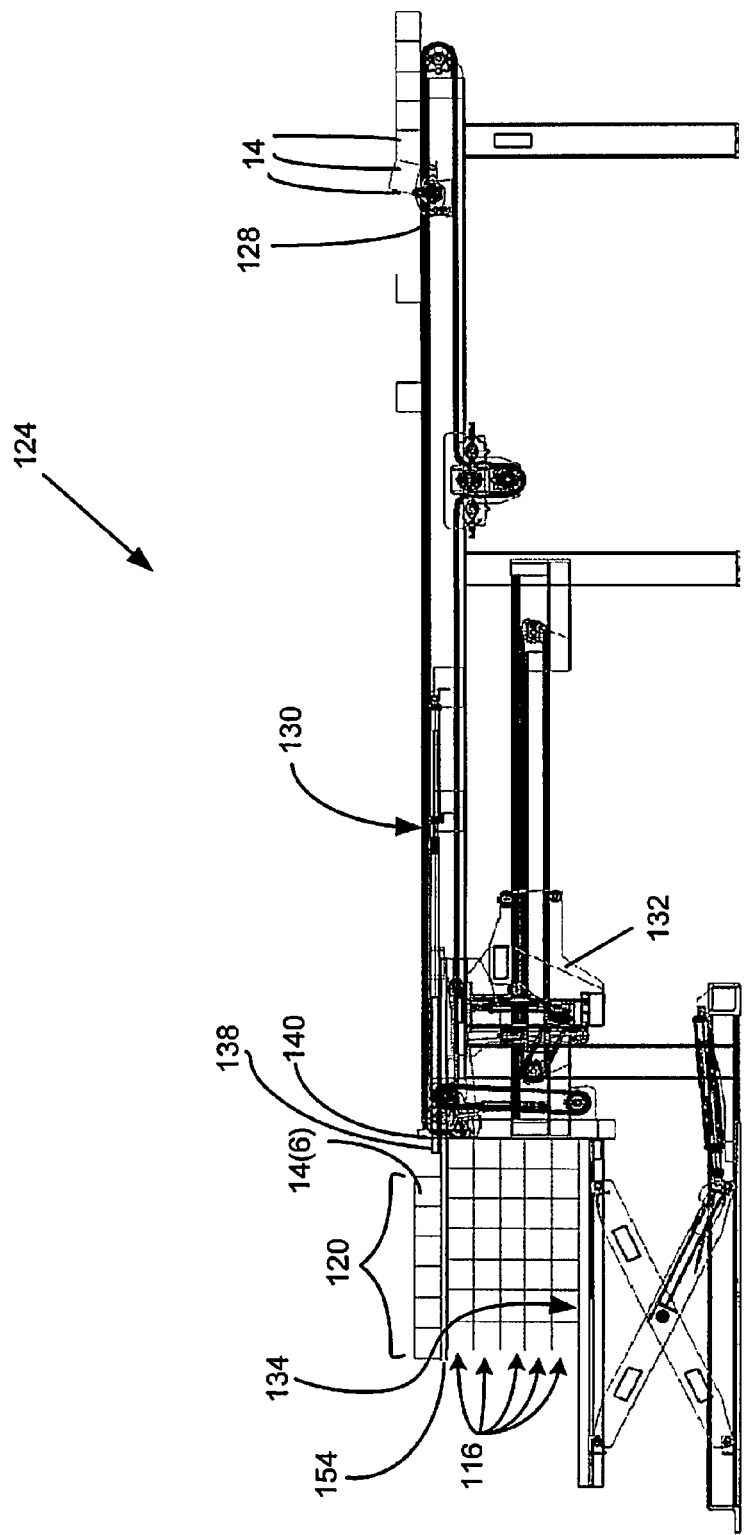
FIG. 47 is the same view as FIG. 45 but with the layer accumulation station in a lowered position to place the "short" layer of ties atop the existing stack of ties on the stack accumulation lift, before the layer accumulation station has been retracted.

FIGS. 46 and 47 show the arms 154 of the stack layer lift 132 in a lowered position such that the "short" layer 120 of ties is just above the previously stacked full layers 116 of ties, but this "short" layer 120 of ties is not yet properly centered for a tram stack configuration of the ties.

Figure 48:
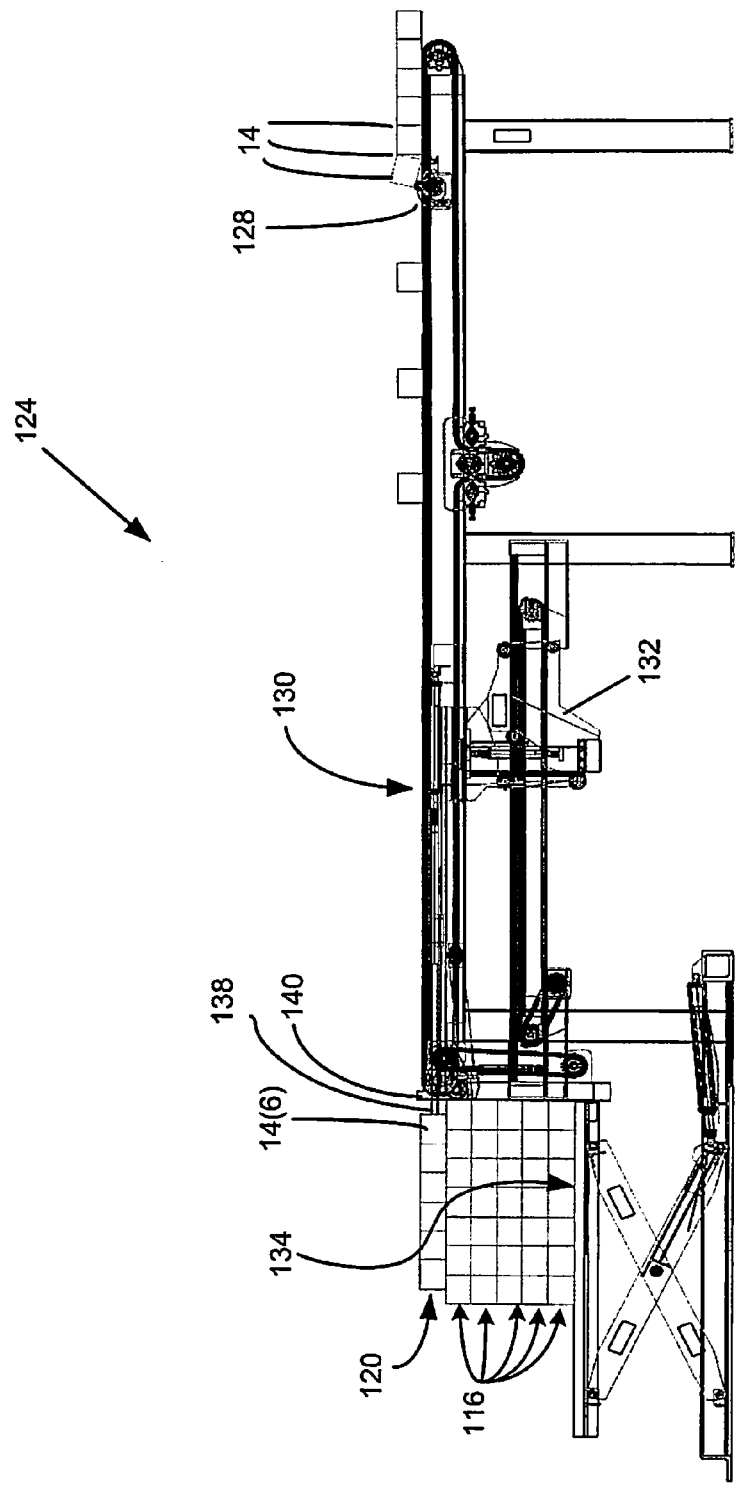
FIG. 48 is the same view as FIG. 47 but with the layer accumulation station retracted and with the sixth "short" layer of ties abutting the adjustable backstop so as to center this new top layer with respect to the existing stack of ties on the stack accumulation lift.

In FIG. 48, the arms 154 are fully retracted such that the sixth tie 14(6) of the "short" layer 120 of ties is abutting the adjustable backstops 138, thus determining the proper, centered location of the first short layer 120 of ties on the stack accumulation lift 134.

It may be appreciated that the extent to which the adjustable backstops 138 are extended or retracted determines the location of the "short" layer 120 of ties relative to the full layers 116 of ties already on the stack accumulation lift 134. The extent to which the adjustable backstops 138 are extended or retracted is determined by a width measured by the laser range finder 136 (See also FIGS. 30 and 31), as described below.

After each layer of ties is assembled on the layer accumulation station 130 in preparation for transferal to the stack layer lift 132, the laser range finder 136 (seen near the center of the tie stacker in FIGS. 30 and 31) takes a distance measurement from the laser range finder 136 to the last tie 14 on the layer accumulation station 130 (the tie 14 closest to the laser range finder 136) and sends this information to a controller (not shown). The controller uses an algorithm to compare this measurement with the same measurement for the first "full" layer 116 of ties. If the measurements are substantially identical, the controller then knows that this latest of layer of ties also is a full layer of ties and does not signal the adjustable backstops 138 to extend from their retracted positions (shown in FIG. 30). The latest layer of ties will be aligned by the fixed-location backstops 140.

However, if the measurement differs substantially from the previous first measurement taken (the measurement corresponding to the first full layer 116 of ties), the controller knows that a short layer 120 of ties is now on the layer accumulation station 130, ready to be transferred to the stack accumulation lift 134. The controller takes the difference in the measurements and divides this difference by two to arrive at a calculated dimension corresponding to the distance that the adjustable backstops 138 need to extend beyond the fixed backstops 140 in order for the latest "short" layer 120 of ties to be centered properly over the existing full layers 116 of ties already on the stack accumulation lift 134, as shown in FIG. 48. The controller sends a signal to the actuator of the adjustable backstops 138 to extend the adjustable backstops 138 the calculated dimension. Then, as the arms 154 of the stack layer lift 132 are retracted, the last tie of the short layer 120 of ties (tie 14(6) in the above example, FIG. 48) impacts against the adjustable backstops 138 so as to locate the short layer 120 of ties in the correct location, centered relative to the full layers 116 of ties.

For example, if the distance measured by the laser range finder 136 for a full layer 116 of ties is twelve inches, and the same distance measured for a short layer 120 of ties is twenty inches, then the difference is eight inches. This difference is divided by two to arrive at a calculated distance of four inches, which is what the adjustable backstops 138 need to extend beyond the fixed-location backstops 140 in order to ensure that the "short" layer 120 of ties is centered over the full layers 116 of ties.

Figure 49:
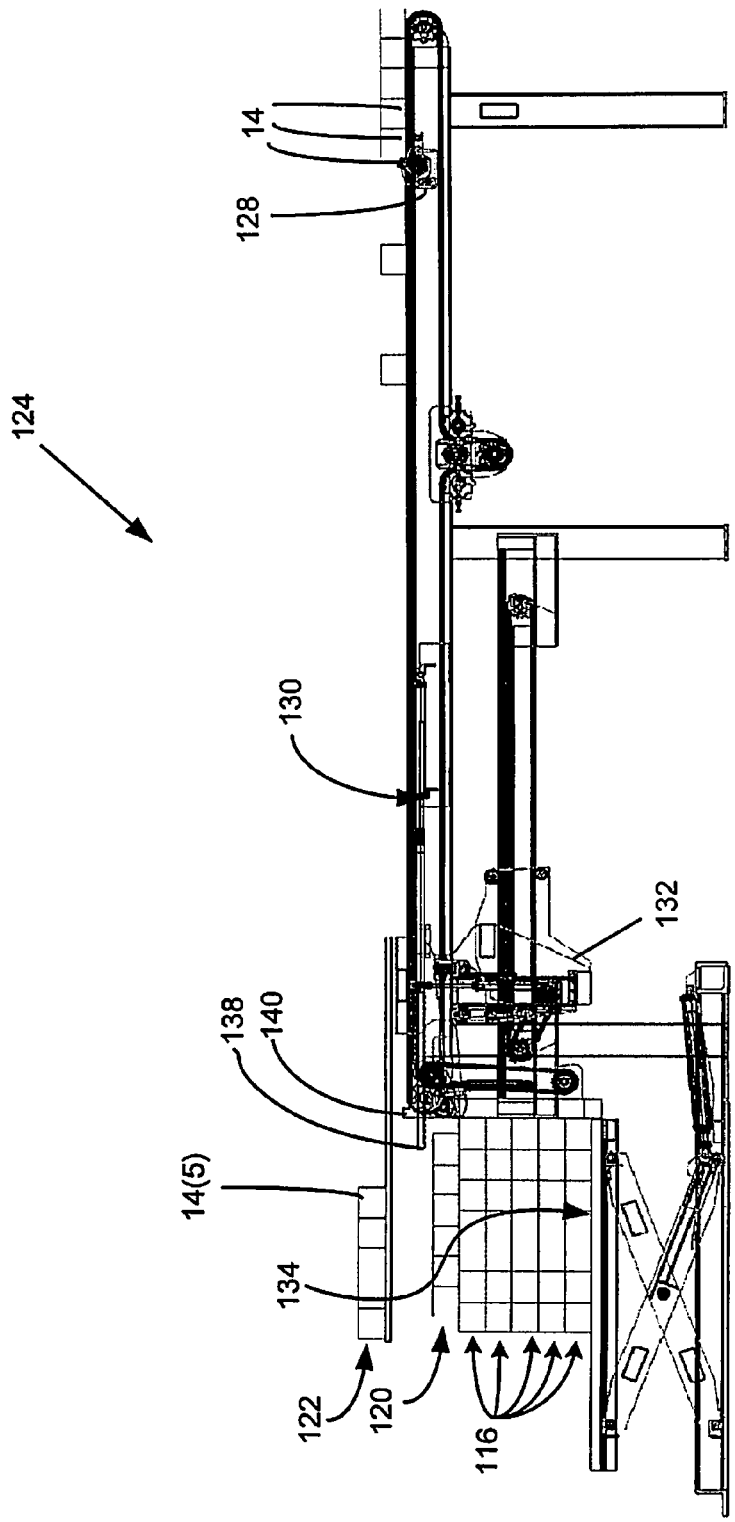
FIG. 49 is the same view as FIG. 45 but showing a new "shorter" layer of ties moved forward by the stack layer lift, from the layer accumulation station to the stack accumulation lift and showing the adjustable backstop in a second extended position.

FIG. 49 is a side view, similar to that of FIG. 45, but showing a new "shorter" layer 122 of ties moved forward by the stack layer lift 132, from the layer accumulation station 130 to the stack accumulation lift 134 and also showing the adjustable backstop 138 in a second extended position.

Figure 50:
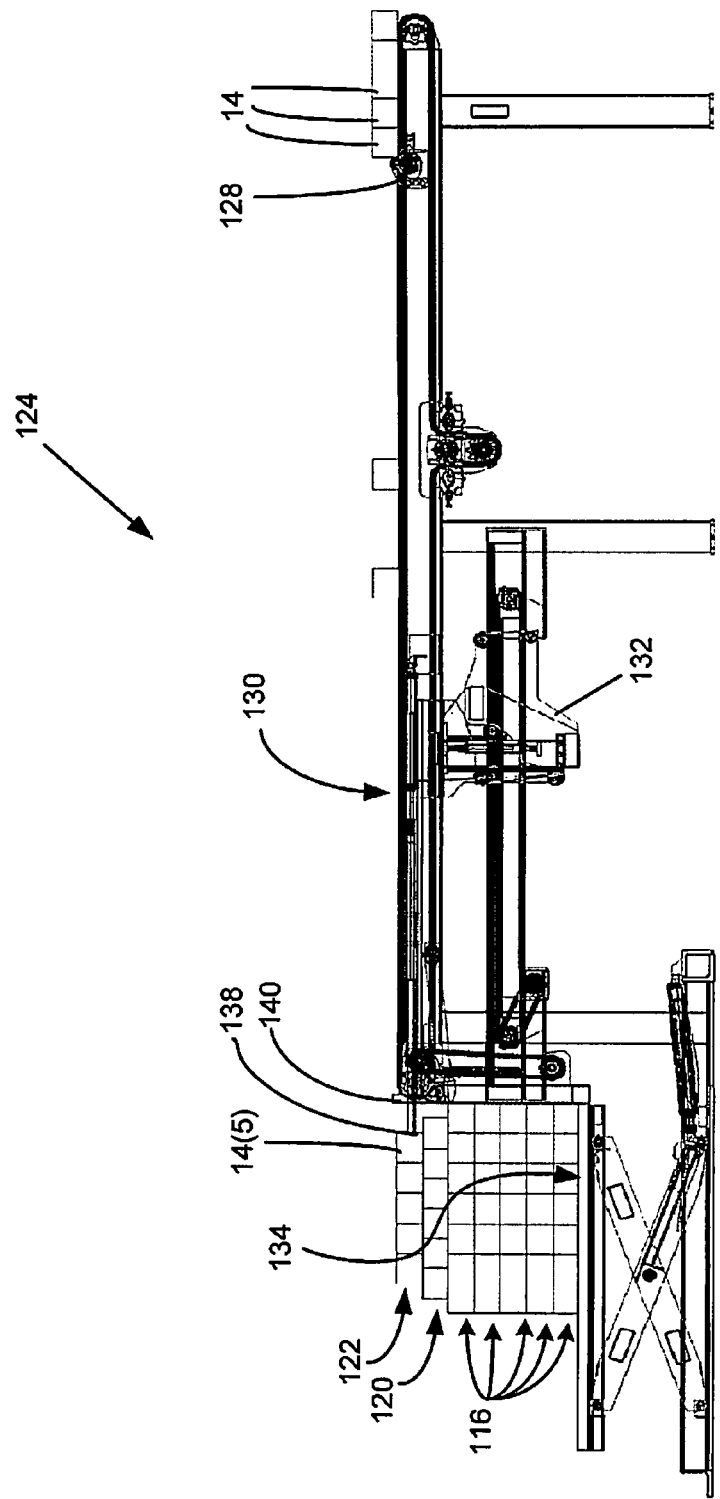
FIG. 50 is the same view as FIG. 48, but with the layer accumulation station retracted and with the new "shorter" layer of ties abutting the adjustable backstop so as to center this new top layer with respect to the existing stack of ties on the stack accumulation lift.

In FIG. 50, the arms 154 of the stack layer lift 132 have been fully retracted and the last tie 14(5) of the shorter layer 122 of ties impacts against the extended adjustable backstops 138 so as to properly locate the shorter layer 122 of ties, centered relative to the full layers 116 of ties already on the stack accumulation lift 134.

For example, the laser range finder 136 may measure a distance of twenty-eight inches from the laser range finder 136 to the last tie 14(5) of the shorter layer 122 of ties. The controller uses this measurement to arrive at a calculated distance of eight inches ((28−12)/2=8) which the adjustable backstops 138 must extend in order to center the latest "shorter" layer 122 of ties on the existing layers 116, 120 of ties already on the stack accumulation lift 134.

It will be obvious to those skilled in the art that various other modifications also may be made to the embodiments described above without departing from the scope of the present invention as claimed.

What is claimed is:

1. A railroad tie stacker, comprising:
   a conveyor defining a left side, a right side, an upstream end and a downstream end and including a tie accumulation deck at the downstream end having means for supporting a plurality of ties in a parallel arrangement to form a layer of ties;
   a stack accumulation lift located downstream from the tie accumulation deck, said stack accumulation lift having a top surface and including means for lowering the elevation of the top surface as successive layers of ties are deposited on the stack accumulation lift; and
   transport means for moving a layer of ties from the tie accumulation deck to the stack accumulation lift;
   wherein said means for supporting a plurality of ties in a parallel arrangement to form a layer of ties includes means for supporting the ties arranged in a parallel arrangement with a first end of each of said parallel ties on the left side and a second end of each of said parallel ties on the right side, and further comprising:
   means on the left side of said conveyor for placing a first perpendicular tie on top of the first ends of said layer of ties supported on the tie accumulation deck before depositing said layer of ties onto the stack accumulation lift, said first perpendicular tie extending in the upstream-downstream direction; and
   means on the right side of said conveyor for placing a second perpendicular tie on top of the second ends of a layer of parallel ties supported on the tie accumulation deck before depositing said layer of ties onto the stack accumulation lift, said second perpendicular tie extending in the upstream-downstream direction.

2. A railroad tie stacker as recited in claim 1, and further comprising:
   at least one adjustable backstop on said tie accumulation deck, said adjustable backstop having a retracted position, that enables the transport means to transport the layer of ties onto the stack accumulation lift, and a first extended position, including means for contacting the upstream side of the layer of parallel ties that has been deposited on the stack accumulation lift as the transport means retracts upstream to prepare for transporting another layer of parallel ties onto the stack accumulation lift.

3. A railroad tie stacker as recited in claim 2, wherein the adjustable backstop has a second extended position farther downstream from the first extended position.

4. A method for stacking railroad ties, comprising the steps of:
   transporting a first plurality of railroad ties on a conveyor from an upstream end to a downstream end, with the railroad ties extending crosswise across the conveyor in a left-to-right direction;
   accumulating said first plurality of railroad ties at the downstream end of the conveyor to form a first layer of parallel ties, each of said parallel ties having a left end and a right end;
   conveying the first layer of parallel ties farther downstream onto a stack accumulation lift at a first elevation; and then
   lowering the stack accumulation to prepare to receive a second layer of parallel ties;
   and further comprising the step of laying a first perpendicular railroad tie on top of the left ends of the first layer of parallel ties before conveying the first layer of parallel ties onto the stack accumulation lift.

5. A method for stacking railroad ties as recited in claim 4, and further comprising the step of accumulating a second plurality of railroad ties at the downstream end of the conveyor to form a second layer of parallel ties extending in the left-to-right direction; then laying a second perpendicular tie on top of the right end of the second layer of parallel ties; and then conveying the second layer of parallel ties and the second perpendicular tie on top of the first layer of parallel ties and first perpendicular tie on the stack accumulation lift.

6. A method for stacking railroad ties as recited in claim 4, and further comprising the step of accumulating a second plurality of railroad ties at the downstream end of the conveyor to form a second layer of parallel ties extending in the left-to-right direction, said second plurality of ties being fewer in number than the first plurality of railroad ties; and then conveying the second layer of parallel ties on top of the first layer of parallel ties, with the second layer of parallel ties centered on top of the first layer.

* * * * *